(12) United States Patent
Duke

(10) Patent No.: US 6,494,171 B2
(45) Date of Patent: Dec. 17, 2002

(54) AXIAL PISTON MACHINES

(76) Inventor: Noel Stephen Duke, Ostrich Road, R D 2, Pukekohe (NZ)

( * ) Notice: Subject to any disclaimer, the term of this patent is extended or adjusted under 35 U.S.C. 154(b) by 0 days.

(21) Appl. No.: 09/852,792

(22) Filed: May 11, 2001

(65) Prior Publication Data

US 2002/0170511 A1 Nov. 21, 2002

Related U.S. Application Data

(62) Division of application No. 08/983,522, filed on Sep. 23, 1997, now Pat. No. 6,250,262, which is a continuation of application No. PCT/NZ96/00018, filed on Mar. 14, 1996.

(30) Foreign Application Priority Data

Mar. 17, 1995 (NZ) ................................................. 270736

(51) Int. Cl.$^7$ ............................................... F02B 57/00
(52) U.S. Cl. ...................................................... 123/43 A
(58) Field of Search ........................... 91/499; 123/43 A, 123/43 AA

(56) References Cited

U.S. PATENT DOCUMENTS

| | | |
|---|---|---|
| 2,280,669 A | 4/1942 | Sklenár |
| 3,133,447 A | 5/1964 | Mercler |
| 3,183,846 A * | 5/1965 | Skinner ....................... 91/499 |
| 3,654,906 A | 4/1972 | Airas |
| 3,893,295 A | 7/1975 | Airas ........................ 60/39.63 |
| 3,899,880 A * | 8/1975 | Rohs ........................ 123/43 A |
| 4,213,427 A * | 7/1980 | Di Stefano ............. 123/43 AA |
| 4,250,843 A * | 2/1981 | Chang .................... 123/43 AA |

FOREIGN PATENT DOCUMENTS

| | | | |
|---|---|---|---|
| AU | 26014/92 | 4/1993 | |
| DE | 3832133 A1 * | 3/1990 | ............ 123/43 AA |
| FR | 1408720 | 2/1964 | |
| FR | 2282531 | 3/1976 | |
| GB | 156014 | 1/1921 | |
| GB | 189793 | 11/1922 | |
| NZ | 131852 | 4/1963 | |
| NZ | 150235 | 3/1970 | |
| NZ | 221366 | 1/1991 | |
| WO | WO79/00741 | 10/1979 | |
| WO | WO93/13305 | 7/1993 | |

* cited by examiner

*Primary Examiner*—Michael Koczo
(74) *Attorney, Agent, or Firm*—Jacobson Holman PLLC

(57) ABSTRACT

A two or four stroke internal combustion engine has a ported plate with a series of intake and exhaust ports connected respectively to an air intake and an exhaust system. A shaft is rotatable relative to the ported plate. the shaft carries a crank shaft with a crank axis oblique to the shaft axis. An array of one or more combustion chambers rotates about the shaft axis. Each combustion chamber includes at least one port which is brought into and out of operative communication with the series of intake and exhaust ports as the combustion chamber moves over the face of the ported plate. A piston reciprocates in each combustion chamber under the control of a wobbling member journalled onto the crank shaft. For each combustion chamber port an annular seal is located within an annular groove about the port and is biased toward the ported plate by combustion fluid pressure.

12 Claims, 33 Drawing Sheets

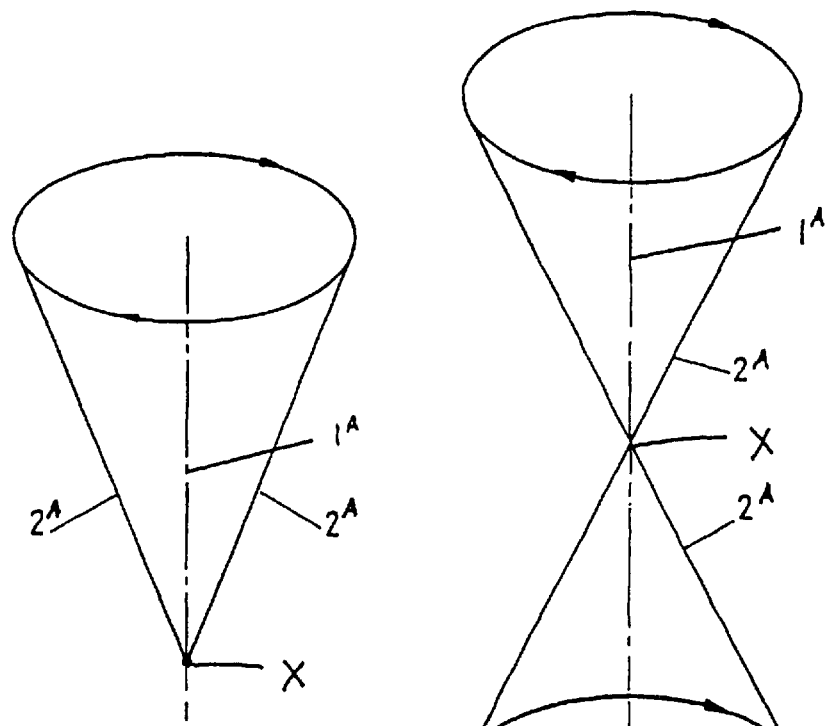
FIG. 5
FIG. 6
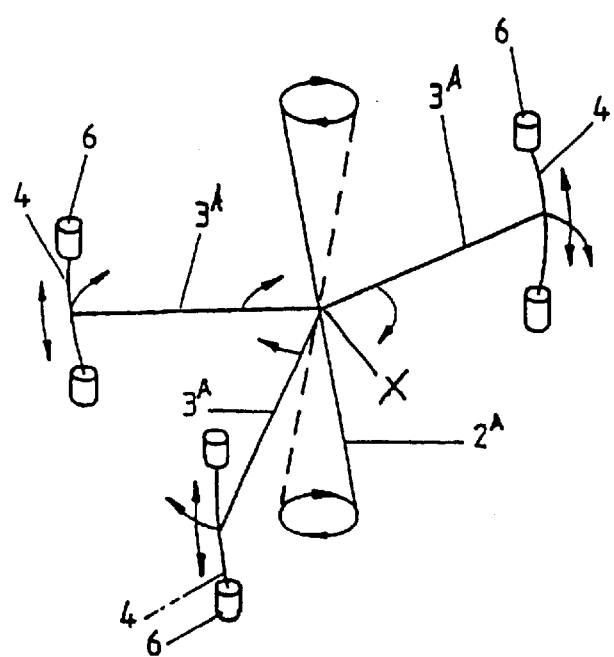
FIG. 7

SECTION AA

SECTION BB

SECTION AA

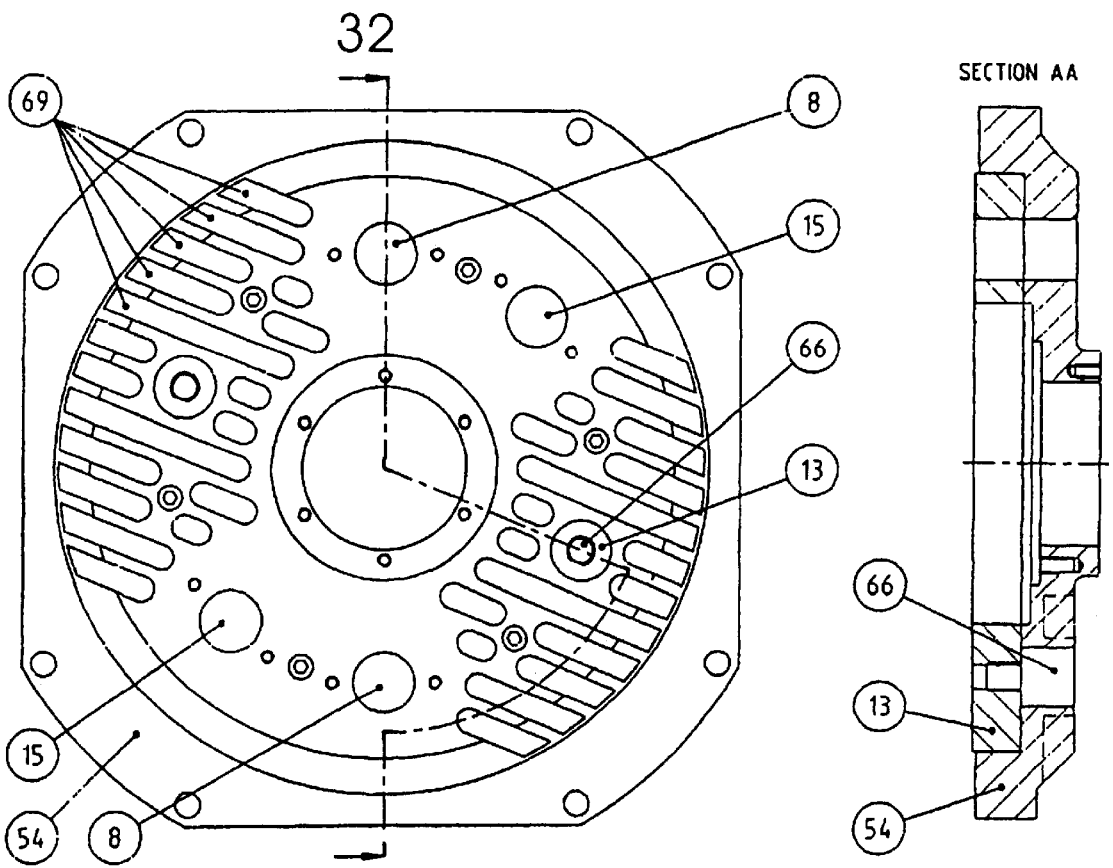
FIG. 31
FIG. 32
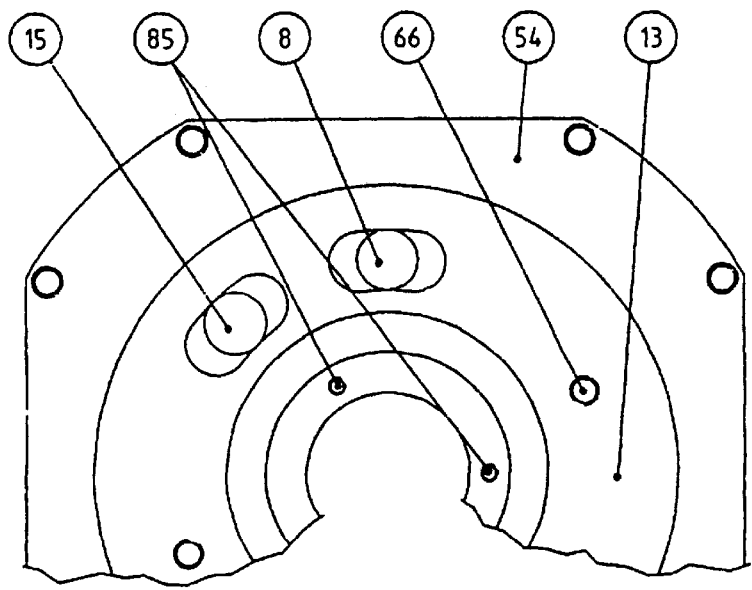
FIG. 33

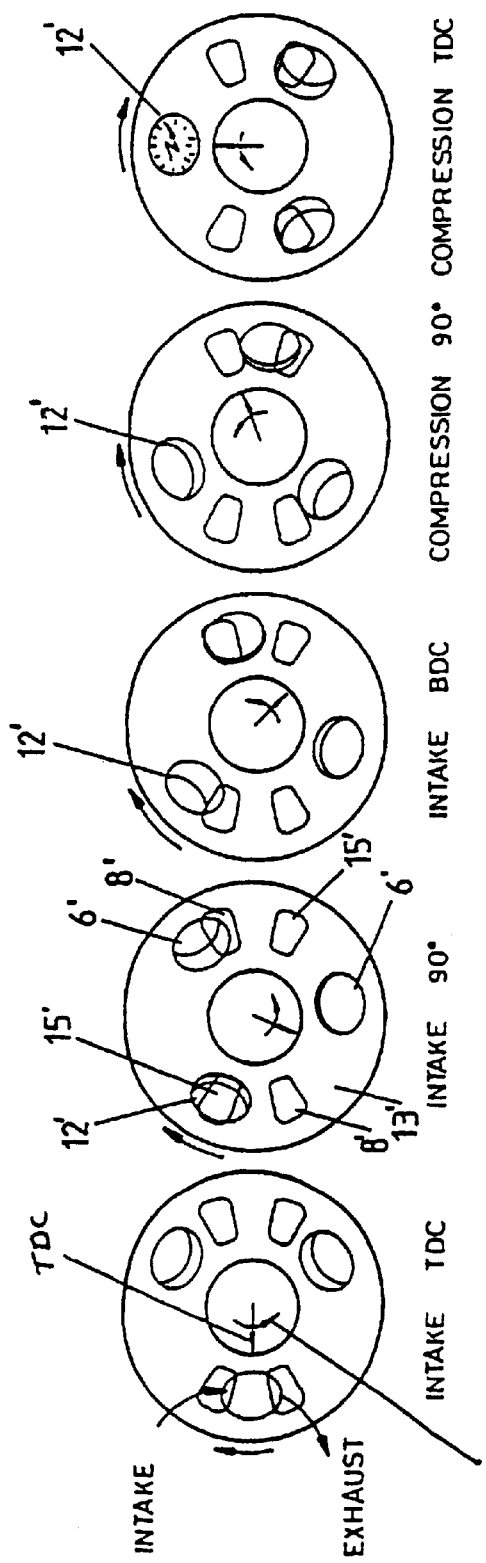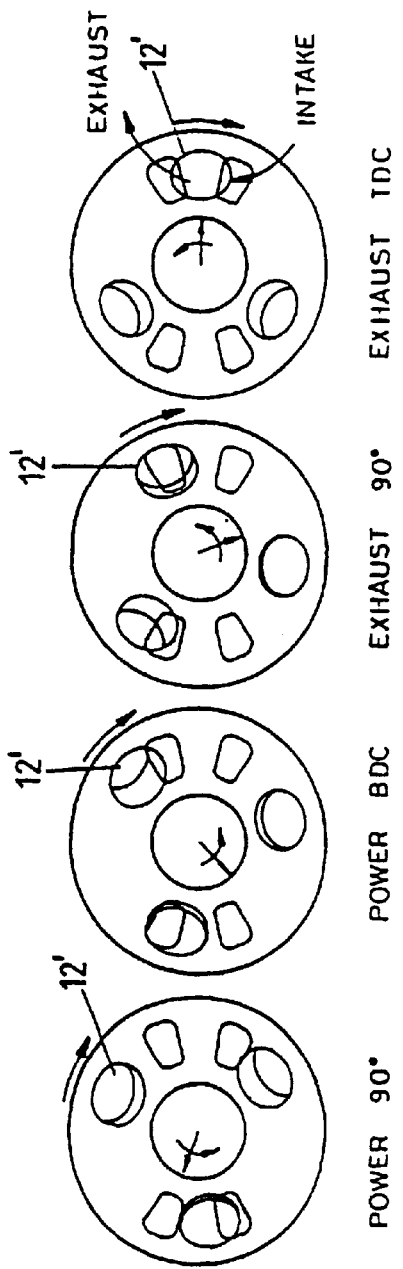

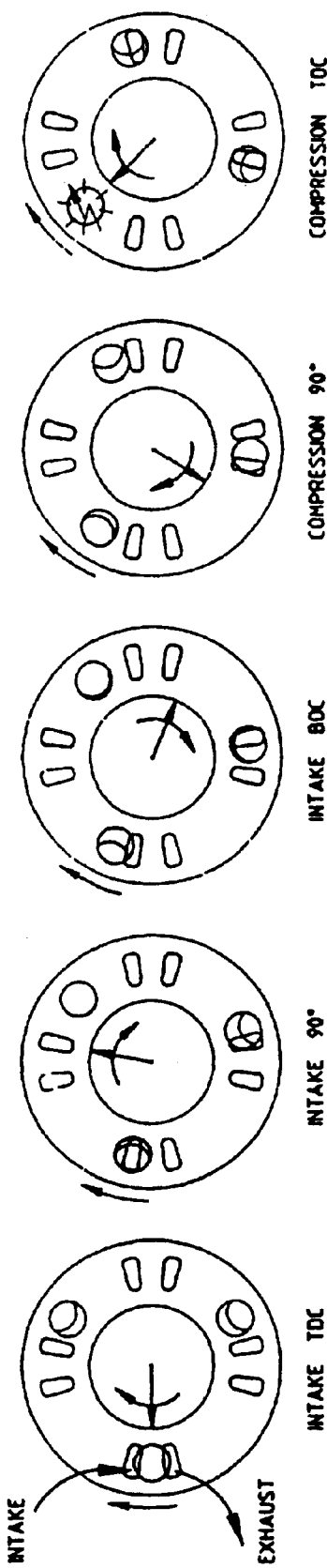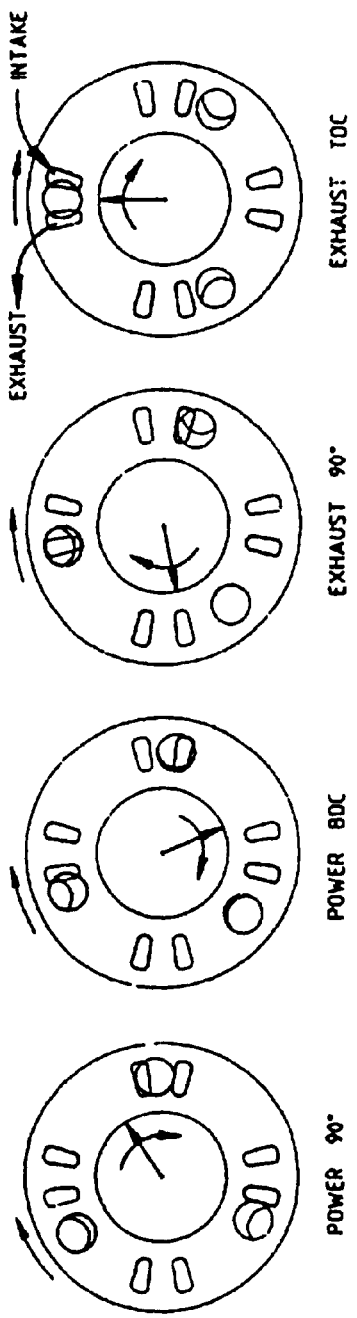
FIG. 35Aa  FIG. 35Ab  FIG. 35Ac  FIG. 35Ad  FIG. 35Ae
FIG. 35Af  FIG. 35Ag  FIG. 35Ah  FIG. 35Ai

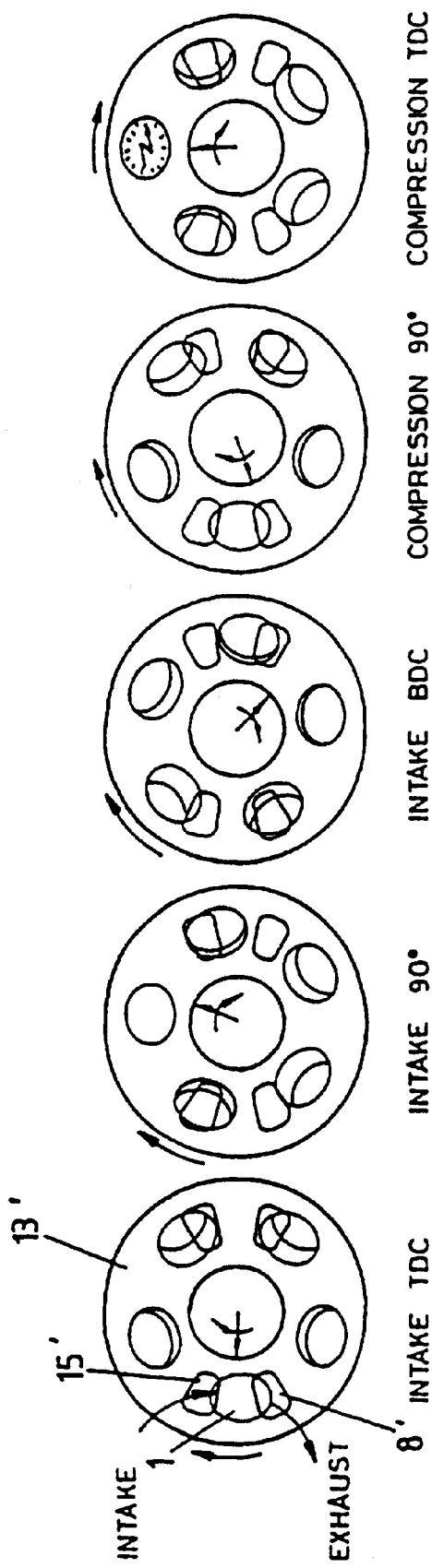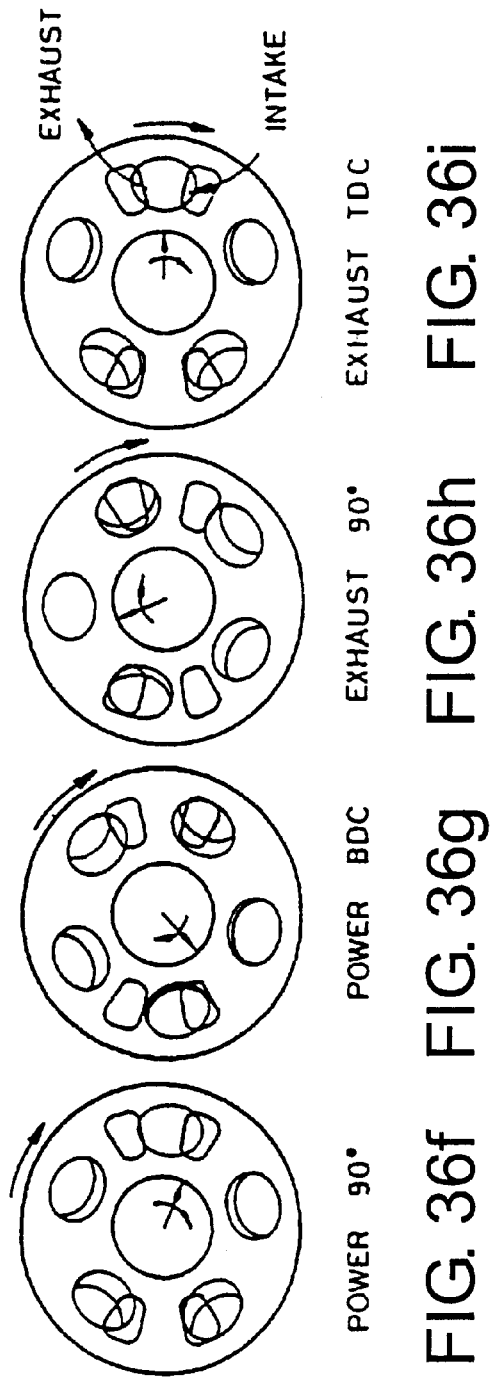

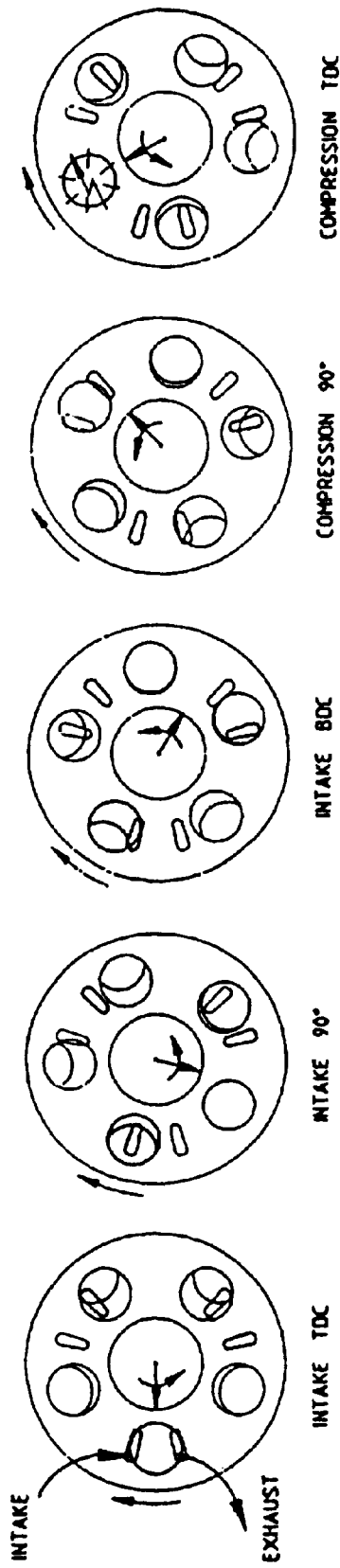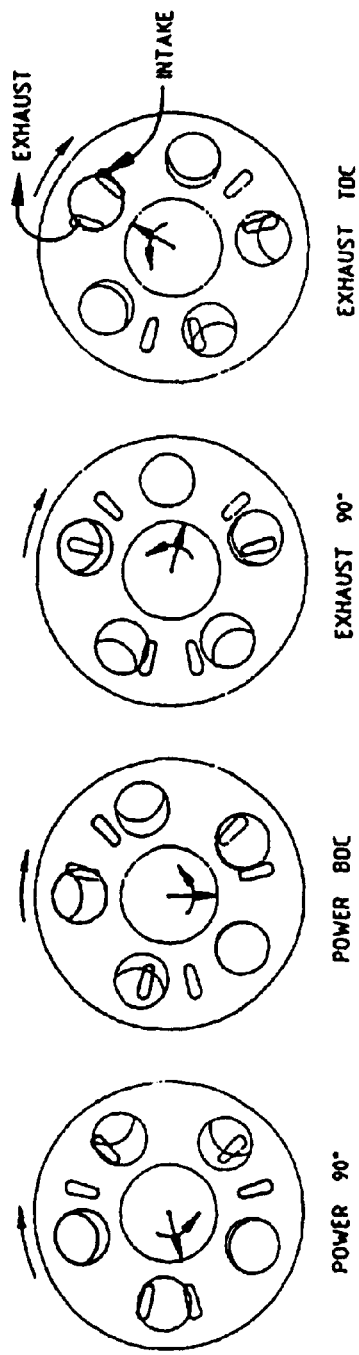
FIG. 36Aa  FIG. 36Ab  FIG. 36Ac  FIG. 36Ad  FIG. 36Ae  FIG. 36Af  FIG. 36Ag  FIG. 36Ah  FIG. 36Ai

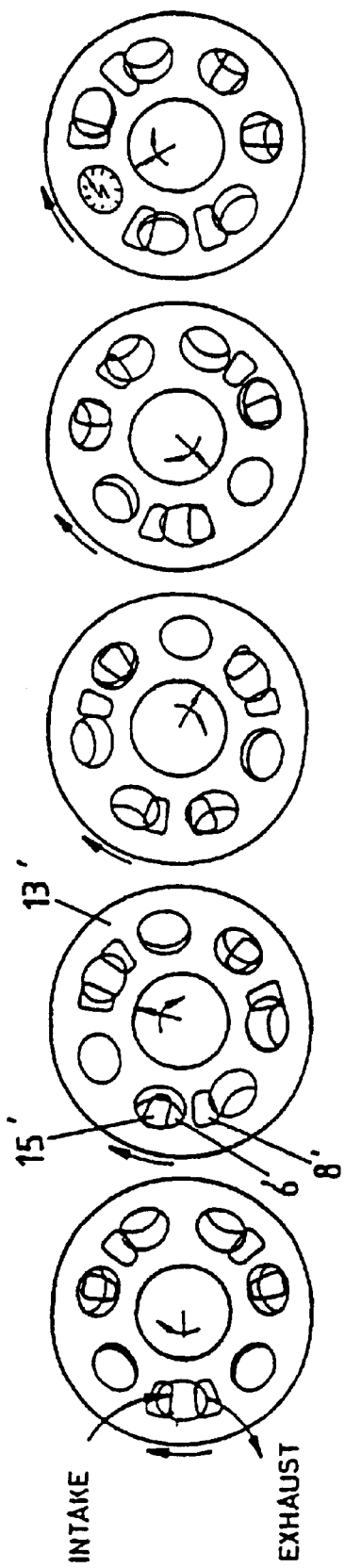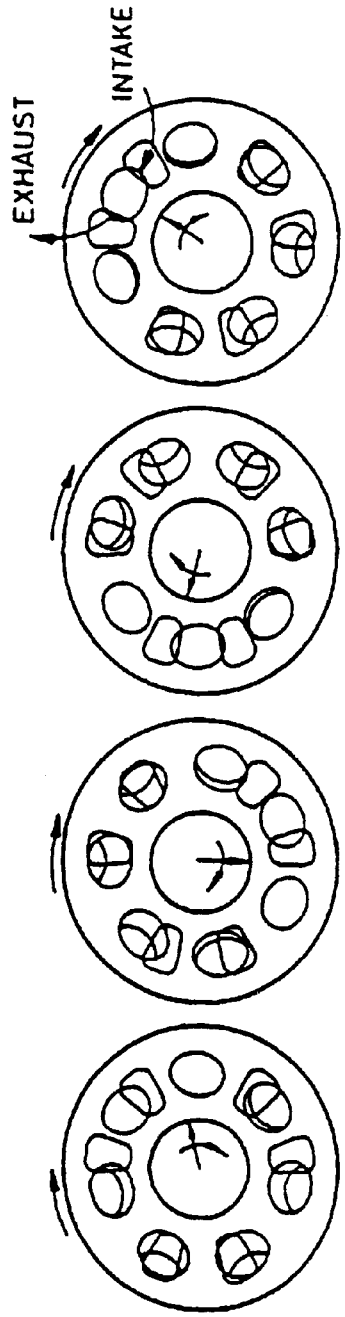

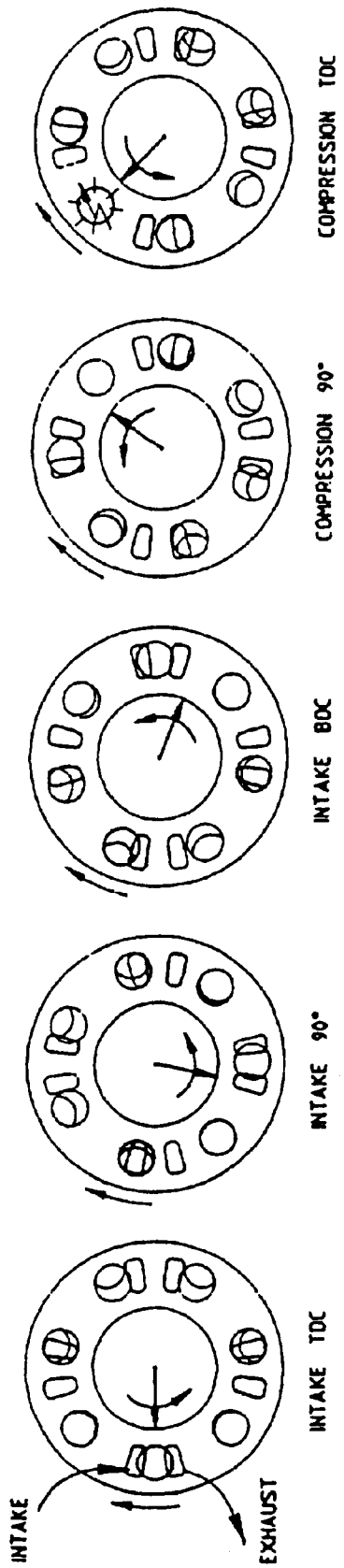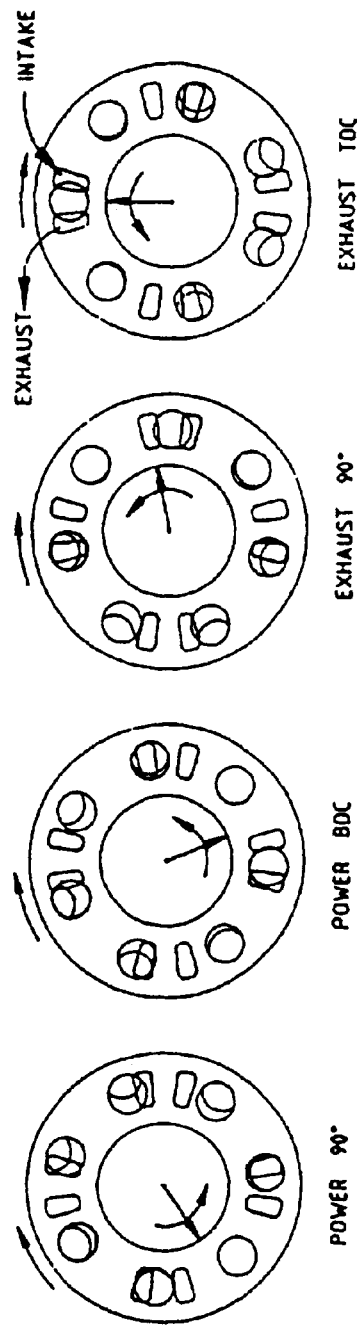
FIG. 37Aa  FIG. 37Ab  FIG. 37Ac  FIG. 37Ad  FIG. 37Ae  FIG. 37Af  FIG. 37Ag  FIG. 37Ah  FIG. 37Ai

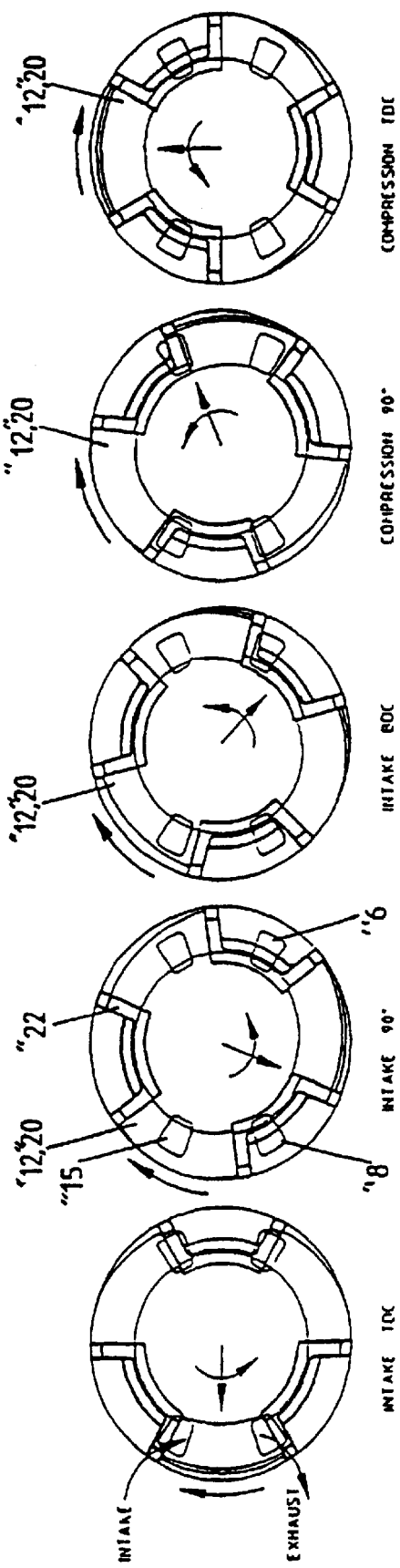
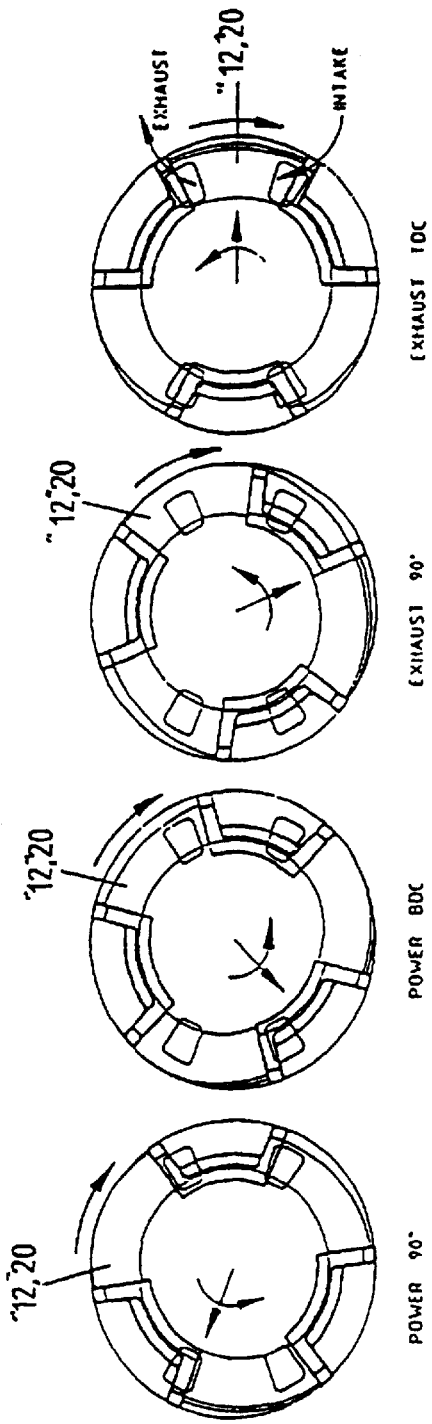

AXIAL PISTON MACHINES

This is a Divisional of application Ser. No. 08/983,522 filed Sep. 23, 1997 U.S. Pat. No. 6,250,262 which in turn is a Continuation of PCT/NZ96/00018 filed Mar. 14, 1996.

TECHNICAL FIELD

This invention relates to engines, pumps and other mechanism of similar nature, and in particular to such a mechanism having a crank shaft.

BACKGROUND OF THE INVENTION

Various engines/pumps utilizing a crank shaft are currently known. Such engine/pumps are more commonly known as wobble engines/pumps or swash plate engines/pumps. Wobble engines/pumps have axial pistons disposed from a wobble plate which is fixed on an output/input shaft at an acute angle. In the case of an engine, power received from the pistons is transferred to the wobble plate during the power stroke, displacing the wobble plate axially, and as a result rotating the shaft. The operation of a wobble pump is in reverse order, wherein power is applied to the input shaft to displace fluid inside the cylinders.

Modern developments in wobble engines/pumps have included changes in the configuration and operation of the pistons/cylinders and in inlet/outlet porting of the fluids. The drive mechanisms of such modem machines are nevertheless very complex, requiring many parts which are both difficult to assemble and also difficult to maintain. Such engines/pumps also have a lot of components operating under high frictional forces.

Previously published New Zealand Patent No. 221366 discloses therein a means to transfer the wobbling motion of a disc to a rotary motion of the shaft and visa versa. Further disclosed therein is a suitable means of providing power to or from the disc by way of internal cylinder engine or hydraulic/pneumatic motors. There is however no detail on any means by which the cylinder engine is or can be coupled to either the disc or the shaft, such that the invention can operate as a compact simple unit.

New Zealand Patent No. 150235 describes a continuous disc acting as pistons inside a chamber. The disc is non planar and rotation thereof inside the chamber forms pockets which are compressed and expanded at differing angles of rotation.

The complex nature of the disc, output and crank shafts, chamber and other dependent mechanisms make such an engine/pump expensive and difficult to make.

New Zealand Patent No. 131852 describes a two stroke or four stroke engine also operable as a pump, in which pistons of circular cross-section which are bent in an arc are located inside curved cylinders disposed axially about a central axis. Power from the rotating cylinders is transferred to the output engine block, the spider in this invention remaining stationary.

Most modem wobble type engines/pumps require many complicated parts to ensure efficient operation. Difficulties exist in the sealing of cylinders to ensure that no fluid escapes undesirably, and in the assembly and maintenance. Such engines also have problems operating in balance.

It is an object of the present invention to provide an engine/pump which will at least provide the public with a useful choice.

SUMMARY OF THE INVENTION

Accordingly the present invention may broadly be said to consist in an internal combustion engine having a crank shaft having a shaft axis and having a crank axis oblique to the shaft axis but aligned to intersect therewith at X, an array of piston and "cylinder" assemblies to rotate as assemblies relative to and about said shaft axis, each said assembly having a reciprocal axis between its top dead centre (enforceable) (TDC) and bottom dead centre (BDC), each such reciprocal axis midway between TDC and BDC being normal to a line projected from X, each said "cylinder" being of any appropriate cross section (with respect to its reciprocal axis) and the cross section of each complementary piston being complementary to the cross section of its cylinder, piston control means mounted to rotate about said crank axis, connection means for each piston from said control means, the connection between each said connection means and said piston control means and/or between each said connection means and its piston having sufficient degrees of freedom to allow the requisite reciprocal movement of said pistons within each associated cylinder thereof as the array of assemblies rotates relative to and about the shaft axis, cylinder head means which holds and/or defines the cylinders in said array, said head means including at least one port per cylinder, and port means relative to which said cylinder head means moves sealably to allow (timed to the reciprocal movement of each piston in its cylinder and to the rotational position of each cylinder) the induction compression, power and exhaust strokes of a four stroke combustion engine

AND WHEREIN at least one said connection means is capable of conveying torque between said crank shaft and said cylinder head means via its said piston and cylinder and via said piston control means, AND means is provided whereby, directly or indirectly (eg; via said crank shaft), power can be taken off said cylinder head means or crank shaft or port means as each rotates relative to the other.

Preferably each said connection connects said piston control means to a pair of piston and cylinder assemblies, each piston and cylinder assembly of such a pair having a different head means (each of which in turn has its own said port means), and each said piston and cylinder assembly of such a pair having its said line projected from X at the same angle on either side of a line projected normal from the crank shaft axis at X.

Preferably said crank shaft is indexed, directly or indirectly, with said at least one cylinder head means.

Preferably said indexing is by annular and planetary gearing.

Preferably the power take off is from said crankshaft and said gearing transmits the geared torque as well as serving a timing function.

Preferably said port means, in sequence, can present an induction port or ports, optionally a spark plug and optionally a fuel injector, and an exhaust port or ports, the presentations being timed for a cylinder to the induction stroke, compression/power stroke and/or transition thereof, and exhaust stroke respectively.

Preferably the annular gear is carried by the cylinder head means, said planetary gears providing the indexing of said crank with said cylinder head means and having their rotatable axes fixed relative to said port means.

Preferably the ratio of crank shaft rotation to piston and cylinder assemblies rotation is 3:1 in a counter-rotating direction.

Preferably there are three pairs of opposed pistons and cylinder assemblies, the associated port means for each providing two inlet and two outlet ports.

Preferably said engine operates as or as if a diesel engine.

Preferably said engine operates as or as if a petrol engine

In another aspect the invention consists in an internal combustion engine having

- a crank shaft having a shaft axis and having a crank axis oblique to the shaft axis but aligned to intersect therewith at X,
- an array of piston and "cylinder" assemblies to rotate as assemblies relative to and about said shaft axis, each said assembly having a reciprocal axis between its top dead centre (TDC) and bottom dead centre (BDC), each such reciprocal axis midway between TDC and BDC being normal to a line projected from X, each said "cylinder" being of any appropriate cross section (with respect to its reciprocal axis) and the cross section of each complementary piston being complementary to the cross section of its cylinder,
- piston control means mounted to rotate about said crank axis,
- connection means for each piston from said piston control means, the connection between each said connection means and said piston control means and/or between each said connection means and its piston having sufficient degrees of freedom to allow the requisite reciprocal movement of said pistons within each associated cylinder thereof as the array of assemblies rotates relative to and about the shaft axis,
- cylinder head means which holds and/or defines the cylinders in said array, and port means relative to which said cylinder head means moves sealably to allow (in conjunction with any other port(s), if any )(timed to the reciprocal movement of each piston in its cylinder and to the rotational position of each cylinder) at least the inflow of air and fuel and the power and compression of a two stroke combustion engine WHEREIN
- each combustion chamber as defined by each said piston, its cylinder and the cylinder head means can be timed for the exposure as required to two ports, AND WHEREIN
- at least one said connection means is capable of conveying torque between said crank shaft and said cylinder head means via its said piston and cylinder and via said piston control means, AND means is provided whereby, directly or indirectly (eg; via said crank shaft), power can be taken off said cylinder head means or crank shaft or port means as each rotate relative to each other.

Preferably said head means includes at least two ports per cylinder.

Preferably each said connection connects said piston control means to a pair of piston and cylinder assemblies, each piston and cylinder assembly of such a pair having a different head means (each of which in turn has its own said port means), and each said piston and cylinder assembly of such a pair having its said line projected from X the same angle on either side of a line projected normal from the crank shaft axis at X.

Preferably said crank shaft is indexed, directly or indirectly, with said at least one cylinder head means.

Preferably said indexing is by annular and planetary gearing.

Preferably the power take off is from said crankshaft and said gearing transmits the geared torque as well as serving a timing function.

Preferably said port means, in sequence, can present an induction port or ports, optionally a spark plug, and optionally a fuel injector, the presentations being timed for a cylinder to the compression/power stroke and/or transition thereof, respectively wherein exhaust and induction occurs as substantially BDC of each piston.

Preferably the annular gear is carried by the cylinder head means, said planetary gears providing the indexing of said crank with said cylinder head means and having their rotatable axes fixed relative to said port means.

Preferably the ratio of crank shaft rotation to piston and cylinder assemblies rotation is 3:1 in a counter-rotating direction.

In yet a further aspect the present invention consists in a positive displacement machine having

- a crank shaft to rotate about the shaft axis or having a shaft axis and having a crank axis oblique to the shaft axis but aligned to intersect therewith at X,
- an array of piston and "cylinder" assemblies to rotate as assemblies relatively about said shaft axis, each said assembly having a reciprocal axis between its top dead centre (TDC) and bottom dead centre (BDC), each such reciprocal axis midway between TDC and BDC being normal to a line projected from X, each said "cylinder" being of any appropriate cross section (with respect to its reciprocal axis) and the cross section of each complementary piston being complementary to the cross section of its cylinder,
- piston control means mounted to rotate about said crank axis,
- connection means for each piston from said piston control means, the connection between each said connection means and said piston control means and/or between each said connection means and its piston having sufficient degrees of freedom to allow said piston control means to cause the requisite reciprocal movement of said pistons within each associated cylinder thereof as the array of assemblies rotates relative to and about the shaft axis,
- cylinder head means which holds and/or defines the cylinders in said array, said head means including at least one port per cylinder, and
- port means relative to which said cylinder head means moves sealably to allow (timed to the reciprocal movement of each piston in its cylinder and to the rotational position of each cylinder) the induction and delivery strokes of each piston AND WHEREIN
- at least one said connection means is capable of conveying torque between said crank shaft and said cylinder head means via its said piston and cylinder and via said piston control means, AND means is provided whereby, directly or indirectly (eg; via said crank shaft), power can be applied to said cylinder head means or port means or crank shaft.

Preferably each said connection connects said piston control means to a pair of piston and cylinder assemblies, each piston and cylinder assembly of such a pair having a different head means (each of which in turn has its own said port means), and each said piston and cylinder assembly of such a pair having its said line projected from X the same angle on either side of a line projected normal from the crank shaft axis at X.

Preferably said crank shaft is indexed, directly or indirectly, with said at least one cylinder head means.

Preferably said indexing is by annular and planetary gearing.

Preferably the power delivery is to said crankshaft and said gearing transmits the geared torque as well as serving a timing function.

Preferably said port means, in sequence, can present an induction port or ports, and delivery port or ports, the presentations being timed for a cylinder to the induction stroke, delivery/compression stroke and/or transition thereof.

Preferably the annular gear is carried by the cylinder head means, said planetary gears providing the indexing of said crank with said cylinder head means and having their rotatable axes fixed relative to said port means.

Preferably the ratio of crank shaft rotation to piston and cylinder assemblies rotation is 3:1 in a counter-rotating direction.

Preferably there are three pairs of opposed pistons, and cylinder assemblies, the port means for each providing two inlet and two outlet ports.

In still a further aspect the present invention consists in a combustion engine having
- a crank shaft having a shaft axis and having a crank axis oblique to the shaft axis but aligned to intersect therewith at X,
- an array of piston and "cylinder" assemblies to rotate as assemblies relative to and about said shaft axis, each said assembly having a reciprocal axis between its top dead centre (TDC) and bottom dead centre (BDC), each such reciprocal axis midway between TDC and BDC being normal to a line projected from X, each said "cylinder" being of any appropriate cross section (with respect to its reciprocal axis) and the cross section of each complementary piston being complementary to the cross section of its cylinder,
- piston control means mounted to rotate about said crank axis,
- connection means for each piston from said piston control means, the connection between each said connection means and said piston control means and/or between each said connection means and its piston having sufficient degrees of freedom to allow the requisite reciprocal movement of said pistons within each associated cylinder thereof as the array of assemblies rotates relative to and about the shaft axis,
- cylinder head means which holds and/or defines the cylinders in said array, said head means including at least one heat transfer region per cylinder, and
- heat exchange means relative to which said cylinder head means moves to allow (timed to the reciprocal movement of each piston in its cylinder and to the rotational position of each cylinder) the heat transfer to and from the working fluid in each said cylinder AND WHEREIN
- at least one said connection means is capable of conveying torque between said crank shaft and said cylinder head means via its said piston and cylinder and via said piston control means, AND
- means is provided whereby, directly or indirectly (eg; via said crank shaft), power can be taken off said cylinder head means or crank shaft or port means as each rotates relative to each other.

Preferably each said connection connects said piston control means to a pair of piston and cylinder assemblies, each piston and cylinder assembly of such a pair having a different head means (each of which in turn has its own said port means), and each said piston and cylinder assembly of such a pair having its said line projected from X the same angle on either side of a line projected normal from the crank shaft axis at X.

Preferably said crank shaft is indexed, directly or indirectly, with said at least one cylinder head means.

Preferably said indexing is by annular and planetary gearing.

Preferably the power take off is from said crankshaft and said gearing transmits the geared torque as well as serving a timing function.

Preferably said port means, in sequence, can present an induction port or ports, optionally a spark plug and optionally a fuel injector, and an exhaust port or ports, the presentations being timed for a cylinder to the induction stroke, compression/power stroke and/or transition thereof, and exhaust stroke respectively.

Preferably the annular gear is carried by the cylinder head means, said planetary gears providing the indexing of said crank with said cylinder head means and having their rotatable axes fixed relative to said port means.

Preferably the ratio of crank shaft rotation to piston and cylinder assemblies rotation is 3:1 in a counter-rotating direction.

In still a further aspect the present invention consists in an internal combustion engine having
- a crank shaft having a shaft axis and having a crank axis oblique to the shaft axis but aligned to intersect therewith at X,
- an array of piston and "cylinder" assemblies to rotate as assemblies relative to and about said shaft axis, each said assembly having a reciprocal axis between its top dead centre (TDC) and bottom dead centre (BDC), each such reciprocal axis midway between TDC and BDC being normal to a line projected from X, each said "cylinder" being of any appropriate cross section (with respect to its reciprocal axis) and the cross section of each complementary piston being complementary to the cross section of its cylinder,
- piston control means mounted to rotate about said crank axis,
- connection means for each piston from said piston control means, the connection between each said connection means and said piston control means and/or between each said connection means and its piston having sufficient degrees of freedom to allow the requisite reciprocal movement of said pistons within each associated cylinder thereof as the array of assemblies rotates relative to and about the shaft axis,
- cylinder head means which holds and/or defines the cylinders in said array, said head means including at least two ports per cylinder, and
- at least one inlet and one outlet valve per cylinder each actuable directly or indirectly by the relative rotation of said crank shaft to allow (timed to the reciprocal movement of each piston in its cylinder and to the rotational position of the cam) the induction compression, power and exhaust strokes of a four stroke combustion engine AND WHEREIN
- means is provided whereby, directly or indirectly (eg; via said crank shaft), power can be taken off said crank shaft as it rotates relative to said cylinder head means.

Preferably each said connection connects said piston control means to a pair of piston and cylinder assemblies, each piston and cylinder assembly of such a pair having a different head means (each of which in turn has its own said port means), and each said piston and cylinder assembly of such a pair having its said line projected from X the same angle on either side of a line projected normal from the crank shaft axis at X.

Preferably a cam is rotatable about said crank axis to control the motion of each valve.

Preferably said cam is indexed, directly or indirectly, to said crank shaft.

Preferably said indexing is by annular and planetary gearing.

Preferably the power take off is from said crankshaft and said gearing transmits the gearing increased torque to the cam to serve as a timing function.

Preferably the annular gear is carried by the cylinder head means, said planetary gears able to orbit about said shaft axis and providing the indexing of said cam with said cylinder means and having their rotatable axes fixed relative to said cam.

Preferably said engine operates as a diesel engine.

Preferably said engine operates as or as if a petrol engine.

In yet another aspect the present invention consists in an internal combustion engine having a crank shaft having a shaft axis and having a crank axis oblique to the shaft axis but aligned to intersect therewith at X, an array of piston and "cylinder" assemblies to rotate as assemblies relative to and about said shaft axis, each said assembly having a reciprocal axis between its top dead centre (TDC) and bottom dead centre (BDC), each such reciprocal axis midway between TDC and BDC being normal to a line projected from X, each said "cylinder" being of any appropriate cross section (with respect to its reciprocal axis) and the cross section of each complementary piston being complementary to the cross section of its cylinder, piston control means mounted to rotate about said crank axis, connection means for each piston from said piston control means, the connection between each said connection means and said piston control means and/or between each said connection means and its piston having sufficient degrees of freedom to allow the requisite reciprocal movement of said pistons within each associated cylinder thereof as the array of assemblies rotates relative to and about the shaft axis, cylinder head means which holds and/or defines the cylinders in said array, said head means including at least two ports per cylinder, and at least one inlet valve per cylinder actuable directly or indirectly with the relative rotation of said crank shaft to allow (timed to the reciprocal movement of each piston in its cylinder and to the rotational position of the cam) the induction of air into its corresponding cylinder and compression, power strokes of a two stroke combustion engine

AND WHEREIN means is provided whereby, directly or indirectly (eg; via said crank shaft), power can be taken off said crank shaft as it rotates relative to said cylinder head means.

Preferably said head providing means includes at least two ports per cylinder.

Preferably each said connection connects said piston control means to a pair of piston and cylinder assemblies, each piston and cylinder assembly of such a pair having a different head providing means (each of which in turn has its own said port means), and each said piston and cylinder assembly of such a pair having its said line projected from X the same angle on either side of a line projected normal from the crank shaft axis at X.

Preferably a cam is rotatable about said crank axis to control the motion of each valve.

Preferably said cam is indexed, directly or indirectly, with said each cylinder head means.

Preferably said indexing is by annular and planetary gearing.

Preferably the power take off is from said crankshaft and said gearing transmits the gearing increased torque to the cam to serve as a timing function.

Preferably the annular gear is carried by the cylinder head means, said planetary gears able to orbit about said shaft axis and providing the indexing of said cam with said cylinder head means and having their rotatable axes fixed relative to said cam.

In still a further aspect the present invention consists in an internal combustion engine having as at least part of an assembly, a shaft carrying a precessing crank, at least one combustion chamber each indexed at some rate to the relative rotation of said shaft yet port for two or four stroke cycle operation, at least one piston or other compression/driven type complementary member for said combustion chamber (hereinafter "piston") to orbit said precessing crank, each for a combustion chamber, a connection member to move each piston in its combustion chamber as required for said two or four stroke cycle operation, and a member or members (hereinafter "wobbling member(s)")mounted as if journalled directly or indirectly from said precessing crank (or equivalently thereto) and controlling the piston moving motion of each connection member as the assembly rotates, the power strokes of each piston via its said connection member, said wobble member(s), said crank and the indexing driving or driving from said output shaft.

In still a further aspect the present invention consists in an internal combustion engine comprising at least one shaft carrying a precessing crank, the crank axis intersecting obliquely the shaft axis or aligned shaft axes of said at least one shaft, at least one combustion chamber to orbit relative to said shaft axis of said at least one shaft at an indexed rate or a port member (hereinafter referred to), said combustion chamber(s) having at least one passageway to allow flow of fluids into and out of said combustion chamber, at least one compression member such as a piston (hereinafter "piston") to orbit relatively said crank axis and to act as the compression and/or driven member (eg. piston) of said combustion chamber(s), at least one member (hereinafter "wobbling member") mounted as if journalled directly or indirectly to said precessing crank so as to be able to rotate relative to and about said crank axis to thus wobble about the shaft(s) axis and controlling the motion of said piston (s), and at least one port or multiple port member (hereinafter "port member") over which said at least one opening rotates to provide at known intervals, (i) at least one opening for fluid to flow in to and/or out of each combustion chamber(s), and (ii) a closure to each said combustion chamber(s).

Preferably said precessing crank is carried between two precessing crank carrying members each forming part of or secured to opposed (in direction) output shafts positioned on a common axis, the central axis of precession of said precessing crank being coaxial with said axis of rotation of said output shafts, the intersection of said crank axis and said axis of rotation of said output shafts being between said precessing crank carrying members.

Preferably the axis of said wobbling member(s) extends through said intersection such that motion induced by said wobbling member(s) on said pistons is rotational only.

Preferably connection rods extend from the distal end of said wobbling member(s) to said at least one piston, said piston capable of rotating and translating relative to said wobbling member(s) to maintain a motion coaxial with it respective said combustion chamber(s).

Preferably said combustion chamber(s) is located inside a combustion chamber housing, said combustion chamber housing coupled to said output shaft(s) by at least one coupling means such that rotation of said at least output shaft(s) induces proportional rotation of said combustion chamber housing (or vice versa) about said axis of rotation of said output shaft(s) in the same or opposite rotational direction.

Preferably a plurality of wobbling members extend from said precessing crank. Each axis of said wobbling members extend through said intersection. Each wobbling member carries two connection rods extending in opposite directions. Said connection rods are journalled directly or indirectly to its respective said wobbling member, and are able to rotate relative thereto and able to translate along said wobbling member axis relative thereto.

Preferably said wobbling member has disposed therefrom and positioned on a plane normal to said crank axis and passing through said intersection, at least one piston substantially in the form of a segment of a disc, the circumferential edge of said at least one piston (during operation of said engine), tracing part of an imaginary sphere, said combustion chamber(s) defined at least by, (i) an outer casing defined by said imaginary sphere, (ii) said at least one port or multiple port member, (iii) radially extending walls, located adjacent the radial edges of said at least one piston, and (iv) said wobbling member.

Preferably said wobbling member is spherical in shape in at least that part defining said combustion chamber(s).

In still a further aspect the present invention consists in a fluid displacement/compression machine having as at least part of an assembly, an input shaft carrying a precessing crank, at least one compression chamber indexed at some rate to the rotation of said input shaft yet port for fluid displacement/compression, at least one piston or other compression/driven type complimentary member for said compression chamber (hereinafter "piston") to orbit said precessing crank, each for a compression chamber, a connection member to move each piston in its compression chamber as required for said fluid displacement/compression, and a wobbling member or members mounted as if journalled directly or indirectly from said precessing crank (or equivalently thereto) and controlling the piston moving motion of each connection member as the assembly rotates, the displacement/compression strokes of each piston via its said connection member, said wobble members and crank pin driven by said output shaft.

In yet a further aspect the present invention consists in a fluid displacement/compression machine comprising at least one input shaft carrying a precessing crank, the crank axis intersecting at an incline to the axis of rotation of said at least one input shaft, at least one compression chamber to orbit said axis of rotation of said at least one input shaft at a some rate relative to said input shaft(s) or said port member (hereinafter referred to) said compression chamber(s) having at least one passageway to allow flow of fluids in to and out of said compression chamber, at least one compression/displacement member such as a piston (hereinafter "piston") to orbit said crank axis and to act as the compression and/or driven member (eg. piston) of said compression chamber(s), at least one wobbling member mounted as if journalled directly or indirectly to said precessing crank so as to be able to rotate relative to said crank axis to wobble about the rotational axis of said input shaft(s) and controlling the motion of said piston(s), and at least one port or multiple port member (hereinafter "port member") over which said at least one opening rotates to provide at known intervals, (i) at least one opening for fluid to flow in to and/or out of each compression chamber(s), and (ii) a closure to each said compression chamber(s).

Preferably said precessing crank is carried between two precessing crank carrying members each forming part of or secured to opposed (in direction) input shafts positioned on a common axis, the central axis of precession of said precessing crank being co axial with said axis of rotation of said input shafts, the intersection of said crank axis and said axis of rotation of said input shafts being between said precessing crank carrying members.

Preferably the axis of said wobbling member(s) extends through said intersection such that motion induced by said wobbling member(s) on said pistons is rotational only.

Preferably connection rods extend from the distal end of said wobbling member(s) to said at least one piston, said piston capable of rotating and translating relative to said wobbling member(s) to maintain a motion coaxial with it respective said combustion chamber(s).

Preferably said compression chamber(s) is located inside a compression chamber housing, said compression chamber housing coupled to said input shaft(s) by at least one coupling means such that rotation of said at least input shaft(s) induces proportional rotation of said compression chamber housing (or vice versa) about said axis of rotation of said input shaft(s) in the same or opposite rotational direction.

Preferably a plurality of wobbling members extend from said precessing crank, each axis of said wobbling members extending through said intersection, each wobbling member carrying two connection rods extending in opposite directions, said connection rods journalled directly or indirectly to its respective said wobbling member, and able to rotate relative thereto and able to translate along said wobbling member axis relative thereto.

Preferably said wobbling member has disposed therefrom and positioned on a plane normal to said crank axis and passing through said intersection, at least one piston substantially in the form of a segment of a disc, the circumferential edge of said at least one piston (during operation of said engine), tracing part of an imaginary sphere, said compression chamber(s) defined at least by,
(i) an outer casing defined by said imaginary sphere,
(ii) said at least one port or multiple port member,
(iii) radially extending walls, located adjacent the radial edges of said at least one piston, and
(iv) said wobbling member.

Preferably said wobbling member is spherical in shape in at least that part defining said compression chamber(s).

BRIEF DESCRIPTION OF THE DRAWINGS

FIG. 5 illustrates the path traced by the crank axis from point X as shown in FIG. 2;

FIG. 6 illustrates the path traced by the crank axis through point X as shown in FIG. 2;

FIG. 7 illustrates the rotations and translations of the piston control means, crank axis, connection means and pistons in operation of the preferred form of the engine of the present invention shown in FIG. 1;

FIG. 31 is a plan view of the end member of FIG. 29 with which the port means is engaged and on which the preferred configuration of port means cooling is illustrated;

FIG. 32 is a sectional view through section 32—32 of FIG. 31;

FIG. 33 is a partial bottom view of the port means and end member of FIG. 28;

FIGS. 35a–35i illustrate a sequence of positions of cylinders relative to the port means of the engine of the preferred form of the invention shown in FIG. 1 wherein the crank is counter-rotating to the cylinders;

FIGS. 35Aa–35Ai illustrate a sequence of positions of cylinders relative to the port means of the engine of the preferred form of the invention shown in FIG. 1 wherein the crank is co-rotating to the cylinders FIGS. 36a–36i illustrate a sequence of positions of cylinders relative to the port means, in the operation of a cylinder/porting configuration of a similar engine shown in FIG. 1, having 5 pairs of opposing cylinders wherein the crank is co-rotating with the cylinders;

FIGS. 36Aa–36Ai illustrate a sequence of positions of cylinders relative to the port means, in the operation of a cylinder/porting configuration of a similar engine shown in FIG. 1, having 5 pairs of opposing cylinders wherein the crank is counter-rotating with the cylinders;

FIGS. 37a–37i illustrate a sequence of positions of cylinders relative to the port means of an alternative form of the engine of FIG. 1, wherein there are 7 pairs of opposing cylinders and wherein the crank is co-rotating with the cylinders;

FIGS. 37Aa–37Ai illustrate a sequence of positions of cylinders relative to the port means of an alternative form of the engine of FIG. 1, wherein there are 7 pairs of opposing cylinders and wherein the crank is counter-rotating with the cylinders;

FIGS. 43a–43i illustrate a sequence of positions of cylinder chambers relative to the ports during the operation of a six or three cylinder engine of an engine of the present invention shown in FIG. 41;

DETAILED DESCRIPTION OF THE PREFERRED EMBODIMENT

Figure 1:
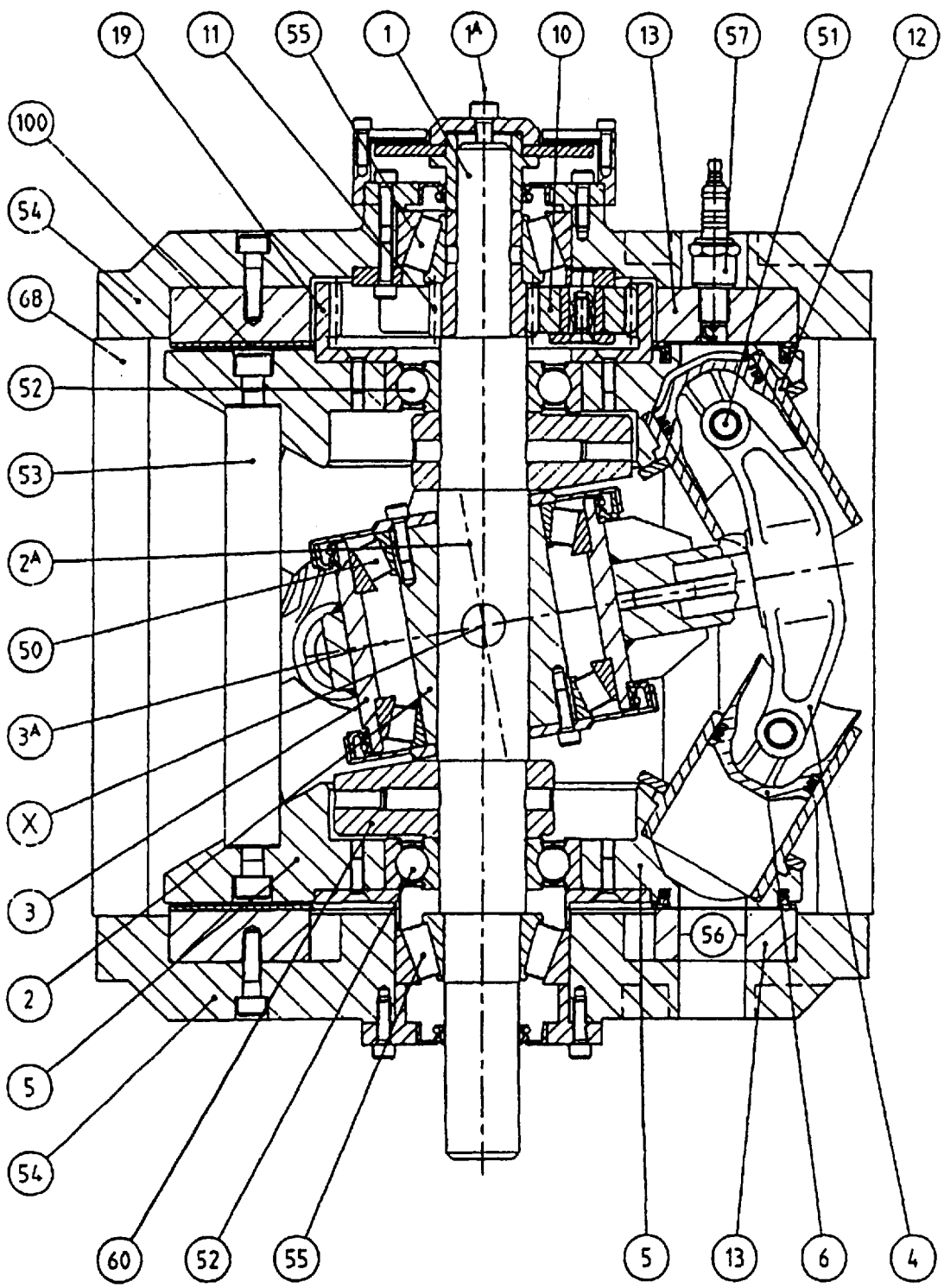
FIG. 1 is a sectional view through a preferred form of a six cylinder spark ignition engine of the present invention.

The most preferred form of the present invention which is herein described in detail is a combustion engine having three pairs of opposing pistons. The engine is shown in cross section in FIG. 1, and various details of its components and operation described are illustrated in FIGS. 2–33. In the most preferred form of the invention, the engine as shown in FIG. 1, consists of a shaft 1 which extends substantially all the way through the engine which carries a crank shaft 2, having a crank axis $2^A$ oblique to the shaft axis $1^A$. The angle between the shaft axis $1^A$ and the crank axis $2^A$ will herein be described and referred to as the crank angle. Although herein described is a shaft which is a separate member to the crank shaft, the entire crank shaft/shaft arrangement may be of one part (ie the crank shaft).

The rotation of the shaft 1 about its shaft axis $1^A$ will rotate the crank shaft 2 about the shaft axis $1^A$. FIG. 6 illustrates the path traced by the crank axis $2^A$ about the shaft axis $1^A$. At point X, where the crank axis $2^A$ and shaft axis $1^A$ intersect, there is no relative motion of the crank axis $2^A$ to the shaft axis $1^A$.

Carried by the crank shaft 2 and able to rotate about the crank axis $2^A$ is a piston control means 3. Most preferably the piston control means 3 is rotatably mounted from the crank shaft 2 by tapered roller bearings 50. Preferably such bearings are located at each end of the crank shaft so as to axially locate the piston control means 3 to the crank shaft 2. The bearings further ensure that the piston control means plane of rotation $3^A$ remains at substantially 90° relative to the crank axis $2^A$. Although undesirable, it is possible for this invention to be performed when the piston control means plane of rotation $3^A$ and the crank axis $2^A$ are not at 90° to each other.

The piston control means 3 controls the reciprocal motion of three pairs of opposed pistons 6. It has been envisaged that any number of pairs of opposed pistons can be utilised in an engine of this invention, and brief details of such are discussed hereafter. Pistons 6 are located at the distal ends of connection rod 4 which are disposed from and at the perimeter of the piston control means 3. In the preferred form of the present invention, three connection rods 4 are disposed from and at the perimeter of the piston control means at 120° intervals. Each connection rod 4 is located and is of a shape to be symmetrical about the piston control means plane of rotation $3^A$, however this need not be essential, and an asymmetric connection rod 4 with changes to the associated geometry, may be used in this engine.

The pistons may be of any cross section with respect to its reciprocal axis, however in the preferred form of the present invention, the pistons have been illustrated as having a circular cross section.

Each piston is able to reciprocate inside of a complementary cylinder 12.

The cylinders 12 are mounted in cylinder head means 5 which holds the cylinders 12 in a complementary array to the pistons. The cylinders may be made of one unitary member as part of the cylinder head means 5 by, for example, casting and machining, or as in the preferred form of individual parts.

In a most preferred form the engine has two cylinder head means, one for each set of opposed pistons.

Each cylinder head means 5 and cylinders 12 are able to rotate about the shaft axis $1^A$ and are equispaced from point X as shown in FIG 1. The use of cylinder head means bearings 52 between the cylinder head means 5 and shaft 1, provides a suitable means of allowing such rotation. Preferably such bearings are ball bearings, however other suitable forms of bearing may be used.

The rotation of each of the two cylinder head means 5 about the shaft axis $1^A$ is synchronous. Such synchronous rotation is in the preferred form achieved by the use of cylinder head means connectors 53. Such cylinder head means connectors 53 are secured at their distal ends to each of the cylinder head means 5 by a suitable fastening means such as a bolt or machine screw. In the preferred form there are three cylinder head means connectors 53, however a person skilled in the art will realise that any number of such connectors 53 or other configurations thereof, will ensure synchronous rotation of the two cylinder head providing means 5.

Located adjacent each cylinder head means 5 are port means 13, which in the preferred form of the invention shown in FIG. 1, also carry spark plugs 57 for the ignition of fuel in the cylinders 12 at appropriate times.

The port means 13 are each located by end members 54. Each end member 54 locates the shaft 1 by the use of end member bearings 55 having an axis of rotation coaxial with the shaft 1. The bearings allow rotation of the shaft 1 to the end members 54. Preferably the bearings 55 are tapered roller bearing, which are able to bear against both radial and axial forces.

Each of the port means provide porting for the inlet of fuel into each cylinder and co outlet of combusted gases out of each cylinder. The location of the ports in the port means 13 and end members 54 allow the in-flow of fuel during the induction stroke of each piston, and outlet of exhaust gases during the exhaust stroke of each of the pistons of a four-stroke engine. Additionally the port means locates at appropriate intervals spark plugs for the ignition of the fuel when the piston is at or near top dead centre. The rotation of the cylinder head means relative to the port means about the shaft axis $1^A$ allows for the ports and spark plugs 57 to be presented to each cylinder in the appropriate sequence.

A rotational relationship between the cylinder head means 5 and the shaft 1 is achieved by the use of gears. In the preferred form one of the cylinder head means carries an annular gear 19. This gear 19 engages with planet gears 10 which are associated with their adjacent end member 54. They are rotatable about their axes to index the rotation of the cylinder head means 5 and the shaft gearing 11.

The expansion force produced by the combustion of fuel in a cylinder 12 is transferred from the pistons 6 through the connection rods 4 to the piston control means 3. This moment about point X provides a moment to the crank shaft 2. Such a moment applied to the crank shaft 2 causes a rotational displacement thereof about the shaft axis and causes the shaft to rotate correspondingly.

Each of the port means 13 have therein ports for the inlet and outlet of fuel to and from the cylinders 12. Such ports are arranged on a pitch circle diameter from the shaft axis $1^A$ and align with the openings to each cylinder over a specific range of angular rotations of the cylinder head means 5. As the shaft 1 rotates as a result of the force on the crank shaft 2, the rotating motion is transferred via the planet gears 10 to the cylinder head means 5. When the shaft 1 rotates the cylinder head means 5 orbits about the shaft axis $1^A$. The orbiting of the cylinder head means 5 about the shaft axis $1^A$ causes the openings to each cylinder to 1) align with the inlet/outlet ports during certain ranges of orbital positions of each cylinder and 2) to be closed during other ranges of rotation. The rotational positions of the cylinder head means relative to the port means for a four stroke engine are such that:

(a) fuel mixture is able to be induced (or blown) into the cylinder 12 through inlet ports during the downward or expansion stroke of the piston 6, (b) fuel mixture is able to be compressed during the upward or compression stroke of the piston 6 (and also injected for diesel operated engines), (c) combusting fuel mixture is able to be ignited and expand inside the cylinder 12 forcing the piston 6 downward during the power stroke, (d) exhaust fluids are able to be expelled from the cylinder 12 through exhaust ports 8 during the upward or exhaust stroke of the piston 6, In the preferred form of engine as shown in FIG. 1 the planet gears 10 induces a rotation in the cylinder head means 5 in an opposite direction to the rotation of the shaft 1.

However, with an alternative arrangement of the planet gears and annular gear, wherein the annular gear is carried by the port means 13 and the planet gears are carried by the cylinder head means 5, co-rotation of the shaft 1 and the cylinders/cylinder head means and pistons will be achieved.

Illustrated in FIG. 35 is a sequence showing the alignments of the cylinder openings 12' in the cylinder head means 5' relative to the inlet/outlet ports of the port means 13'. It illustrates the engine of FIG. 1 wherein the crank shaft is counter rotating to the cylinders, at a rotation of 3:1, proving 4 power strokes per revolution of the crank shaft.

The arrow C indicated in FIG. 35 is the direction of rotation of the crank, and the arrow TDC is the top dead centre position of the crank.

In following around cylinder opening 12', it can be seen that at top dead centre the cylinder 12' is exposed partially to both inlet port 15' and exhaust port 8' in the port means 13'. At top dead centre the exhaust fluids have all substantially been expelled from the cylinder 12'. Immediately after the piston 6' reaching top dead centre fuel mixture is induced (or blown) into the cylinder 12' through inlet port 15'. As the piston travels downwardly from the top dead centre position the cylinder 12' become fully aligned with the inlet port 15' (intake 90°).

At substantially bottom dead centre, the cylinder 12' becomes fully sealed by the port means and as the piston 6' travels through bottom dead centre the fuel inside the cylinder 12' starts to compress.

As the piston 6' travels towards top dead centre, the fuel mixture is ignited. For engines utilising petrol as a fuel, such ignition is initiated by the sparking of a spark plug. However fuels such as diesel will ignite due to their compression, and therefore no ignition initiating means is required. This alternative mode of operation is hereafter described in more detail.

As the piston 6' travels from top dead centre to bottom dead centre as a result of the combustion of the fuel mixture, power is transferred to the shaft via the connection means 3 and crank shaft 2. As the piston 6' reaches bottom dead centre, the cylinder chamber 12' becomes aligned with a second exhaust port 8' located in the port means 13. As the piston passes through bottom dead centre, and returns to top dead centre, exhaust fluids are able to be expelled out through outlet port 8'. Thereafter the sequence repeats for the next compression, power, exhaust, and induction strokes. The positioning of the inlet and outlet ports and spark plugs on the port means, and the indexing of the head means to the shaft 1 and port means 13 results in the openings to the cylinders 12 to be aligned with the appropriate ports and spark plugs at the appropriate axial positions of each of the pistons relative to the cylinders. As the engine of the preferred form of the invention is double acting, the ports and spark plugs of the two port means are not aligned with one another ie when one of a pair of pistons is travelling in its power stroke, the other of the pair of pistons will most preferably be in its exhaust stroke. Alternatively, whilst one of the pair of pistons is going through its power stroke, the other of the pair of pistons may be in its compression stroke. Table 1 below illustrates the alternatives to the strokes through which a pair of pistons of a four stroke engine may be travelling.

TABLE 1

| STROKE OF FIRST CYLINDER OF PAIR | STROKE OF SECOND CYLINDER OF PAIR | ALTERNATIVE STROKE OF SECOND CYLINDER OF PAIR |
| --- | --- | --- |
| POWER | EXHAUST | COMPRESSION |
| EXHAUST | INTAKE | POWER |
| INTAKE | COMPRESSION | EXHAUST |
| COMPRESSION | POWER | INTAKE |

FIG. 35A is an engine of FIG. 1 wherein the crank and the cylinders are co-rotating. As a result, the crank to cylinder gearing ratio of 9:1 and the 4 inlet and 4 outlet ports per end member, 2.7 power strokes per revolution of the crank result.

Figure 2:
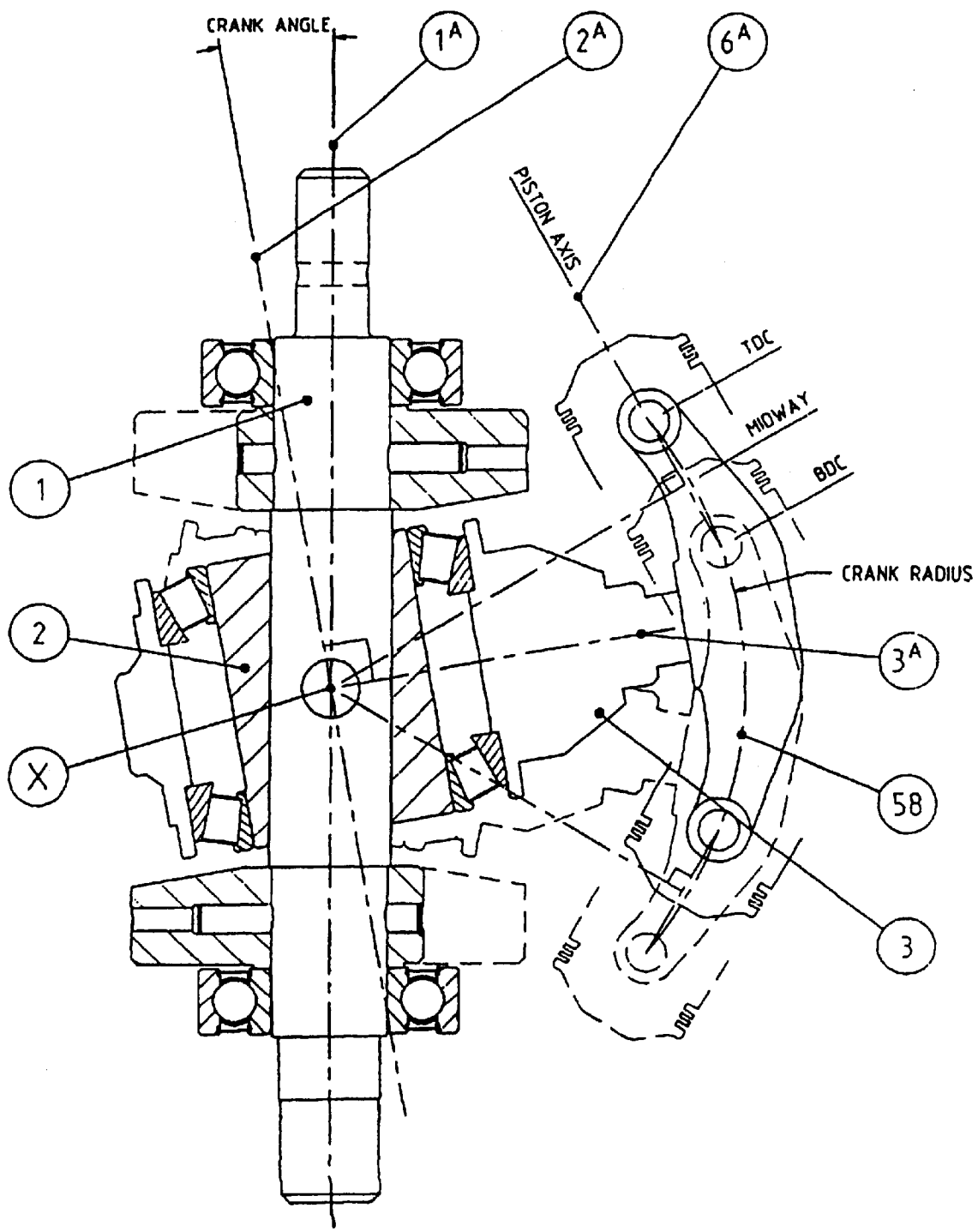
FIG. 2 is a partially cross-sectioned, partially schematic representation of part of the engine illustrated in FIG. 1 detailing some of the essential geometry.

FIG. 2 illustrates part of the engine of FIG. 1, and shows the oblique angle (crank angle) between the crank shaft axis $2^A$ and shaft axis $1^A$. The plane of rotation of the piston control means 3 is defined by the plane $3^A$ which is normal to the crank shaft axis $2^A$. The rotation of the crank shaft 2 about the shaft axis $1^A$ causes the distal ends of the piston control means 3 to follow a locus of an arc of centroid at point X. The crank radius 58 is the radius of the gudgeon pins connecting the connection rods 4 to the pistons 6, when at top dead centre and bottom dead centre, from point X. As the reciprocation of the pistons inside of the cylinders is along a linear axis (the piston axis $6^A$) there exists a slight degree of difference in the path followed by each piston between top dead-centre and bottom dead-centre and the crank radius 58. This difference is compensated for by allowing the connection rods to move radially relative to the piston control means along the piston control means plane of rotation $3^A$. The path difference is minimised by ensuring that the normal to the piston axis at midway between top dead-centre and bottom dead-centre of each piston, passes through the intersection of the crank shaft axis $2^A$ and shaft axis $1^A$ at point X shown in FIG. 2.

Figure 3:
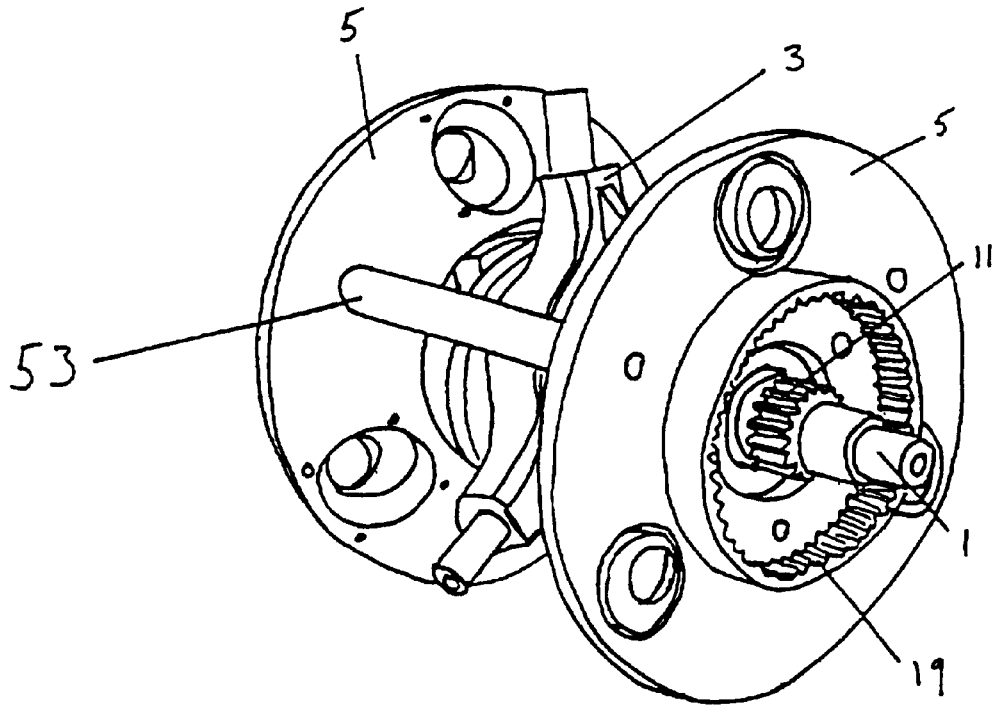
FIG. 3 is a perspective view of some of the components of the internal assembly of the engine of FIG. 1, including the two cylinder head means, piston control means, shaft and associated gearing.
Figure 4:
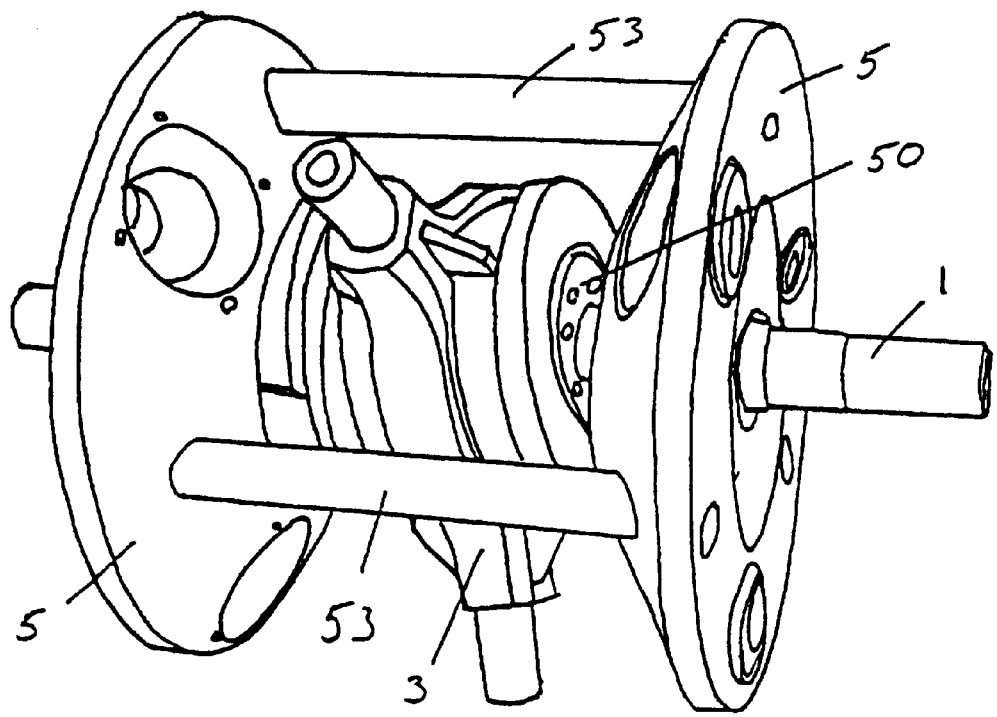
FIG. 4 is a perspective view of some of the components of the internal assembly of the engine of FIG. 1, including the two cylinder head means, piston control means, and shaft.

FIGS. 3 and 4 are perspective views of the internal components of the engine of FIG. 1, where the cylinders 12 have not been represented. Annular gear 19 is secured to one of the cylinder head means 5 by use of a suitable fastening means such as bolts or machine screws. It is located at only one of the cylinder head means 5. In the most preferred form the annular gear 19 has square-cut teeth, however it is envisaged that helical, or double helical gears will also be suitable. The annular gear 19 is positioned on the cylinder head means 5 such that its centre coincides with the shaft axis $1^A$.

Figure 24:
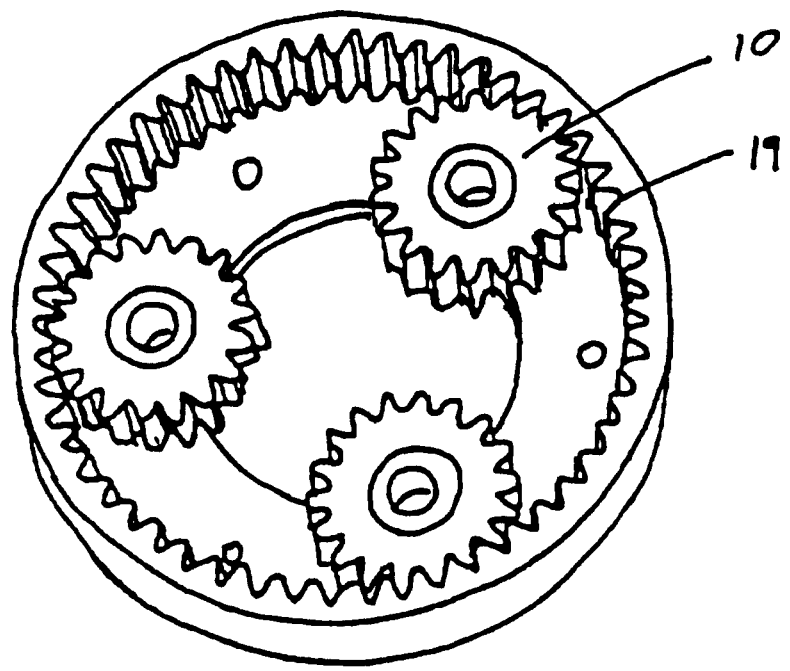
FIG. 24 is a perspective view illustrating the engagement of the planet gears with the annular gear of the engine of the preferred form of the invention shown in FIG. 1.

FIG. 24 is a perspective view of the annular gear 19 associated with complementary cut planet gears 10. The planet gears are held in a fixed relationship to each other by the use of a ring 59 and planet gear mounting plate 86 which hold the axis of rotation of each of the planet gears in a fixed relationship.

Figure 25:
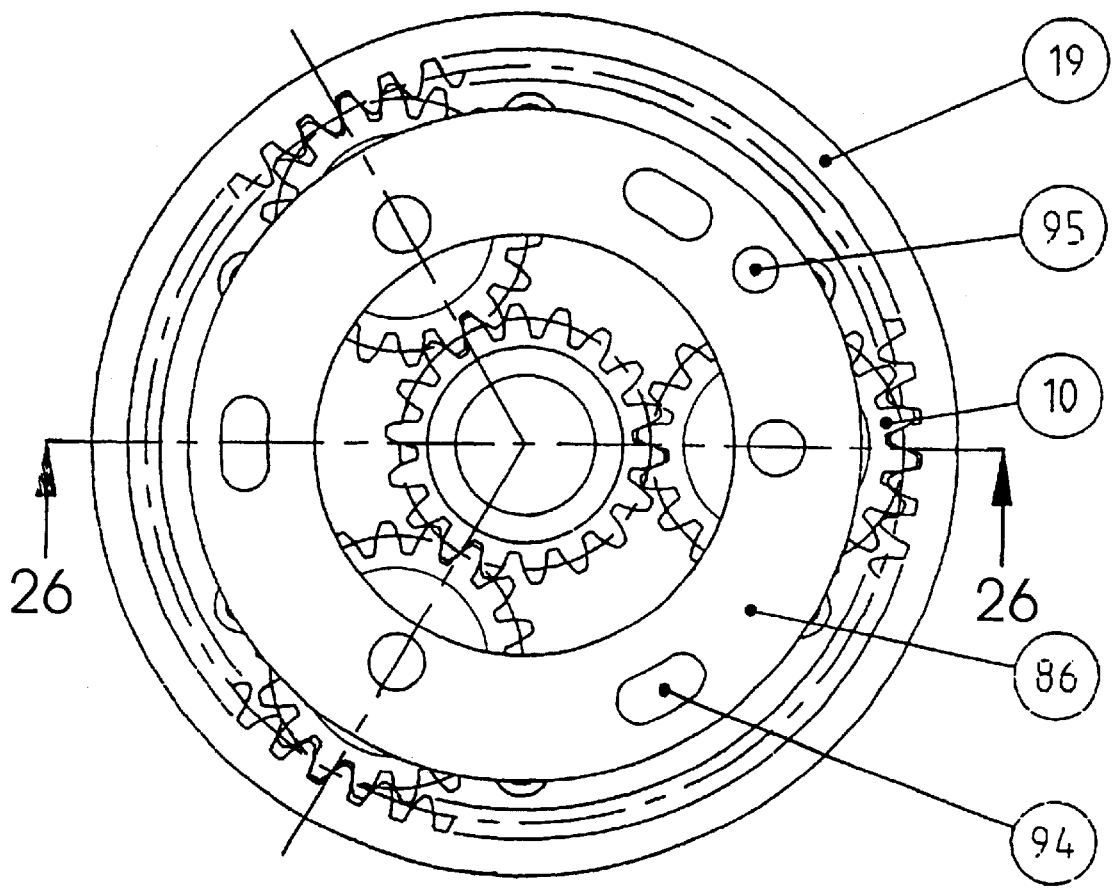
FIG. 25 is a plan view illustrating in part the gear teeth of the annular gear, planet gears and shaft gear.

FIG. 25 is a plan view of the annular gear 19, planet gears 10, ring 59 and shaft gear 11. Although in the preferred form of the present invention, three planet gears 10 are used, a person skilled in the art will realise that any number of such planet gears disposed between the annular gear 19 and shaft gear 11 can be used. The axes of the planet gears are held stationary relative to the port means 13 and end member 54. This is achieved by the fixing of the mounting plate 86 to the end member 54 by several fastening means such as screws, bolts or machine screws. When the planet gears 10 are held stationary, a clock-wise rotation of the annular gear 19 will result in an anti-clockwise rotation of the shaft gearing 11. It is envisaged that although in the present form of the invention with its preferred gearing arrangement, the end members are held stationary, alternative forms of the present invention may have a stationary shaft 1 or stationary cylinder head means 5. In such configurations relative rotation of the shaft 1, end members and port means, and cylinder head means are as shown in Table 2 below.

TABLE 2

| Clockwise Output from | shaft axis rotation | cylinder head rotation | port means rotation |
|---|---|---|---|
| shaft axis | clockwise | anticlockwise | fixed |
|  | clockwise | fixed | clockwise |
| cylinder head | anticlockwise | clockwise | fixed |
|  | fixed | clockwise | clockwise |
| port means | fixed | clockwise | clockwise |
|  | clockwise | fixed | clockwise |

When the cylinder head means 5 and the shaft 1 are co-rotating, by the appropriate arrangement of the annular gear and planet gears, the relative rotations of the shaft 1, end members and port means, and cylinder head means are shown as in Table 3 below.

TABLE 3

| Clockwise Output from | shaft axis rotation | cylinder head rotation | port means rotation |
|---|---|---|---|
| shaft axis | clockwise | clockwise | fixed |
|  | clockwise | fixed | anticlockwise |

TABLE 3-continued

| Clockwise Output from | shaft axis rotation | cylinder head rotation | port means rotation |
|---|---|---|---|
| cylinder head | clockwise | clockwise | fixed |
|  | fixed | clockwise | clockwise |
| port means | fixed | clockwise | clockwise |
|  | anticlockwise | fixed | clockwise |

Figure 49:
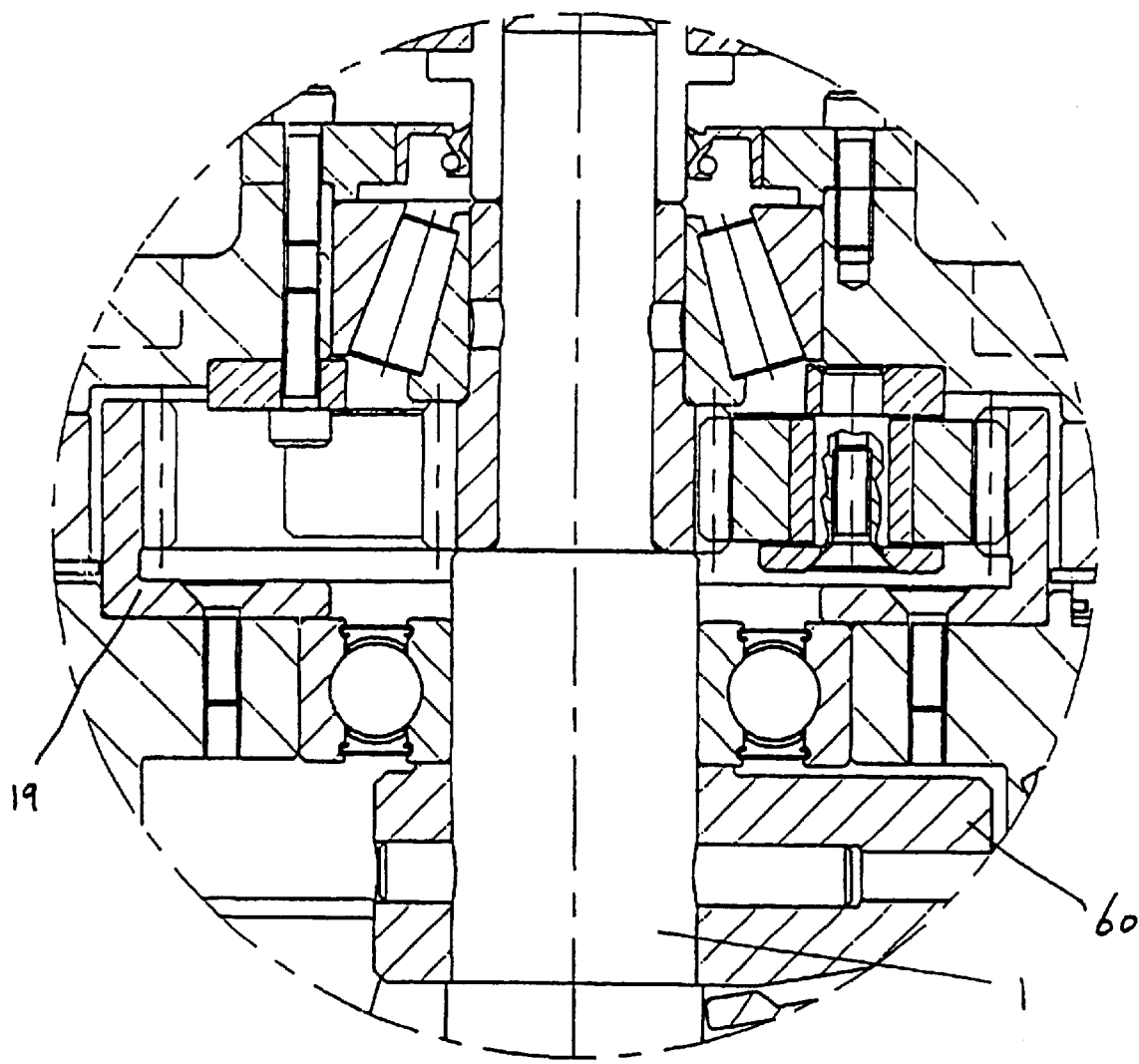
FIG. 49 is a more detailed view of that part of FIG. 1 about the annular gear.

FIG. 49 is an enlarged view of the region of FIG. 1 about the annular gear and bearings.

Figure 26:
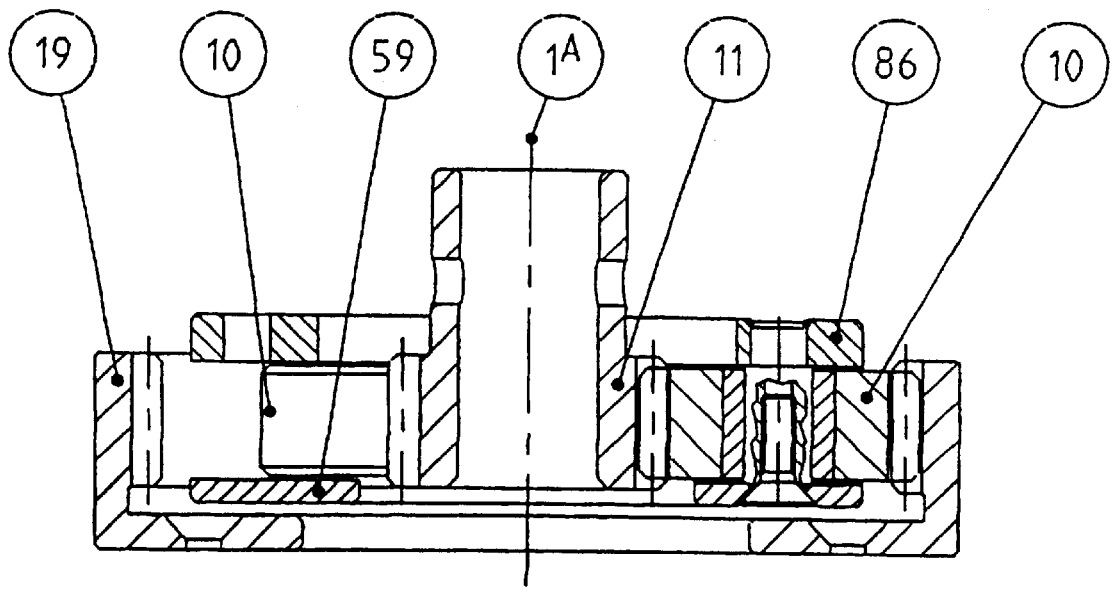
FIG. 26 is a sectional view through section 26—26 of FIG. 25.
Figure 27:
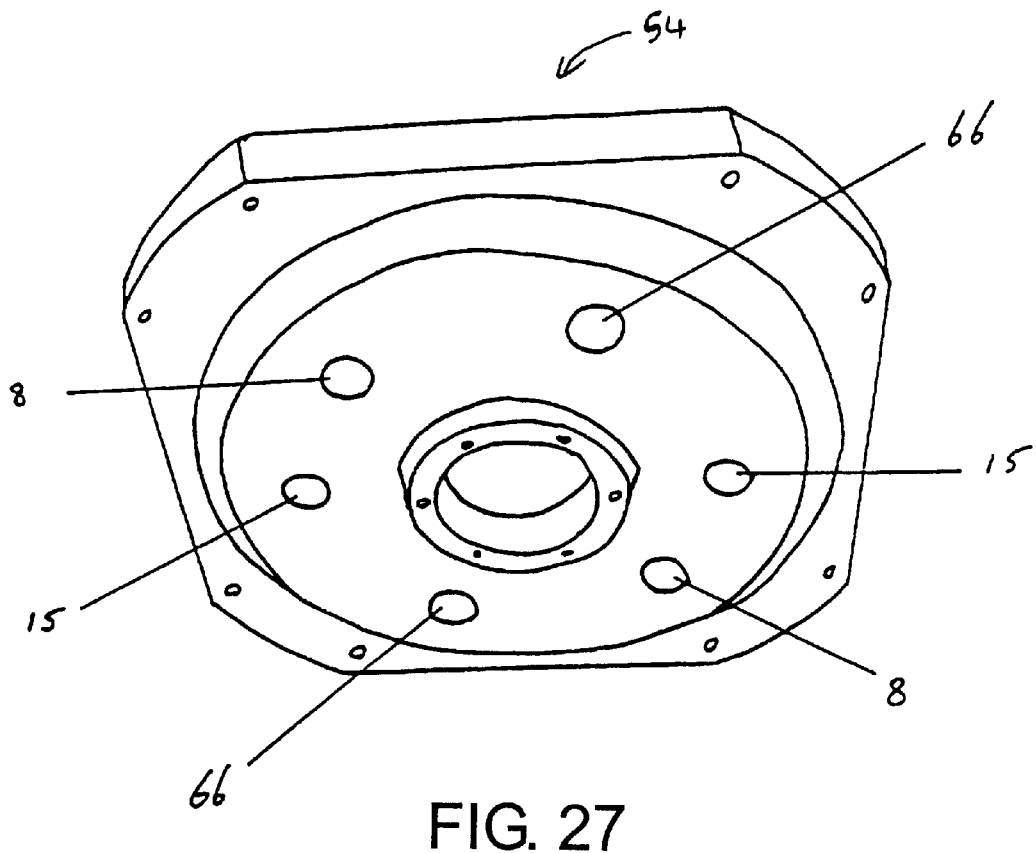
FIG. 27 is a perspective view of an end member of the engine of the preferred form of the invention of FIG. 1.

FIG. 26 is a sectional view through line 26—26 of FIG. 25. Most preferably the shaft gear 11 has a sleeve type arrangement to allow it to fit over the shaft 1. To ensure that the shaft gear is rotatably secured to the shaft 1, a pin, spline or key way type engagement is preferable. A person skilled in the art will however realise that many other methods of securing and/or presenting a shaft gear from the shaft are available. For instance the gear may be cut as part of the shaft or shrink fitted thereto, but as it is preferably for the gear to be hardened it is a separate gear.

Figure 12:
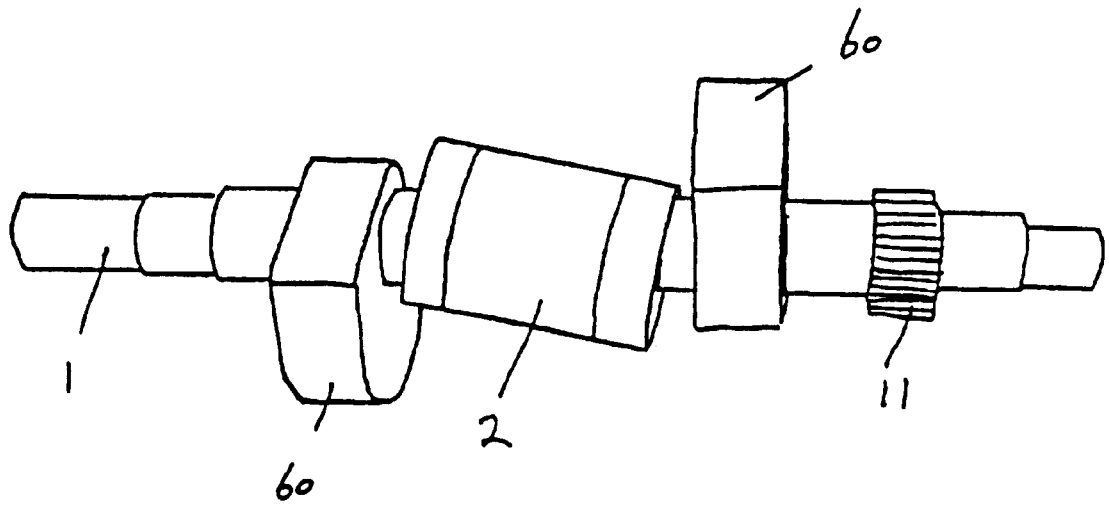
FIGS. 12 and 13 are perspective views of a crank shaft, shaft and balancing masses of FIG. 1.
Figure 13:
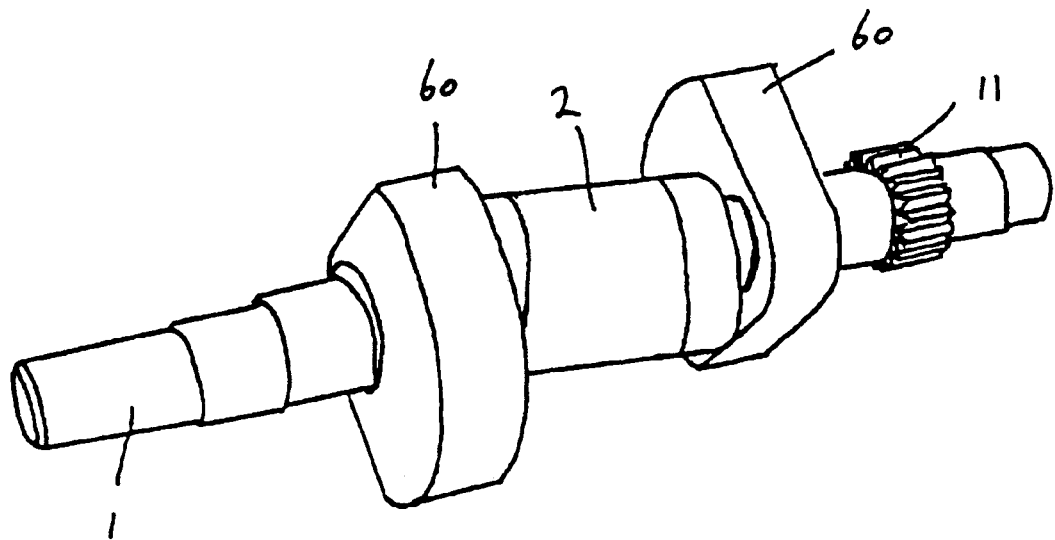

FIGS. 12 and 13 are perspective views of the shaft 1 and shaft gear 11, crank shaft 2 and balancing masses 60. The shaft 1 is most preferably made from medium tensile steel and is of a stepped diameter, the largest of which is in the middle, to allow the crank shaft 2, balancing masses 60, shaft gearing 11 and shaft bearings to be slidably located on the shaft 1.

The crank shaft 2 is of circular cross section having a bore oblique to the crank axis $2^A$. The bore corresponds to that part of the shaft 1 at which the crank shaft 2 is to be located. The centre line of the bore intersects the crank shaft axis $2^A$ most preferably at the centroid of the crank shaft.

The crank shaft 2 is secured to the shaft 1 by the use of dowel pin. Alternatively the crank shaft may be secured to the shaft 1 by the use of splines, key ways or shrink fitting, or all such methods. Alternatively the crank shaft may be formed by machining the shaft 1. Balancing masses 60 are secured to the shaft 1 to ensure that during the operation of the engine, the out of balance forces of the rotating and reciprocating mass of parts are minimal. The balancing masses 60 are most preferably made of medium tensile steel and are secured to the shaft 1 by the use of dowel pins. Again alternative forms, as before described, of securing such masses may be used. Because the motion of the reciprocating parts is sinusoidal, ie simple harmonic motion, only primary out of balance forces are generated. This implies that the two balancing masses can theoretically balance such out of balance masses, leaving no residual out of balance force. A simple, calculation of the out of balance forces on the shaft 1 during the operation of the engine would determine the location, shape and size of the balancing masses 60 which are suitable.

Alternatively the crank shaft and shaft may be forged from a one piece billet of suitable grade of steel.

Mounted from the crank shaft 2 is the piston control means 3. The piston control means 3 is rotatable about the crank axis $2^A$ by the use of bearings 50. As illustrated in FIG. 1, the bearings 50 are tapered roller bearings. Alternatively, ball bearings may be utilised, but due to the moments which are created by the reciprocating motion of the pistons, it is desirable that the bearings are able to bear a thrust component of force. Two tapered roller bearings 50 are secured to the ends of the crank shaft 2, as shown in FIG. 1. The piston control means 3 includes a piston control means collar 61 or ring as shown in FIG. 14 having an inside bore, able to engage with the outer race of the tapered roller bearings 50.

This ensures that the piston control means is axially restrained from moving relative to the crank shaft. Annular thrust plates 73 locate onto the crank shaft by use of machine screws to locate the bearings axially thereto.

Radially extending from the piston control means collar 61 are piston control means arms 62. The number of arms 62 of the piston control means correspond to the number of pairs of pistons 6 used in the engine.

Figure 14:
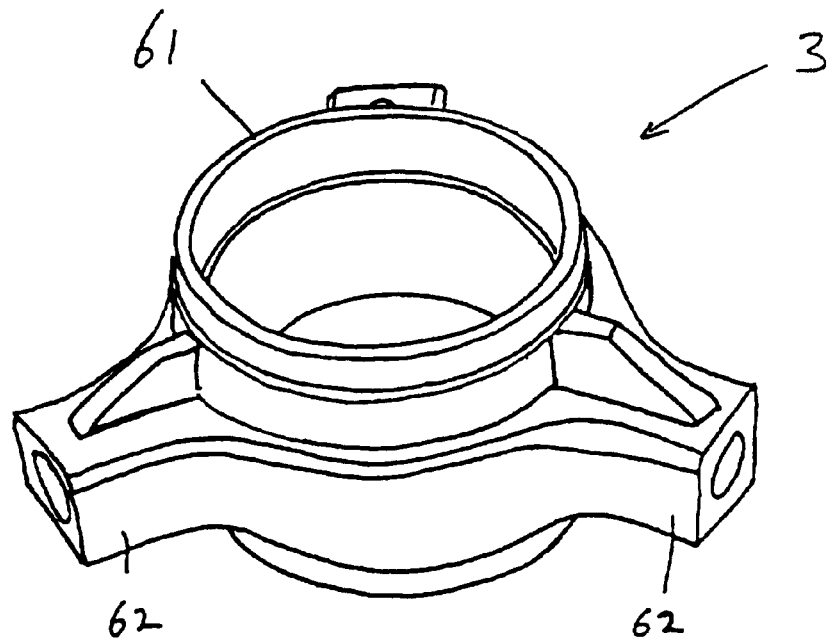
FIG. 14 is a perspective view of the piston control means of the engine of the preferred form of the invention shown in FIG. 1.
Figure 15:
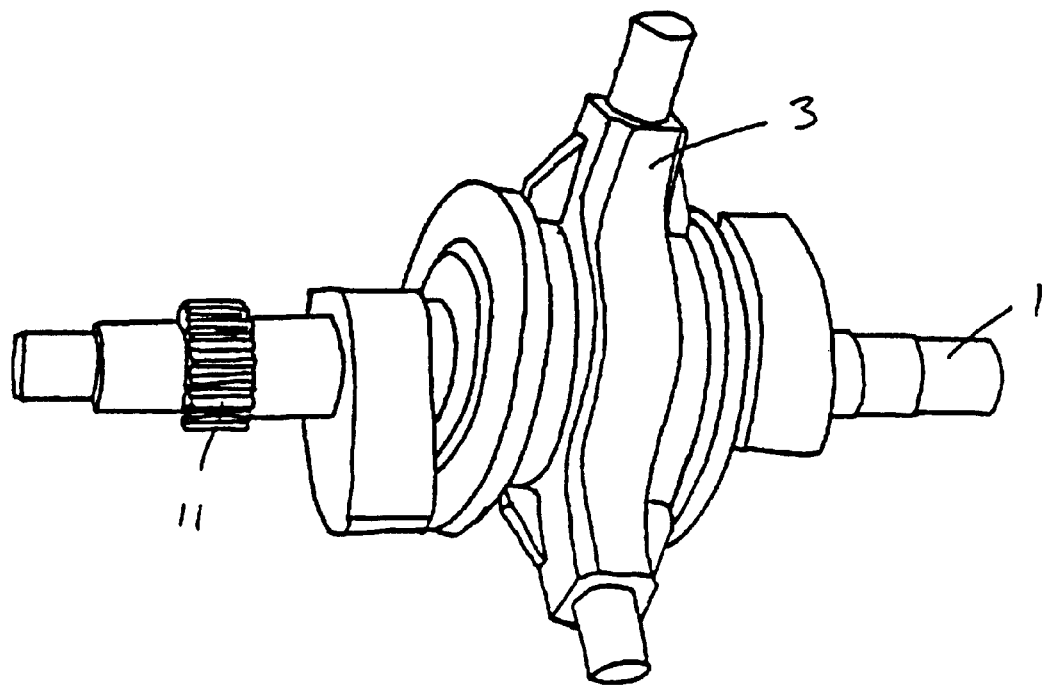
FIG. 15 is a perspective view of the piston control means as mounted on the crank shaft.

The piston control means may be of any shape and does not necessarily need to present arms as shown in FIG. 14. Alternatively the piston control means may be a disc to which at its circumference, connection means are able to be located.

Figure 16:
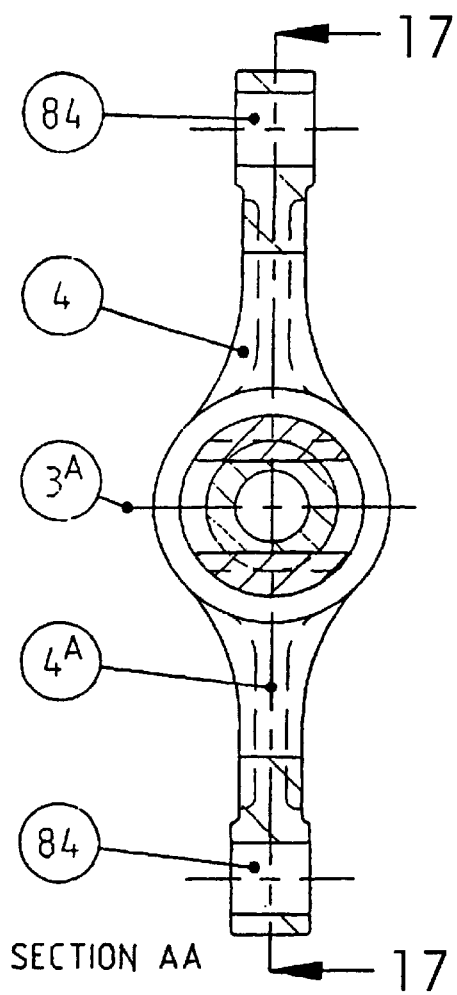
FIG. 16 is an end view of a connection means of an engine of the preferred form of the invention shown in FIG. 1, the connection means illustrated having two translational and one rotational degree of freedom.

Connected to the distal ends of the arms 62 of the piston control means 3 are connections rods. FIG. 16 illustrates the end view of a connection rods 4. In the most preferred form one connection rods 4 is located at the distal ends of each of the arms 62, and each control a pair of opposing pistons. It is however envisaged that this engine may operate in a single acting mode, wherein each connection rod would control only one piston. However, in the most preferred form the engine is double acting, as in this mode of operation the out of balance forces and moments are more easily balanced. Furthermore the construction of the embodiment of the engine is not much less complex for a single acting cylinder arrangement compared to a double acting cylinder arrangement of twice the capacity.

Each piston is connected to a distal end of a connection rod 4 by the use of a standard gudgeon pin type arrangement, which extends through the gudgeon pin hole 84 in the connection rod.

Figure 17:
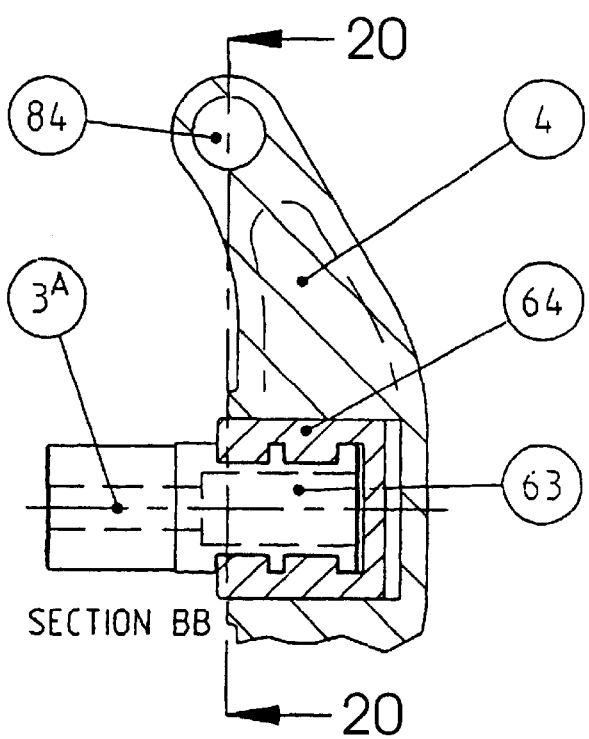
FIG. 17 is a sectional view of part of the connection means taken along line 17—17 of FIG. 16.

The connections rods 4 are connected to the piston control means 3 by a connection means pin 63. The pin 63 is preferably press fitted into a hole in the piston control means, but may alternatively be a part thereof. The connection rod pin 63 is located in a bush 64 which locates inside a bore of the connection rod 4, as shown in FIG. 17. Due to the alignment of the cylinder axis with the shaft axis, the shaft axis $1^A$ coincides with the plane of symmetry $4^A$ of the connection rods 4 shown in FIG. 16.

Figure 20:
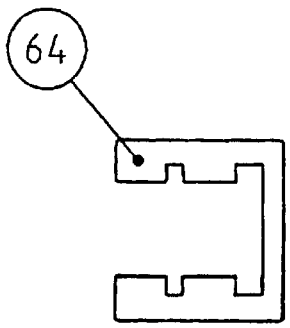
FIG. 20 is a cross-sectional view of the connection means taken along line 20—20 bush shown in FIG. 17.

As a result of the rotation of the pistons about both the crank shaft axis $2^A$ and shaft axis $1^A$, the connection rods 4 carrying the pistons needs to be rotatable relative to the piston control means 3 about the piston control means plane of rotation $3^A$. The connection means bush 64 shown in FIGS. 17 and 20 provides for this rotational degree of freedom of the connection rods 4 about the piston control means plane of rotation $3^A$. Many alternative means of achieving such relative rotation between the connection rods 4 and piston control means 3 have been envisaged. Such include the use of roller or ball bearings, located at the piston control means or located anywhere along the piston control means arms 62. Alternatively a hinging type arrangement may be utilised as part of the connection rods 4, having a pivoting axis to allow relative movement to the connection rods 4.

As the displacement of the pistons inside of and relative to the cylinders is linear, but the rotation of the crank shaft $2^A$ about the shaft $1^A$ causes the locus (relative to the cylinder) of the piston control means to be an arc having a centroid at point X (shown in FIG. 2), a second degree of freedom of the connection rods 4 relative to the piston control means 3 is essential. This second degree of freedom is also provided for by the connection rods bush. The bush is able to slide backwards and forwards inside of the bore of the connections rods 4, along the piston control means plane of rotation $3^A$ The degree of difference in the path of each piston inside the cylinder and the locus of the piston control means has been minimised by positioning the gudgeon pin at a distance from the piston control means plane of rotation $3^A$ such that at midway on the line between top dead centre and bottom dead centre of the gudgeon pin, the normal thereto intersects at point X (the intersection of the crank shaft axis $2^A$ and shaft axis $1^A$) as shown in FIG. 2. In the most preferred form the connection rods 4 are symmetrical about the piston control means plane of rotation $3^A$ and to this extent the essential geometry of the cylinder head means and cylinders are substantially symmetrical about the axis normal to the shaft axis $1^A$.

Figure 18:
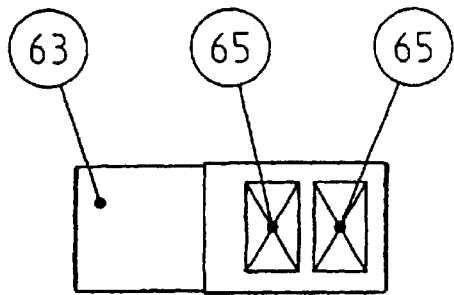
FIG. 18 is a top view of the connection means pin for the attachment of the connection means to the piston control means.
Figure 19:
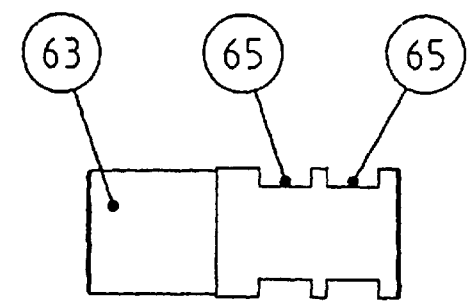
FIG. 19 is a side view of the connection means pin of FIG. 18.

The rotation of the pistons about the crank shaft axis $2^A$ and its rotation about the shaft axis $1^A$ causes yet a further difference in relative displacement of the piston control means to of each respective cylinder. The difference is due to the non-synchronous wobbling like rotation of the piston control means 3 about the crank shaft axis $2^A$ and the cylinder head means 5 about the shaft axis $1^A$ when viewed from the direction of the shaft axis $1^A$. As the pistons rotate synchronously with the cylinder head means 5, the non-synchronous rotation of the piston control means 3 to pistons 6 needs to be absorbed somewhere therebetween. In the most preferred form this difference in rotation is compensated for by the connection rod bush 64. The bush provides a third degree of freedom to the connection means in a direction of the piston control means plane of rotation $3^A$. However to ensure there is some positive association of the connection means grow the cylinder head means, one of the connection rods does not have this third degree of freedom relative to the piston control means 3. The piston control means arm extending to the connection rods 4 having only two degrees of freedom, does rotate synchronously with the cylinder head means. The third degree of freedom in the other two connection rods is achieved by the connection rod bush 64 and connection means pin 63. FIGS. 18 and 19 illustrate the connection rod pin 63, having therein slots or reliefs 65. The connection rod bush 64 as shown in FIG. 20 has ridges complementary to the connection means pin slots 65. FIG. 17 shows the relationship of the connection rod pin 63 and connection rod bush 64 when located inside of the connection rods 4. The slots 65 allow for the connection means to translate relative to the piston control means 3 in a plane parallel to the rotational plane of the cylinder head means 5.

The third degree of freedom may alternatively be provided in the gudgeon pins of the connection rods 4, however in the most preferred form it was found to be more effective to have this third degree of freedom provided for at the connection rod pins 63.

Alternatively, the piston control means arms may be pivotable at a pivot away from their distal ends, who's axis is parallel to the crank shaft axis. To ensure transmission of power from the pistons, one of such arms would be fixed and non-pivotable, and the other two would be pivotable, for a six cylinder opposed pair engine.

Most preferably the connection rods 4 are made from high tensile aluminium which is either cast and machined, or machined. They may alternatively be fabricated. The connection rod bushes are most preferably made from sinted bronze or bronze and similarly the connection rod pins 63 are of chromium steel having a high surface finish.

Figure 8:
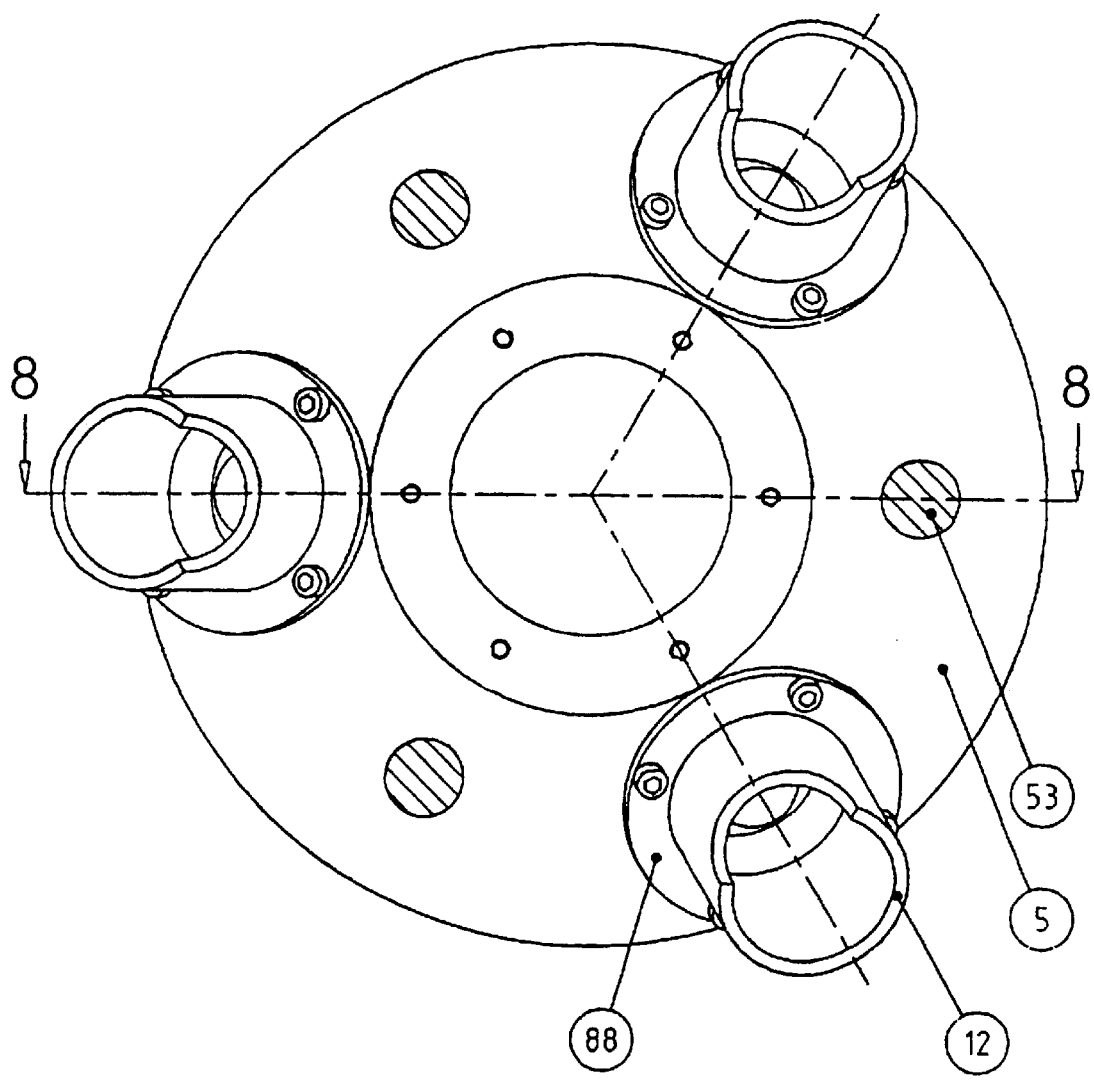
FIG. 8 is a plan view of the cylinder head means, and associated cylinders of the engine of the preferred form of the invention shown in FIG. 1.
Figure 9:
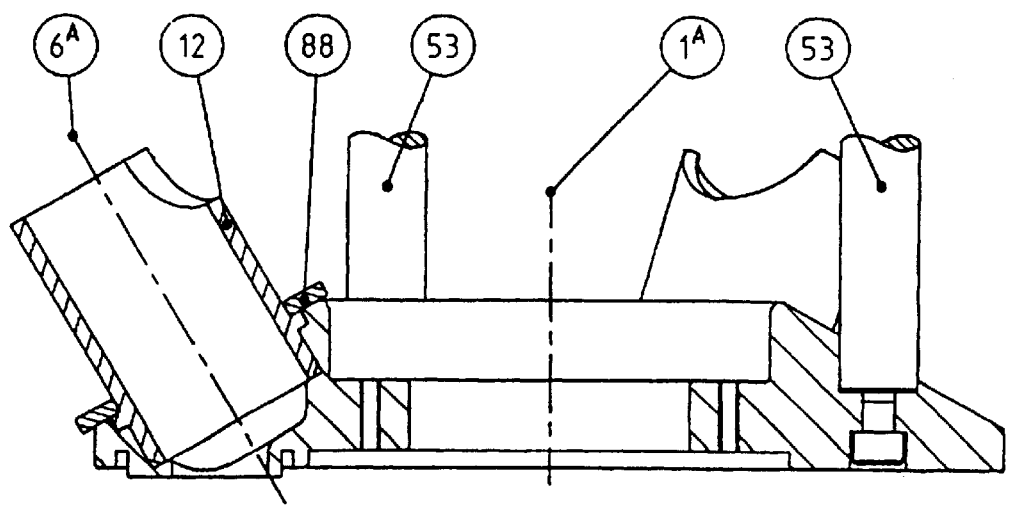
FIG. 9 is a sectional view through section 8—8 of FIG. 8.

FIG. 8 is a planar view of a cylinder head means 5 which carries three cylinders 12. The cylinder head means 5 locates and secures each of the cylinders in a fixed array. FIG. 9 shows a cross sectional view through section 9—9 of FIG.

8. It shows how each cylinder 12 is secured to the cylinder head means 5 by a plate ring or collar which locates around the perimeter of the cylinder 12. The use of machine screws or bolts or the like, ensures secure attachment of each of the cylinders to the cylinder head means. Also illustrated in FIGS. 8 and 9 are the cylinder head means connectors 53 which connect each of the two cylinder head means 5 to each other. The connectors 53 locate into a bore or aperture of each of the cylinder head means 5. The cylinders are made from commonly used metal alloys for cylinders of engines known.

Each of the cylinders 12 has therein a relief to accommodate for the oscillating motion of the piston control means arms 62 relative to the cylinders.

Figure 10:
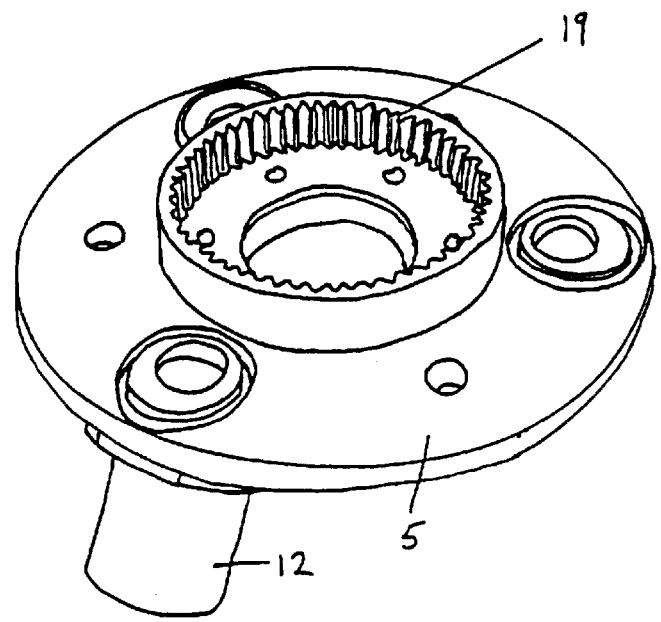
FIG. 10 is a perspective view of one of the cylinder head means of FIG. 1, which also carries the associated annular gear.
Figure 11:
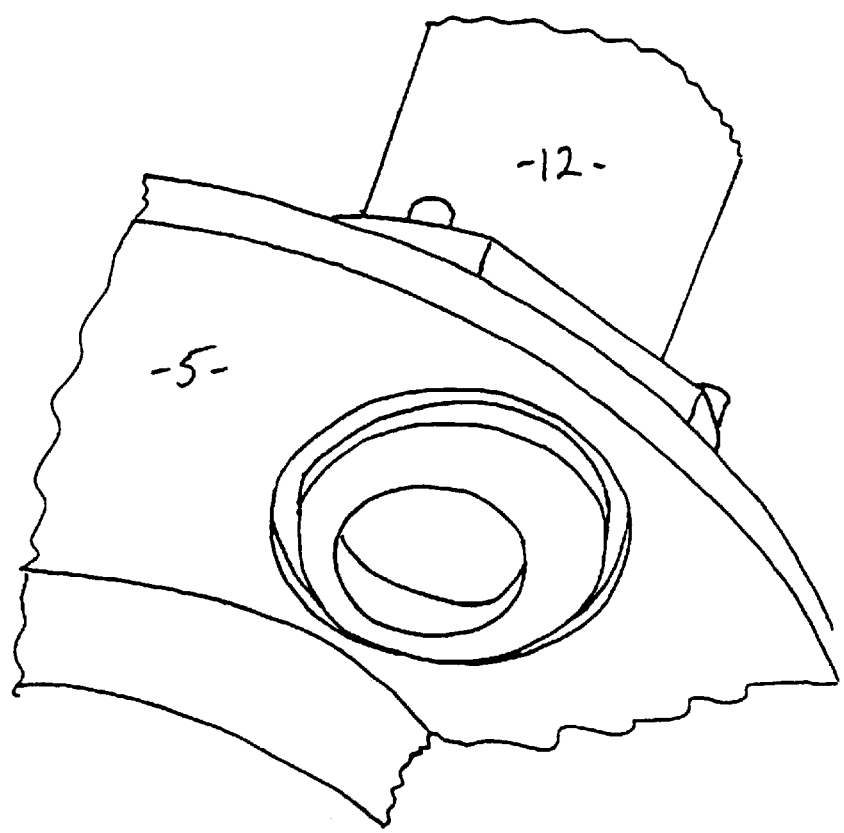
FIG. 11 is a partial perspective view illustrating in more detail a port of the cylinder head means and associated cylinder.

FIGS. 10 and 11 illustrate the surface of the cylinder head means 5 which engages with the port means 13. A ring seal 100 shown in FIGS. 1 and 47, having apertures located to correspond with the raised portions of the cylinder head means about each of the openings to the cylinders, rotates with the cylinder head means. The ring seal has a centroid at the shaft axis $1^A$ and is of internal and external diameter sufficient provide the sealing to each of cylinder openings. Preferably the ring seal is made from a hard steel such as that used for saw blades coated with a friction reducing coating.

Figure 47:
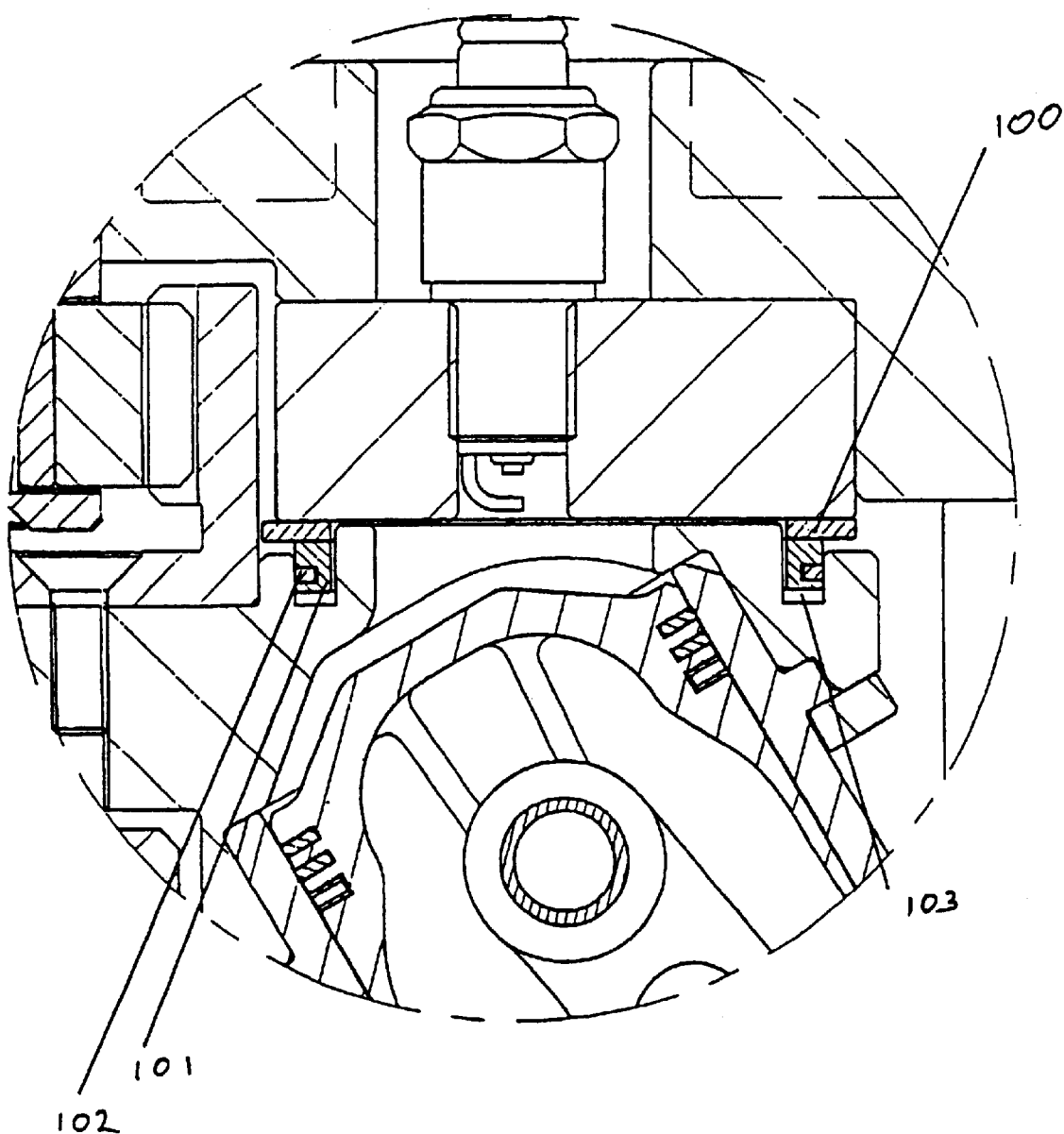
FIG. 47 is a more detailed view of that part of FIG. 1 about the cylinder head means.

Annular seals 101 and 102 are located about the openings to the cylinders in an annular groove and below the ring seal. FIG. 47 shows in more detail, the preferred arrangement of such seals. When the compressed fluids in the cylinders attempt to escape therefrom, the increase pressure due to such fluids increase the pressure inside of the cavity 103 and press the ring seal against the port means, closing off that escape route. Similarly the increase in pressure on the inside wall of seal 101 forces the seal 102 against the outside wall of the annular groove and seals off that escape route.

A person skilled in the art will realise that many other methods of sealing the cylinder openings to the port means are possible.

Figure 28:
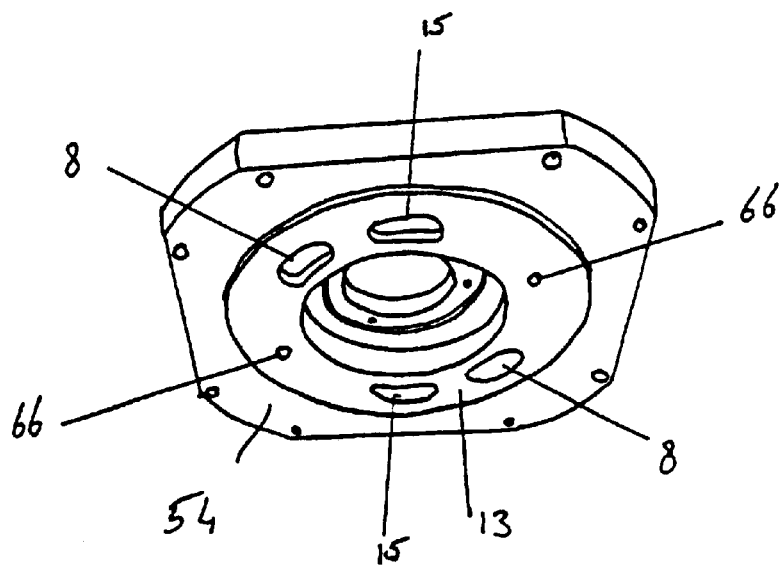
FIG. 28 is an alternative perspective view of the end member and port means of FIG. 27.

In the most preferred form of the present invention, the end members 54 carry the port means 13. FIG. 28 is a perspective view of an end member 54 and port means 13. Although in the preferred form of the present invention, the port means 13 and end member 54 are separate parts, the port means and end member can be a single item. In the preferred form of the present invention the end members 54 are made from aluminium, and the port means 13 are made from a steel suitable for case hardening for durability and strength. The use of a case hardened steel for the port means is desirable as the port means 13 are subjected to frictional forces from their relative rotation to the cylinder head means 5 and also to the combustion heat from the fuel in each of the cylinders.

Each of the port means 13 in the preferred form of the present invention, has two inlet ports 15 and two exhaust ports 8 for the induction of a fuel/air mixture and the exhaust of combusted fuel respectively.

In the most preferred mode of the present invention and wherein the engine operates in a standard four stroke counter rotating sequence, one revolution of the cylinder head means about the shaft axis $1^A$ results in each of the pistons having two four stroke cycles. As the gearing ratio is 3:1 between the shaft and the cylinder head means, one revolution of the cylinder head means relative to the port means, results in four revolutions of the cylinder head means relative to the shaft, when the engine is operating in a counter rotating mode. When the engine is operating in a co-rotating mode, wherein the cylinder head means rotates in the same direction as the shaft, one revolution of the cylinder head means relative to the port means results in two revolutions of the cylinder head means relative to the shaft. The most preferred sequence of operation has been schematically illustrated in FIG. 35. Spark plugs initiate the combustion of the fuel inside of the cylinders when the piston approach TDC. To this extent the port means is also provided with apertures 66 for presenting a spark plug to the cylinders at appropriate intervals. In the most preferred mode where the pistons travel through two 4 stroke cycles, two spark plugs are presented from each port means.

The end members 54 contain apertures corresponding to those in the port means to allow for the provision of fuel/air, and spark plugs and for the exhaust of exhaust gases to the apertures in the port means 13.

Figure 21:
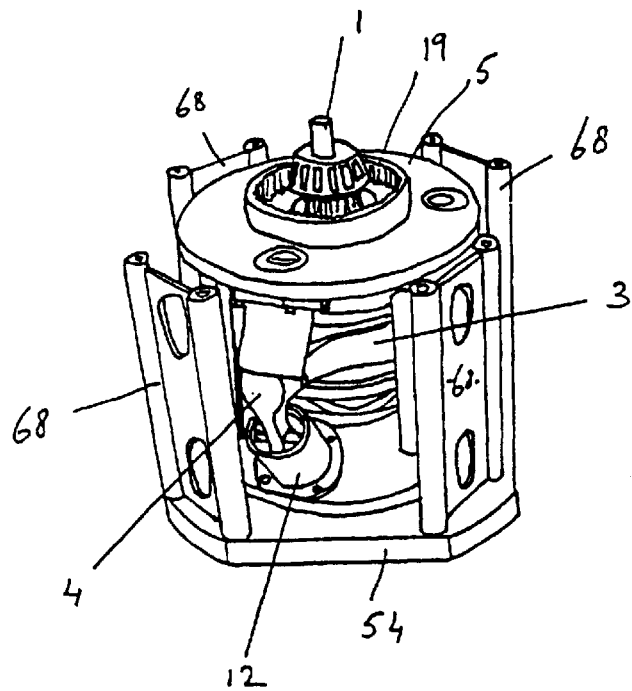
FIG. 21 is a perspective view of the engine of the preferred form of the invention shown in FIG. 1, wherein the port means and end member at one end has been removed.
Figure 22:
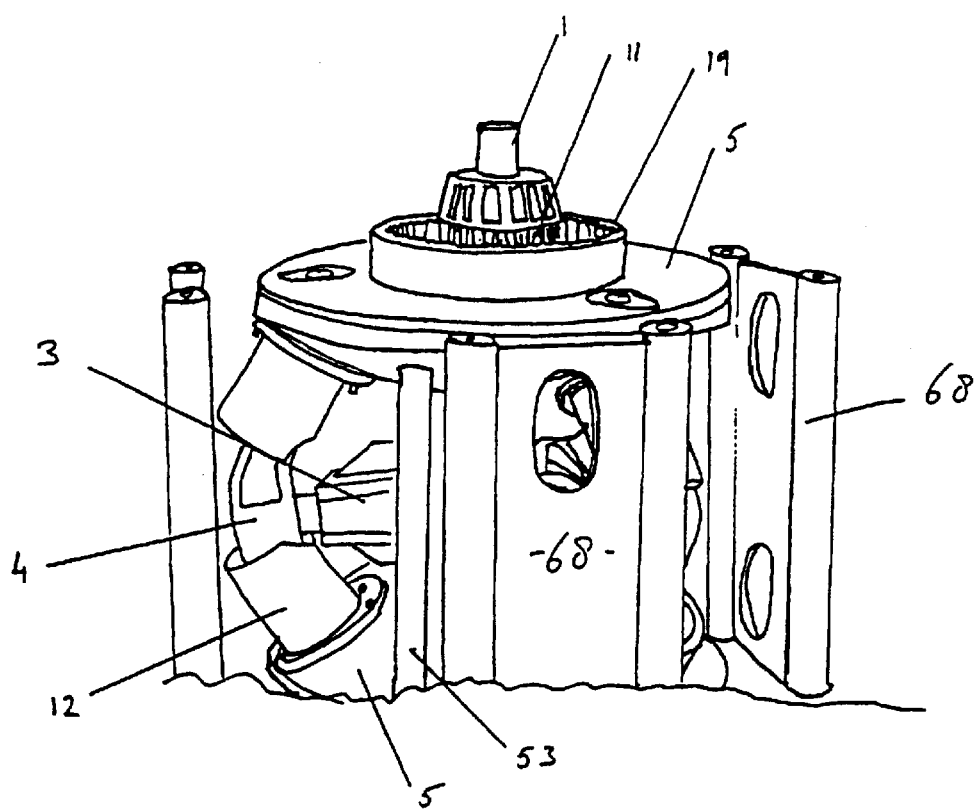
FIG. 22 is a perspective view of part of the engine of the preferred form of the invention shown in FIG. 1.
Figure 29:
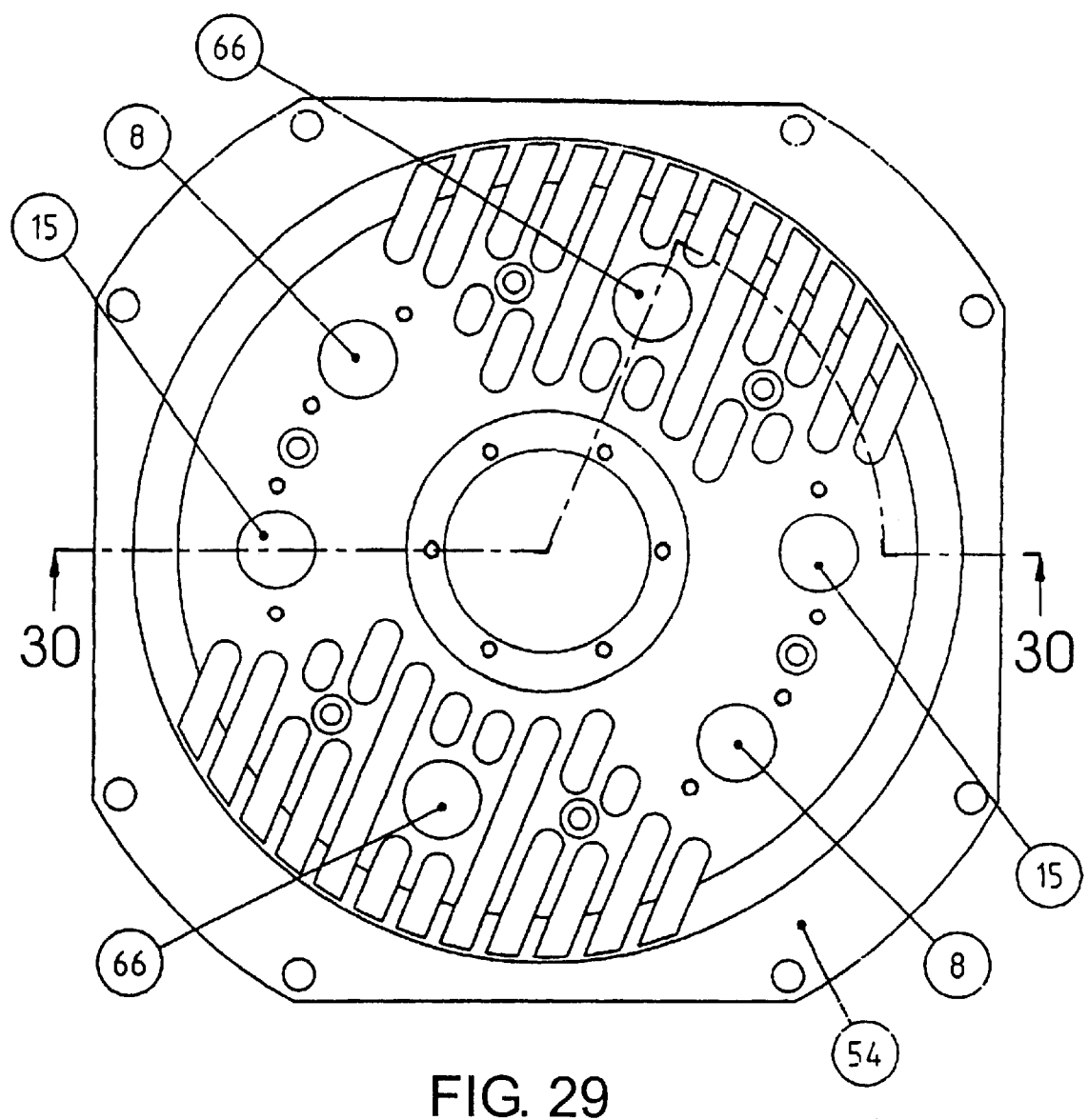
FIG. 29 is a plan view of the end member of FIG. 27.

FIG. 29 is a plan view of an end member 54 illustrating the relative positions of the outlet ports 15, inlet ports 8 and spark plug apertures 66. In the preferred form of the present invention, all ports are at the same pitch circle diameter. The apertures located on the perimeter of the end member 54 allow for the securing of structural members 68 as shown in FIGS. 1, 21, and 22 which hold both end members 54 in fixed relationship.

Figure 23:
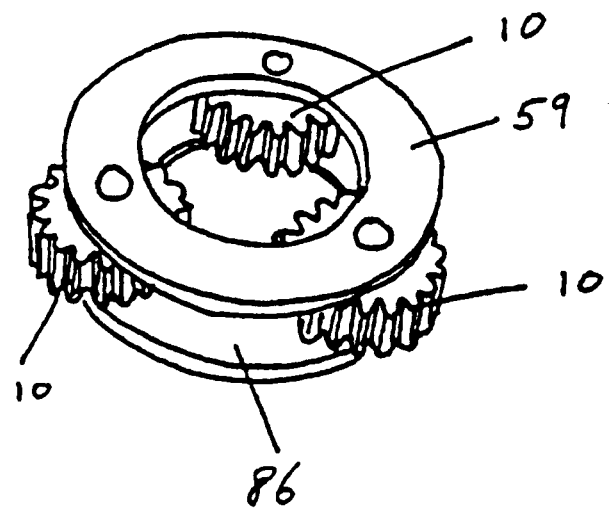
FIG. 23 is a perspective view of the planet gears and associated support rings of the engine of the preferred form of the invention shown in FIG. 1.
Figure 30:
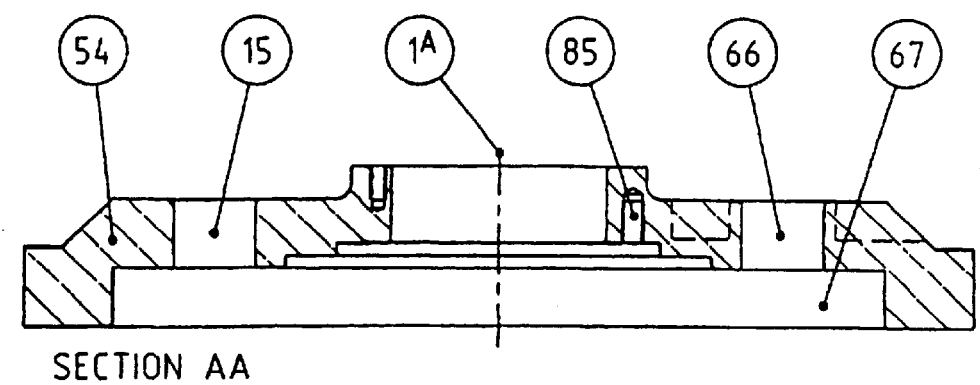
FIG. 30 is a sectional view through section 30—30 of FIG. 29.

FIG. 30 is a sectional view through section 30—30 of FIG. 29. It shows the port means relief 67 into which the port means 13 is able to locate. The end member 54 of FIGS. 29 and 30 is that end member which houses the gearing of FIG. 26 between the cylinder head means 5 and the shaft 1. The threaded screw holes 85 in one of the end members 54 locate the machine screws which fasten the planet gears mounting plate 86 as shown in FIG. 23 to the end member 54.

FIG. 32 is a sectional view through section 32—32 of an end member shown in FIG. 31. In FIG. 32, the port means 13 has been illustrated in association with the end member 54. Shown in both FIGS. 30 and 32 are the outlet port 8 and spark plug aperture 66 through both the port means 13 and end member 54. The inlet and outlet ports 15 and 18, are reversed on the opposite port means and end member located at the other end of the engine.

Although herein described are engines having openings to each cylinder at an identical pitch circle diameter, alternatively some openings may be at different pitch circle diameters, having corresponding ports in the port means at differing corresponding pitch circle diameters. This type of arrangement can be utilised by engines having different firing sequences and geometry.

For the engine of the preferred form of the invention, the line drawn between the two spark plugs of one of the end members, is at 45° to the line drawn between the two spark plugs of the other end member. This 45° offset ensure that the ports, and spark plugs of each of the end members are located in the correct position for each of the opposed pairs of pistons. When the crank rotates 180° relative to the cylinder head means, the cylinder head means is moved −45° to the port means, and the crank is moved +135° relative to the port means. This total 180° and has a ratio of 3:1 corresponding to the gearing. As a result the offset of the end members is required to be 45°.

Figure 48:
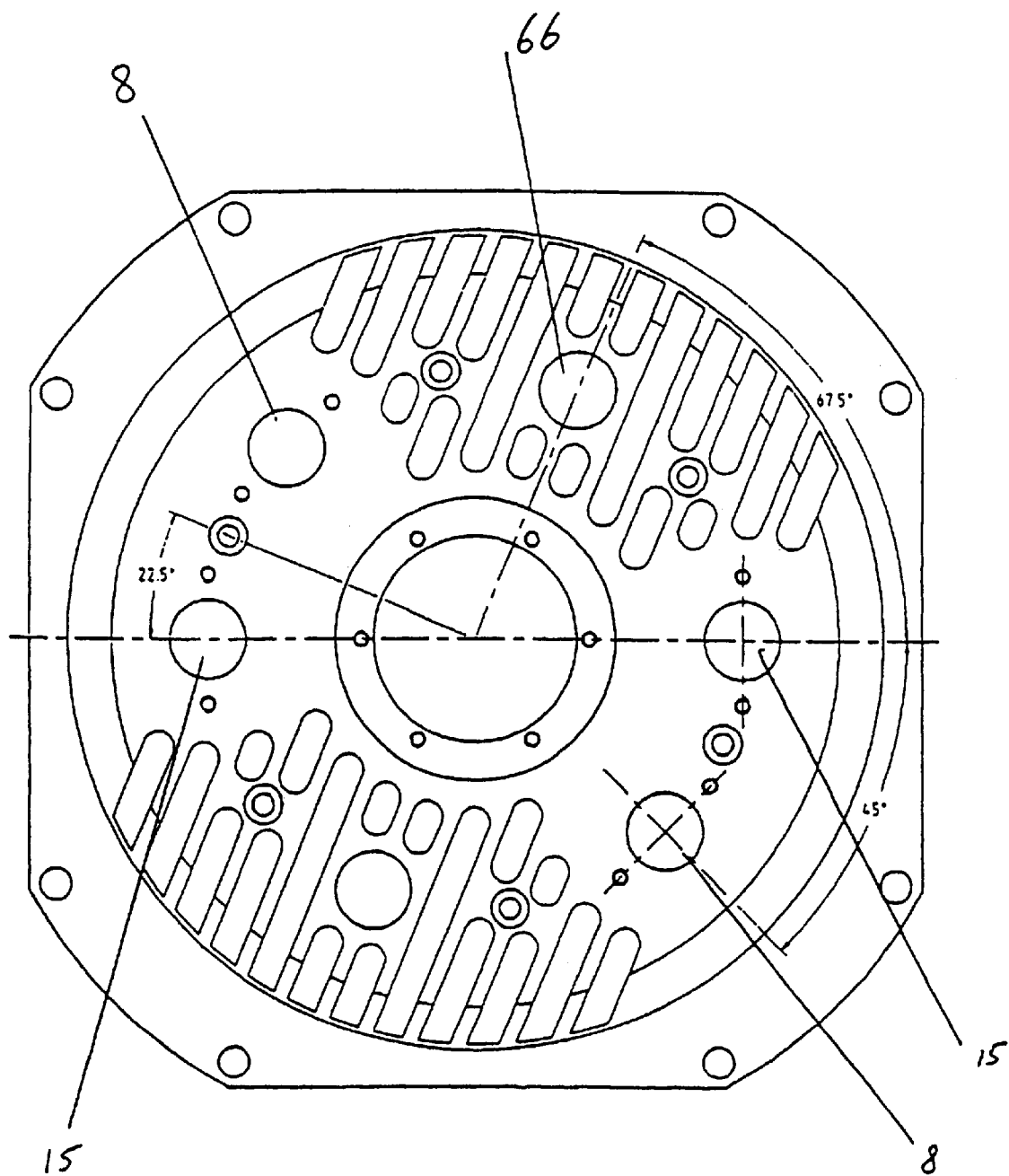
FIG. 48 is a plan view of an end member showing the relative angles between ports and spark plugs.

FIG. 48 shows the end member of FIG. 29. In the preferred form of the engine of the present invention, wherein there are three pistons at each end of the engine, the angle between the spark plug centre and the most adjacent port is 67.5°, and the angle between pairs of ports is 45°. The inlet and outlet ports 15 and 8 respectively as shown in FIG. 33 expand in cross sectional area at or towards the surface of the port means which engages with the complementary surface of the cylinder head means 5. This expansion of area is desirable to ensure that a larger port area is presented to each of the cylinders as they rotate over the ports. This ensures better transfer of fluids into and out of the cylinder and also provides-the required inlet and exhaust duration as the cylinders rotate past. For the size of ports used and size of cylinder openings, the intake ports opens at 30° before TDC and closes at 30° after BDC, and the exhaust port opens at 30° before BDC and closed at 30° after TDC. Geometry for other configurations of engine can also be determined by simple calculations.

Reliefs 69 have been provided in the end members to increase their surface area to provide efficient cooling of the end members and port means. Although herein shown, the relief 69 are of a particular configuration, any other alternative configuration to provide a suitable means of cooling can be used.

FIG. 33 is a bottom view of the end member 54 and port means 13. As shown, the port means is most preferably ring shaped and planar. The port means may however have a bevelled surface which is presented to a complementary surface of the cylinder head means 5. In fact the complementary surfaces of the port means 13 and cylinder head means 5 may be of any contour, however the most preferred shape is planar as this is easy to manufacture.

The bottom view of the end member 54 and port means 13 also illustrates the planet gear screw holes 85, which are able to receive machine screws which secure the planet gear mounting plate 85 to the end member 54. Preferably there are three of such screw holes present in the end member 54. The slots 94 in the planet gear mounting plate 86 allow a degree of adjustment of the location of the planet gears relative to the end member. This degree of freedom allows for the timing of the relative rotation of the cylinder head to the port means to be adjustable. Also included in the planet gear mounting plate 86 is a pin hole 95 which is able to receive a pin therethrough to lock the mounting plate 86 to the end member. The screws which extend through the slots 94 would not be sufficient to rotationally hold a mounting plate to the end member.

Although herein described in detail with reference to the various components and parts, is a combustion engine which has three opposing pairs of pistons, this invention can be adapted to a combustion engine with more than three opposing pairs of pistons or single acting pistons. The gear ratio between the shaft 1 and cylinder head means 5 is related to the number of pairs of pistons of the engine. The gear ratio of the engine of FIG. 1 operating in a four stroke cycle is defined by $$W_s/W_c = -N$$

wherein $W_S$ is the rotation of the shaft 1, $W_C$ is the rotation of the cylinder head means 5 and N is the number of pairs of cylinders. Hence for three pairs of opposed pistons, the shaft rotates at three times the speed of the cylinder head means 5 and preferably but not essentially in opposite directions. For a co-rotating engine having 3 opposed pair of pistons and each end member having 4 inlet and outlet ports with a gear ratio of 9:1, $Ws/Wc = +N^2$.

FIG. 36 illustrates a sequence through half a revolution of the cylinders of a spark ignition combustion engine having five pairs of opposed pistons. In this configuration the cylinders are co-rotating with the crank. The crank to cylinder gearing ratio is 5:1. Each of the port means has 2 inlet and 2 outlet ports, proving for 4 power strokes per revolution of the crank. FIG. 36A show a 5 pair of opposed cylinder engine, wherein the crank is counter co-rotating to the cylinders. The gearing ratio is at −5:1, and for 6 ports per port means, results in 6 power strokes per revolution of the crank.

Similarly FIG. 37 illustrates a sequence through one third a revolution of the cylinders of a spark ignition combustion engine having seven opposed pairs of pistons. In one single revolution of the cylinder head means 13' of FIG. 37, a single piston moves through three cycles of a four stroke cycle. FIG. 37 shows the relative rotations of the cylinder head means 13 and the port means through one third of a revolution, ie one four stroke cycle. FIG. 37A is a counter rotating version of a seven pair of opposed cylinder engine,. The gearing ratio of the crank to cylinders is −7:1 and for 8 ports per port means, 8 power strokes per revolution of the crank result.

Figure 34:
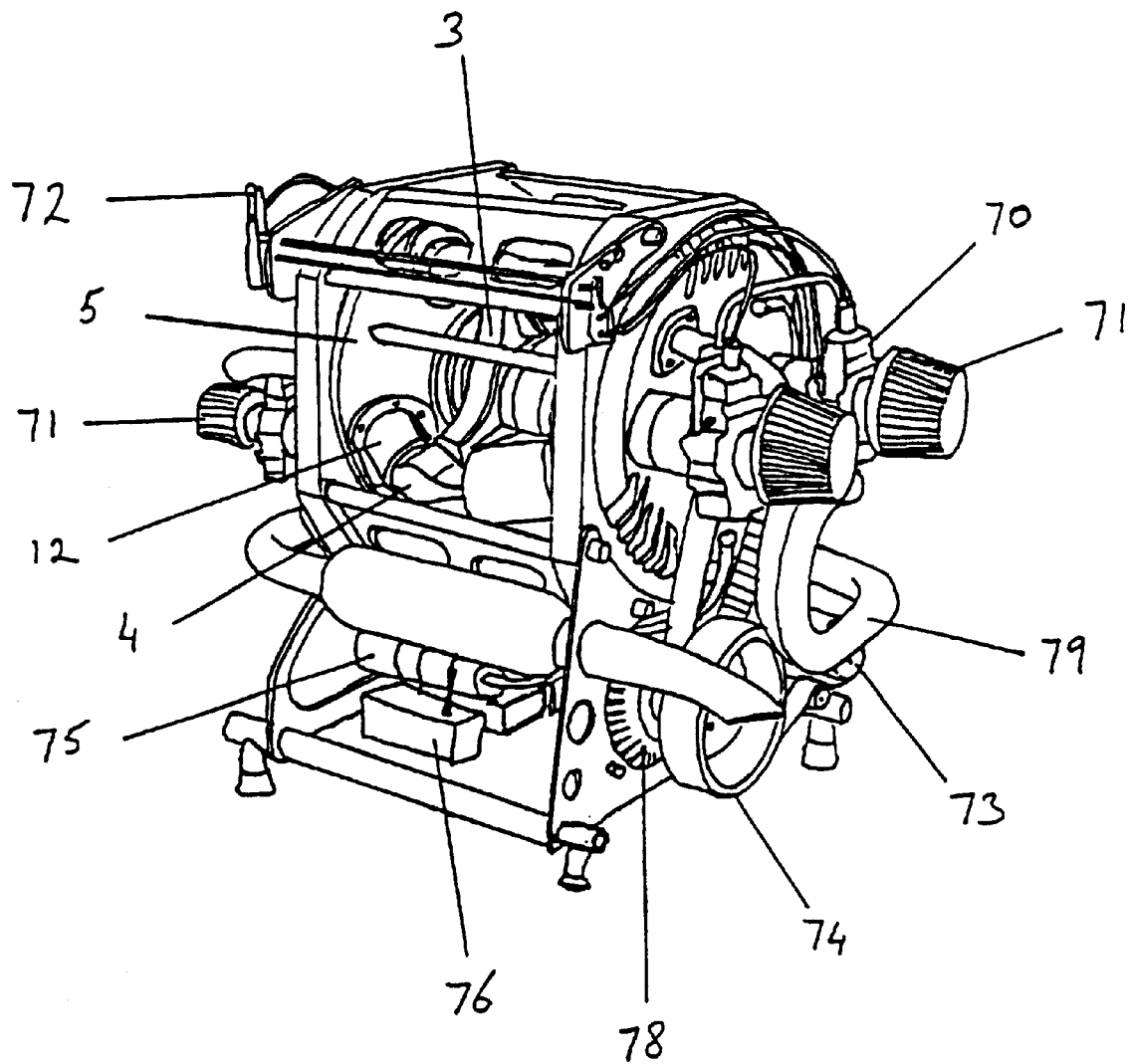
FIG. 34 is a perspective view of the engine of the preferred form of the invention shown in FIG. 1 in which additionally parts such as carburetors, air filters, exhausts, starter motor, coils and throttle controls are illustrated.

In the most preferred form of the present invention as shown in FIG. 1, fuel is supplied to the cylinders when required through the inlet ports 15 by natural aspiration. The fuel and air mixture is mixed by the use of carburettors 70 located at each inlet port as shown in FIG. 34. Most preferably the carburettors are 28 mm ID, flat side venturi type. A person skilled in the art will realise that alternative carburettors may be used, and where the capacity of the cylinders is different to that herein described, other suitable carburettors may be required. Air is drawn into the carburettors 70 through air filters 71. A throttle controller 72 is connected to throttle cables controlling the fuel into the carburettors 70 and is thereby able to control fuel quantities drawn into each cylinder. The throttle controller, controls all four carburettors of the engine of FIG. 1 simultaneously. Simultaneous operation is desirable to ensure that the expansion forces of the combusted fuel in each cylinder are substantially similar.

In the most preferred form a starter motor 73 of which part is shown in FIG. 34 drives by way of belt drive at start-up, the alternator pulley 74. This in turn during start-up drives a smaller alternator pulley which connects by way of belt drive onto a pulley of shaft 1. Once the engine is operating, a suitable form of clutching or disengaging of the starter motor from the shaft 1 is required. Such may include a sprag clutch within the starter motor. A person skilled in the art will realise that there are many alternative ways of achieving start-up. Although herein described in the most preferred form, a starter motor connects indirectly to the shaft 1 by the use of belts, many other forms of direct and indirect driving means are usable. As an example, a separate starter motor may directly drive the shaft 1 to start the engine. Alternatively the engine may be started by way of pneumatics, forcing compressed air or other fluid into the cylinders to initiate the motion thereof This method of starting an engine is commonly used on large trucks and ship engines. Alternatively rotation of the engine at start-up may be achieved by applying a force to the cylinder head means 5 by way of friction drive or direct drive coupling.

The engine will further include as part of its electrical circuits a coil 75 and electronic ignition module 76, and alternator 78 as shown in FIG. 34. The sparking of the spark plugs in the engine of the preferred form of the invention, is triggered by a Hall effect sensors mounted from the shaft 1. A disk having magnets is mounted to the shaft which rotates past the Hall effect sensors, sensing the relative rotation of the triggers there past, initiating the sparking of each of the spark plugs at the appropriate times. Many alternative ways of inducing such sparking of the spark plug are known, including the commonly used points (kettering) and reluctor mechanisms. The arrangement of these parts is well known in the automobile industry, and may include equivalent alternatives. Exhaust piping 79 is most preferably connected to the exhaust ports for the ducting away of harmful exhaust gases.

As an alternative to the delivery of fuel into the cylinders, the engine may utilise exhaust gas turbos or direct drive turbos or super chargers, of which the operation is well known.

As a further alternative, instead of the mixing of air and fuel in a carburettor, the engine may utilise fuel injectors for the injection of fuel into the cylinder at the appropriate angles of rotation of the cylinder head means and piston position. Again such methods of injection are commonly known in the motor industry and need no further explanation.

Figure 38:
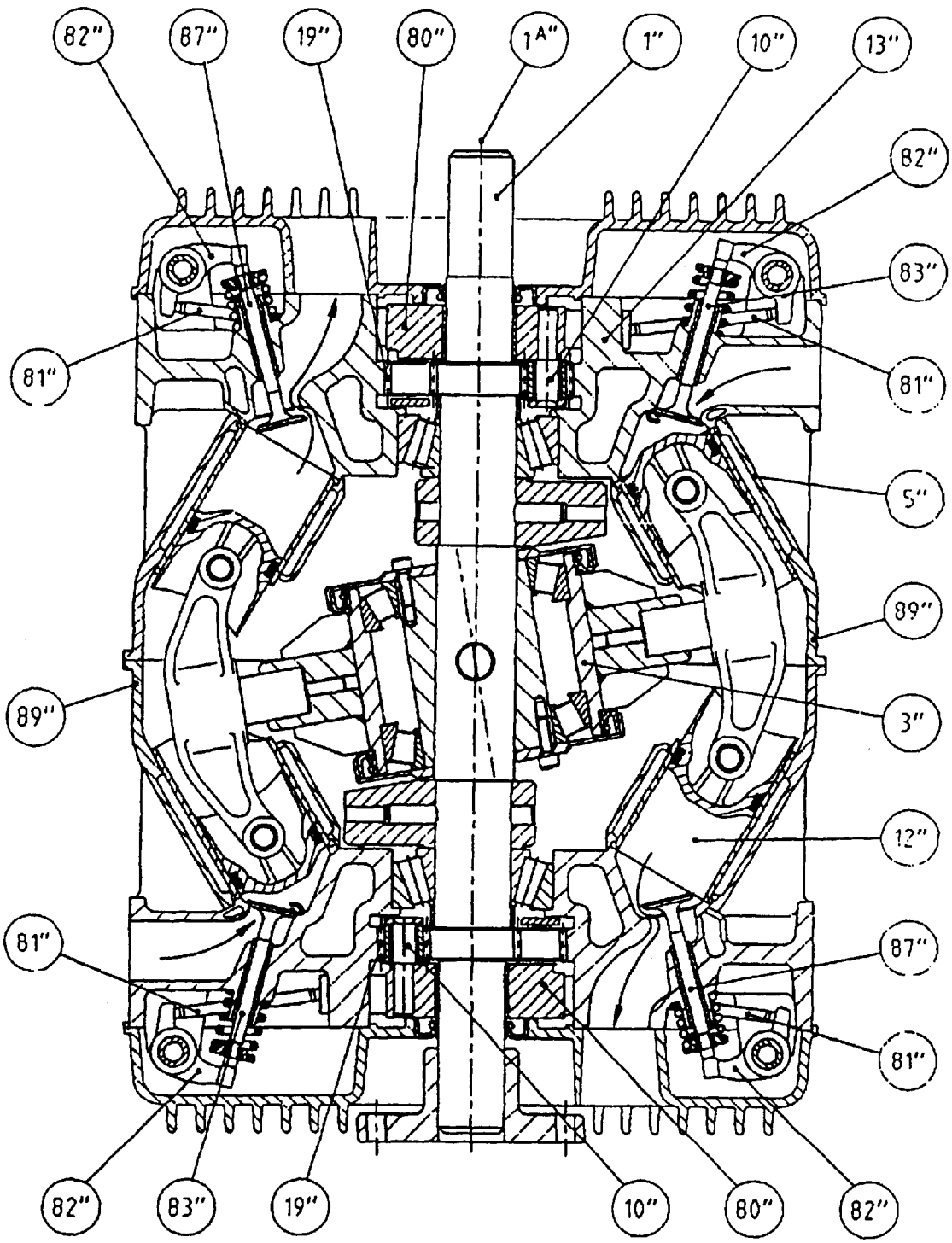
FIG. 38 illustrates an alternative arrangement of engine of the present invention, wherein there is no relative rotation between the cylinder head means and port means.

As an alternative embodiment to the engine described in FIG. 1, FIG. 38 illustrates a cross section through an engine in which there is no relative rotation between the cylinder head means 5" and port means 13". In this configuration of engine the shaft 1" is geared at each end to an annular gear 19" by planet gears 10" which are able to orbit about the shaft axis 1$^A$" and are able to rotate about their own axes. The rotation of the planet gears 10" is coupled with a cam 80". Such coupling may be achieved by mounting the axle of the planet gears 10" from the cam 80". The cam 80" operates push rods 81" which in turn connect to rocker arms 82" which in turn operate inlet valves 83" and outlet valves 87" for the inlet of fuel and air into the cylinder 12" and for the exhaust of exhaust gases therefrom.

The engine of FIG. 38 has two pairs of opposed pistons located at 180° from each other from the perimeter of the piston control means 3". The engine illustrated again may include any number of pistons and cylinders and may be double acting or single acting.

FIG. 38 only illustrates one valve per cylinder, however out of the plane of the cross section, at least one valve per cylinder is present such that each cylinder has at least one for inlet of air/fuel and at least one for outlet of exhaust gases. The gearing between the port means 13" and the shaft 1', and the shape of the cam 80" is such as to provide valve operation from the cam 80" to open the ports and close the ports to the cylinders at the appropriate times. Again this engine may be operated as a compression ignition engine, and injectors may also be present in the cylinder head means, and again this engine may utilise exhaust gas turbos or direct drive turbos. For the retention of lubricating oil to the internal parts of the engine of FIG. 38, there has been provided a crank shaft casing 89" which surrounds the pistons, crank shaft, piston control means and other associated components. This casing also provides further rigidity to the embodiment of the engine.

The valves 87"/83" are biased towards closing the ports to each of the cylinders by the use of valve springs. Opening is achieved by the push rods rocker arms and cam followers. A person skilled in the art will be able to determine an appropriate shape of the cam 80", to operate the valves at appropriate intervals of piston reciprocation. Again as the crank shaft and ports are indexed to each other by the use of the annular gear 19", planet gears 10" and shaft gearing, an appropriate ratio of gearing requires to be used, this will of course depend on the shape of the cam shaft.

Other components not illustrated in FIG. 38, to operate the engine will be required. Such components include the carburettor, spark plugs for spark ignition engines and associated electric circuits.

Figure 39:
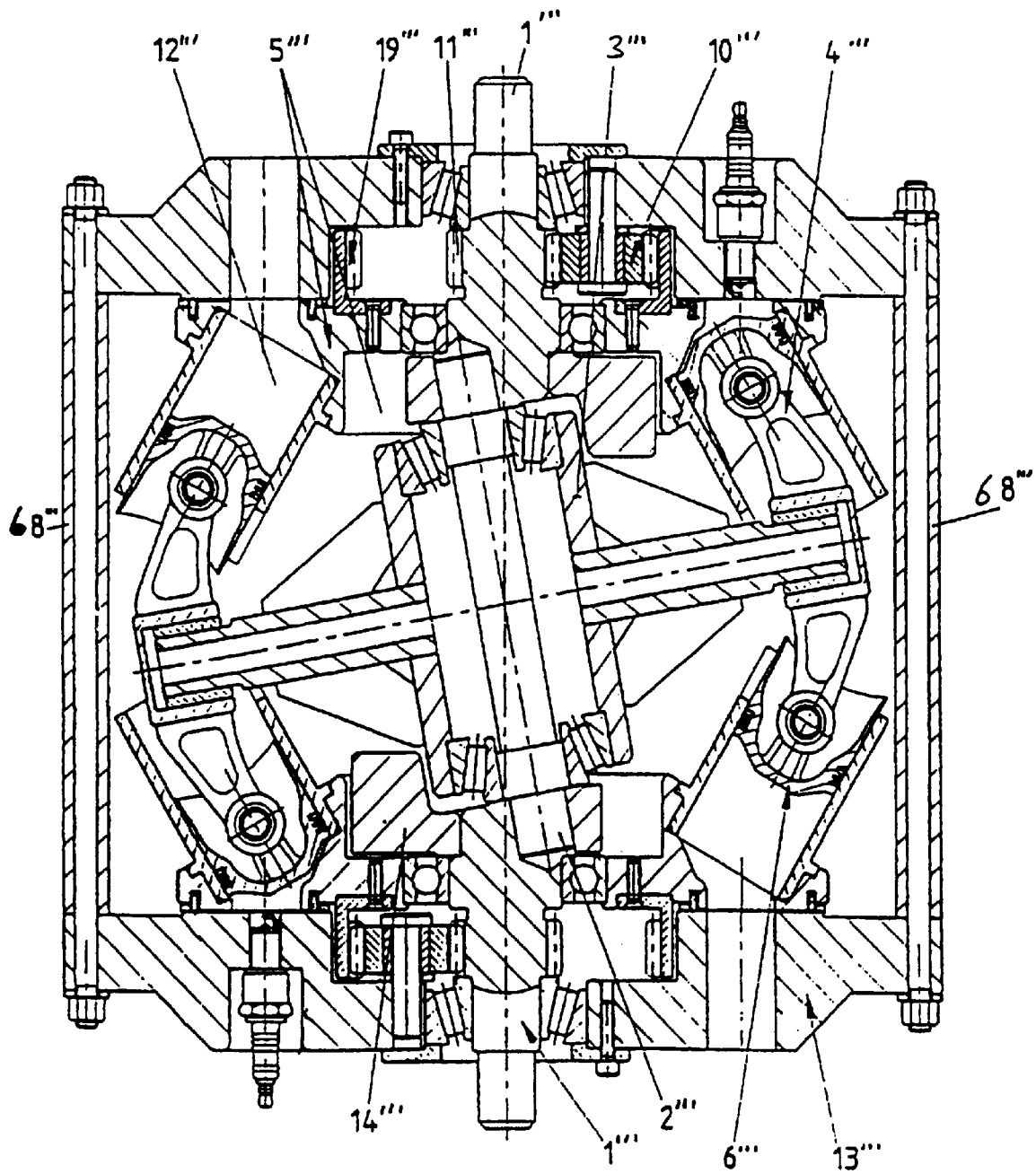
FIG. 39 illustrates yet another arrangement of engine of the preferred form of the invention shown in FIG. 1, wherein a discontinuous shaft is utilised.

FIG. 39 is a cross sectional view through an engine similar to the engine shown in FIG. 1, wherein there are two pairs of opposed pistons. The substantial difference between the configuration of the engine of FIG. 39 and the engine of FIG. 1 is the construction of the crank shaft 2'" and the shaft 1'". The shaft 1'" is discontinuous and locates there between the crank shaft 2'". Bearing from the crank shaft 2" is the piston control means 3'". A balancing mass 14'" is associated with each portion of the shaft 1'". Again the balancing masses 14'" balance the rotating masses and reciprocating masses in the engine.

The port means 13'" of the engine of FIG. 39 are not located in end members as in FIG. 1. However a person skilled in the art will realise that this is just one alternative configuration of presenting such parts.

The gearing between the shaft 1'" and the cylinder head means 5'" is substantially similar to that described for the engine of FIG. 1 although it is duplicated on the opposite end of the shaft.

Figure 40:
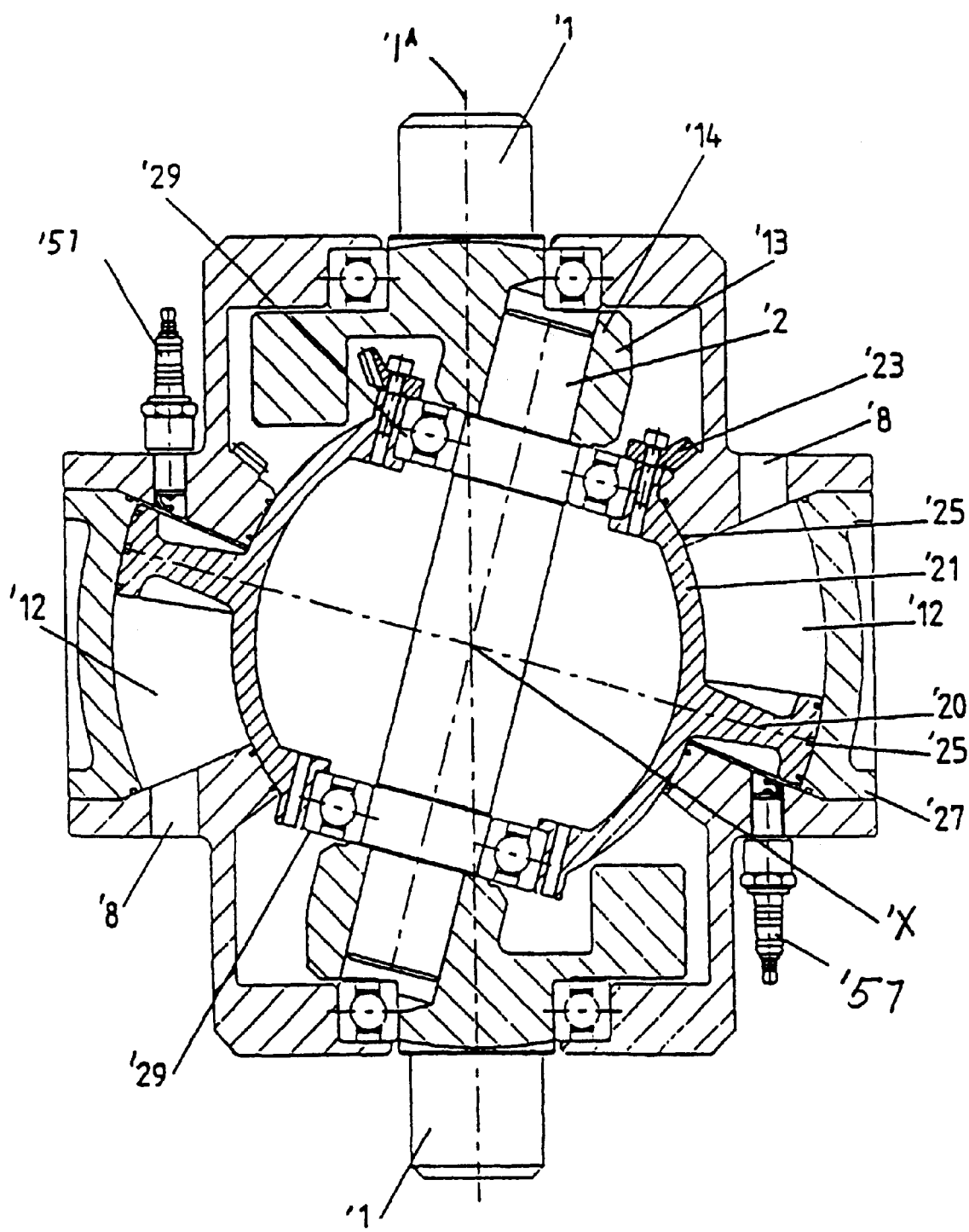
FIG. 40 illustrates a cross-sectional view through yet an alternative form of the present invention utilising a partial spherical like cylinder arrangement.
Figure 41:
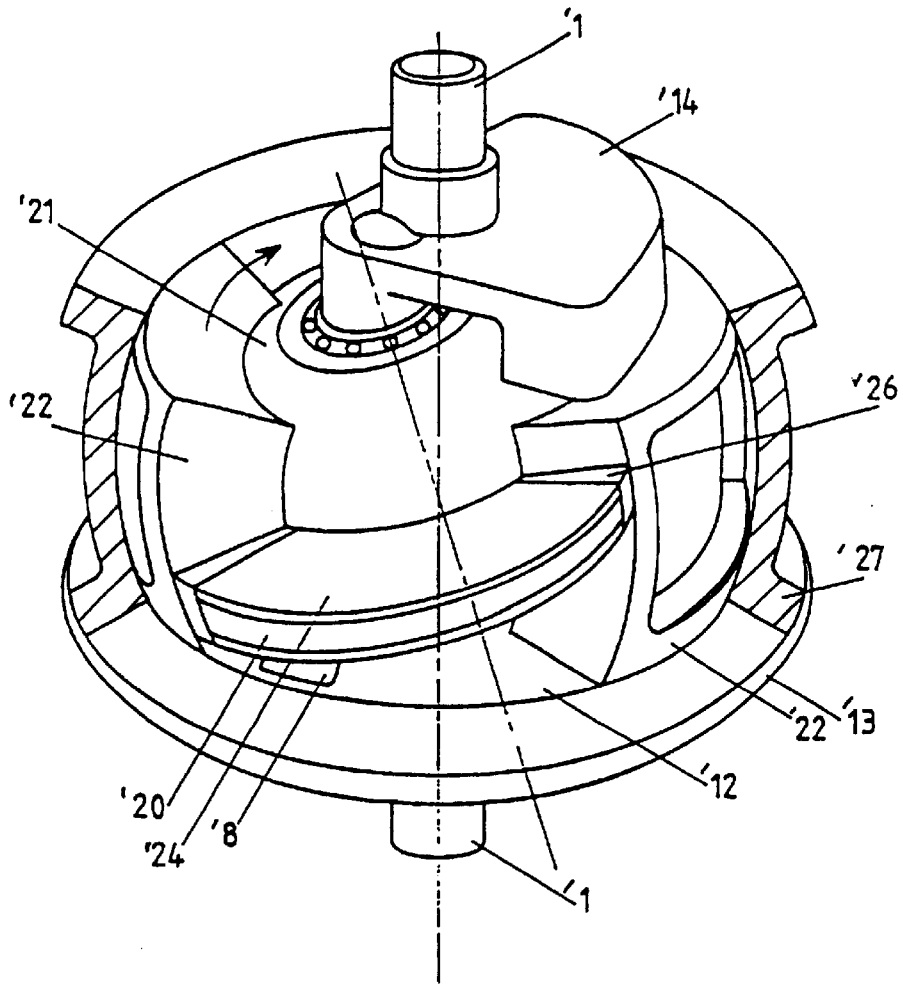
FIG. 41 is a partially sectioned perspective view of an engine of form of the present invention shown in FIG. 40.

Another preferred form of the present invention consists of an engine of an embodiment different to the embodiment of the engine of FIG. 1. In FIG. 40 there is illustrated a partial sectional perspective view of such embodiment. Referring to FIG. 41 in conjunction with the sectional view of the engine as shown in FIG. 40, the engine consists of shafts '1 which carry there between a crank shaft '2. The crank shaft '2 is carried by crank shaft carrying members '14 secured to each shaft '1. Again this form of engine in operation has the crank shaft '2 tracing a cone as in FIG. 6 or FIG. 5. The crank shaft '2 is carried by the crank shaft carrying members '14 at an incline to the axis 1$^A$ of the shaft '1. The crank shaft axis '2$^A$ intersects the 1$^A$ axis at point 'X substantially mid way between the carrying members 14. The crank shaft '2 carries a piston control means '21 most preferably by using bearings '29. The bearings allow the piston control means '21 to rotate about the crank shaft axis '2$^A$.

Figure 42:
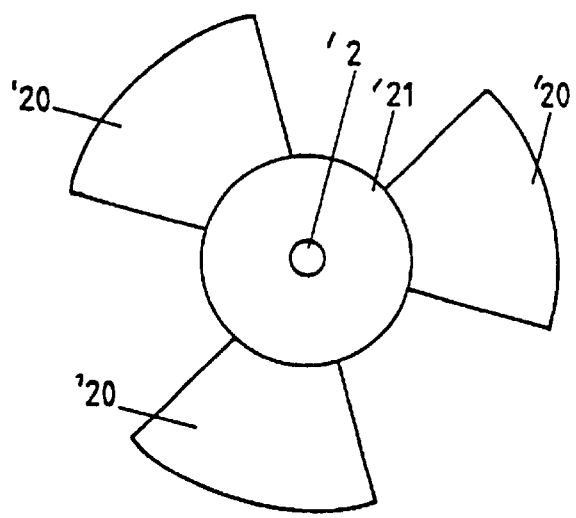
FIG. 42 illustrates a plan view of the pistons of the engine of FIG. 41 and 40.

Carried on the perimeter of the piston control means are three pistons '20. FIG. 42 is a plan view of the pistons '20 and piston control means '21. The pistons are segments of a disc. When the engine is assembled, between each piston '20 is located a wedge block '22. The wedge blocks '22 are maintained between the pistons '20 by the outer casing '27 and are wedged between the radial edges of each piston. Cylinders '12 are defined by the upper and lower surfaces of the piston '20, the inner surface of the outer casing '27, the radial surfaces of the wedge blocks '22 located on either side of the piston '20, the port means '13 and by the piston control means '21. The piston control means '21 is substantially spherical in shape, at least in regions which form part of the cylinder '12 and has its centroid at point X. The shape of the piston control means ensures that during operation of the engine, the surface which defines part of each cylinder does not translate relative to the centroid but only rotates relative thereto. This is desirable to ensure sealing is maintained between the piston control means '21 and the port means. Seals '25 provided in the port means '13 seal the cylinder between the piston control means '21 and the port means '13. Seals are also provided at the circumference of each of the pistons '20 to provide a seal between the circumference of each piston '20 and the interior surface of the outer casing '27. Seals '26 are also provided between the radial edges of each piston '20 and the radial surface of the wedge blocks '22, such seals prevent fluids from passing out of each cylinder.

Cylinders are located on both sides of each piston '20. The movement of each piston due to expansion of fuel in the cylinder causes the pistons to oscillate. Such motion induces a rotating motion of the crank shaft '2 about the shafts '1 and induces a rotating motion of the shafts. The pistons '20 and pistons control means '21 are coupled to the port means '13 by a coupling means '23. Most preferably the coupling means '23 is a bevel gear. A bevel gear located on the piston control means meshes with a bevel gear of a large diameter located on the port means '13. Due to such coupling, a rotary motion of the piston control means '21, piston '20 and wedge blocks '22 relative to the port means '13 occurs.

The engine of FIGS. 40 and 41 is another preferred embodiment of the present invention wherein two cylinder chambers are situated on each side of the wobble pistons '20. However a person skilled in the art would realise that this engine may also utilise a single sided cylinder defined in part by one side of the pistons '20.

Illustrated in FIG. 43 is a sequence showing the rotations of the cylinders relative to the inlet and outlet ports located in the port means '13 of the engine of FIG. 40. The sequence illustrate the steps of operation for either a three single acting or six double acting piston engine.

Following the cylinder "12 and piston "20 around, at top dead centre both inlet port "15 and outlet port "8 provide a passageway for fluids. At top dead centre exhaust fluids are virtually all expelled from the cylinder "12, and inlet fuel mixture is about to enter. As the cylinder "12 and piston "20 rotate from top dead centre to bottom dead centre, the inlet port "15 provides an inlet for fuel mixture. At substantially bottom dead centre, the cylinder "12 travels over the port means "13 such that no ports are aligned with the cylinder "12. The inlet port "15 becomes closed by the rotation of the wedge block "22 there over. From bottom dead centre to top dead centre, the piston "20 compresses the fuel mixture inside the cylinder "12. Thereafter as the fuel mixture combusts during the power stroke the piston travels back to bottom dead centre. At substantially bottom dead centre, and during travel of the piston "20 to top dead centre a second exhaust port provides an opening for exhaust fluids to be expelled from the cylinder "12. As the piston reaches top dead centre again a second inlet port "15 becomes exposed to the cylinder chamber and fuel mixture is supplied through the intake into the cylinder chamber for the next sequence.

This form of engine can easily operate in different modes such as fuel injection and compression ignition having appropriate sequences as required. If it is desired to operate this engine using a diesel fuel, fuel injectors can be inserted and glow plugs may replace the spark plugs.

The engine of FIG. 1 and the alternative arrangements illustrated in FIGS. 38 and 39 in 40 can be adapted to operate as a compression ignition engine. In the operation of the engine of the present invention as a compression ignition engine, using for example diesel as a fuel, the spark plugs 57 shown in FIGS. 1, 39 and 40, no longer need to be present in the embodiment. Ignition of the fuel/air mixture in a compression ignition engine is achieved by compression of the fuel/air mixture to a pressure and temperature wherein the mixture automatically ignites. The engine of the present invention can be adapted to be run as a diesel type engine by changing the compression ratios to 16:–23:1. This is achieved by having a larger crank angle or by reducing the combustion chamber volume. The compression ratio in each of the cylinders is proportional to the crank angle. In the engine of FIG. 1, wherein it is operating as a spark ignition engine, the crank angle is 10°.

Additionally fuel injectors must be located in the port means 15 for fuel injection into the cylinder when each piston is at top dead centre or slightly before. The injection of fuel in a compression ignition engine is well documented and does not need to be further described. Most modern diesel engines include glow plugs which are utilised at start-up. The heat which is released helps to initiate the combustion process when the engine is cold. It is envisaged that most preferably the glow plugs are located in the port means 13, however it is noted that in the engines of FIGS. 1, 39 and 40, these glow plugs may not necessarily be presented to the cylinders at start-up. To this extent it will be desirable for the rotation of the cylinder head means 5 to be adjustable prior to start-up to present the openings to each of the cylinders to a glow-plug mounted in the port means 13. Alternatively the glow-plugs may be present in the cylinder head means 5.

Although herein described, the engines of the present invention have a cylinder which defines the combustion chamber of the fuel, the port means may additionally include a pre-chamber system which communicates with the main combustion chamber through holes or apertures or the like. Such chambers are usually used in engines in which fuel is injected. The engine utilising pre-chamber systems are characterised by very good air utilisation and they are also suitable for high speed engines. The combustion of fuel inside of cylinders is well documented, and many shapes of piston heads, injection angles and characteristics are known. These can all be utilised for the engine of the present invention.

Figure 45:
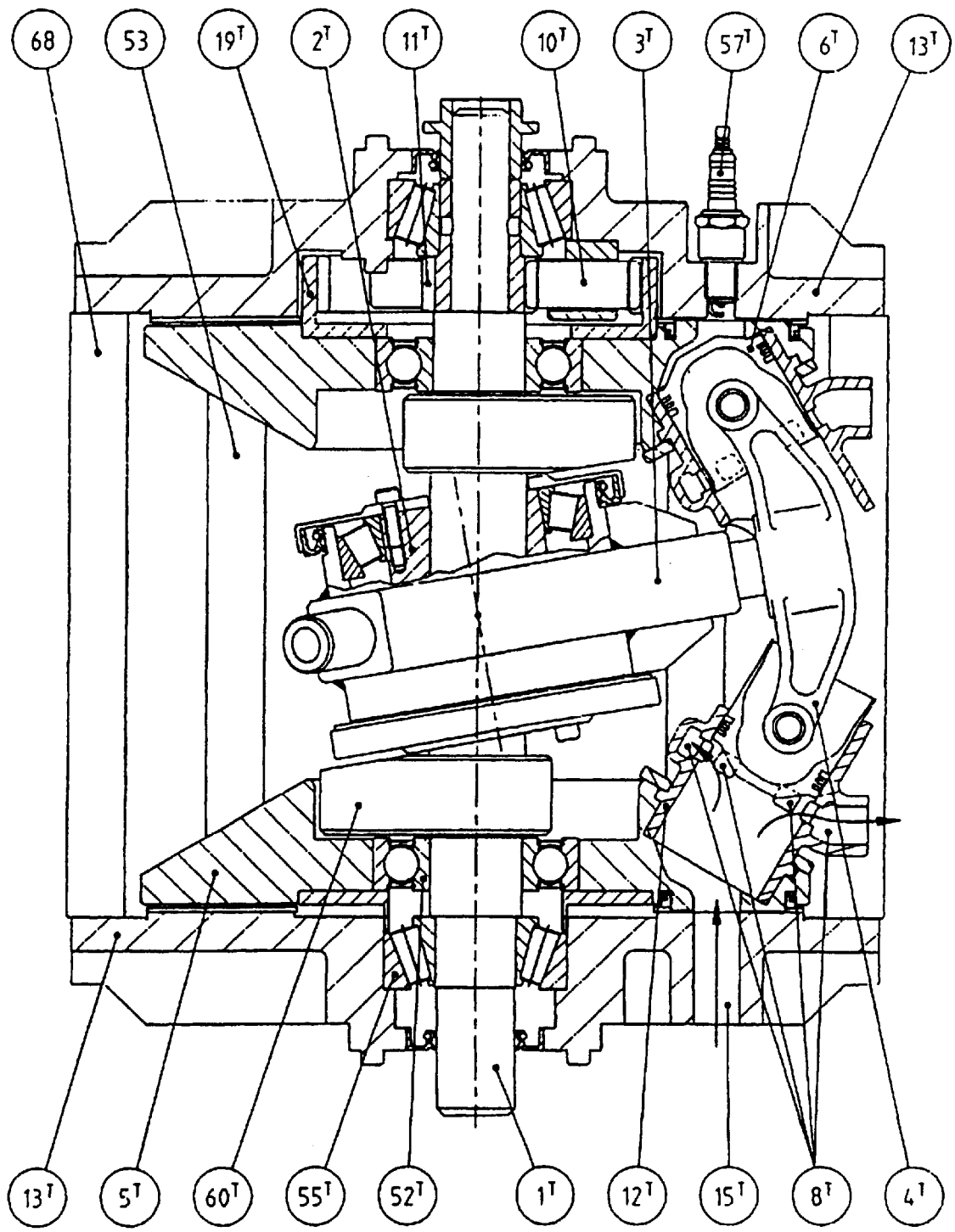
FIG. 45 is a sectional view of an alternative arrangement of the engine of FIG. 44.

Although so far herein described are engines of the present invention which operate in a four stroke cycle, all of these can be adapted to operate in a two stroke cycle. FIG. 45 is a sectional view of substantially the engine of FIG. 1, with slight changes to allow it to operate in a two stroke cycle. The substantial difference in the embodiment of the engine of FIG. 45 when compared to the engine of FIG. 41 are the port means $13^T$ and the cylinders $12^T$. The pistons of the two stroke engine of FIG. 45 have twice as many power strokes during a single revolution of the cylinder head means as the pistons of the engine of FIG. 1. To this extent twice as many inlet ports $15^T$ are provided in the port means $13^T$ of an engine of similar geometry to that of FIG. 1. In the preferred form of the two stroke engine, the exhaust gases are expelled from the cylinder $12^T$ through exhaust ports $8^T$ (each cylinder having at least one) located in the perimeter of the cylinder $12^T$. Such exhaust ports become open to the cylinder $12^T$ slightly before the piston $6^T$ reaches bottom dead centre. Simultaneously a fresh charges of air/fuel mixture enters into the cylinder $12^T$ through inlet port $15^T$ in the port means $13^T$. As the piston 60 returns to top dead centre, the exhaust ports $8^T$ are sealed by the piston and the inlet port $15^T$ is sealed by rotation of the cylinder head means to allow the air fuel mixture in the cylinder to be compressed and ignited when at or slightly before top dead centre. FIG. 45 illustrates a two stroke engine in which ignition is initiated by a spark plug $57^T$. However as herein before described, such ignition may be achieved by compression of the air/fuel mixture.

Because the two stroke process lacks separate intake and exhaust strokes, the cylinder must be filled and emptied simultaneously.

Figure 44:
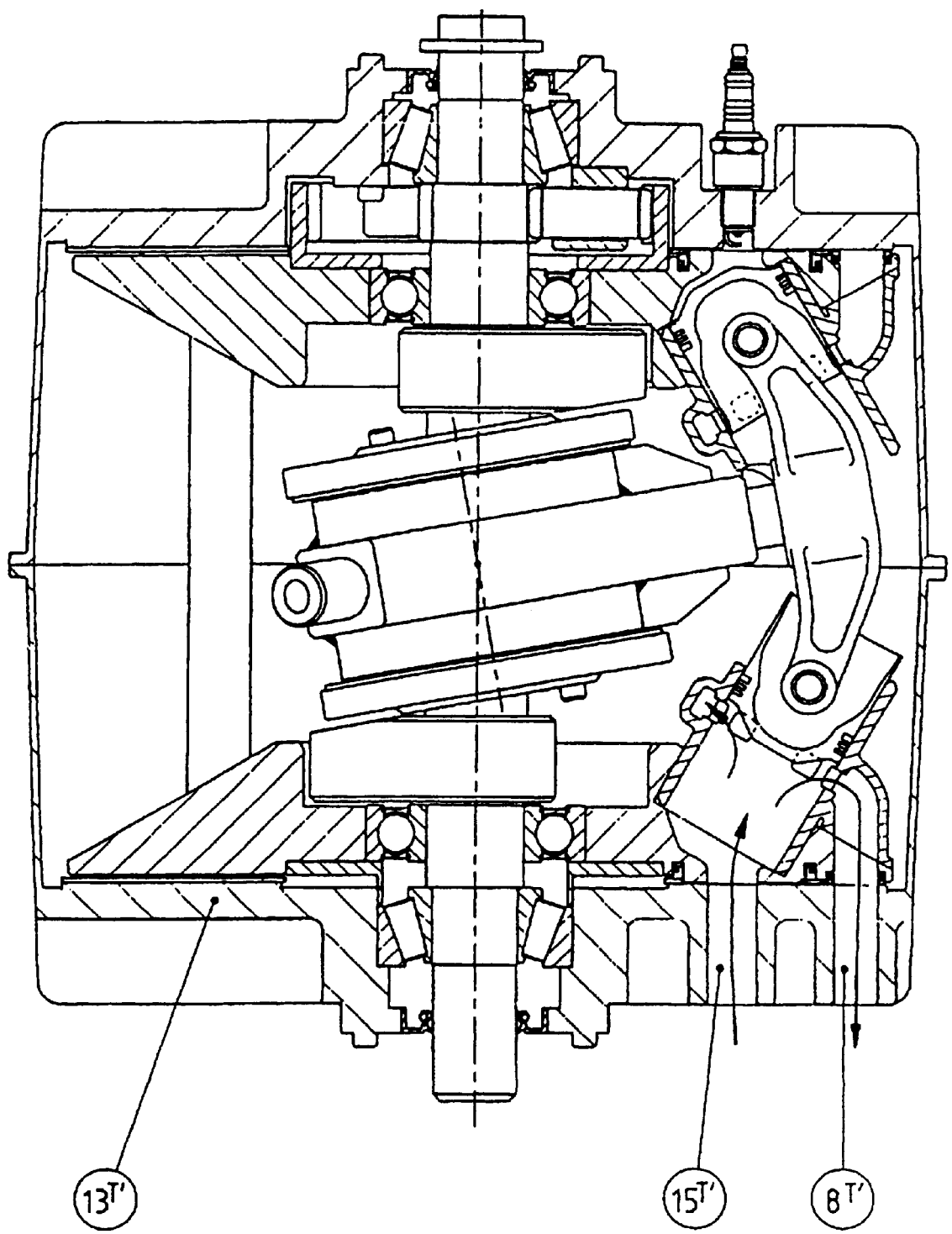
FIG. 44 is a sectional view through another preferred form of the engine of the present invention of FIG. 1 adapted to run in a two stroke cycle.

The exhaust ports $8^T$ around the perimeter of the cylinder $12^T$ connect to a single exhaust outlet of each cylinder. The combusted gases may either be expelled through each exhaust outlet into the surrounding environment, or alternatively a circumferential exhaust port means may be located about the exhaust outlets with centroid at the shaft axis, to provide at certain intervals of rotation of the cylinder head means openings for the exhaust outlet of each cylinder for the exhaust gases to be scavenged out of the cylinder $12^T$. Preferably such a circumferential exhaust port means connects the ports therein to a single exhaust outlet to there from dispose of the harmful exhaust gases. Such a exhaust port means is analogous in relative rotational operation to the port means $13^T$. FIG. 44 illustrates an alternative arrangement of exhausting the gases from the cylinder of the two stroke engine of FIG. 45. Exhaust ports $8^T$ are located in the head means $13^T$ at intervals such that when the piston is at bottom dead centre, ports $8^T$ allow for the ducting away of exhaust gases from each cylinder. Although illustrated in FIG. 44 are exhaust ports $8^T$ located on a larger pitch circle diameter to the inlet ports 15, the exhaust ports $8^T$ may alternatively be on a smaller pitch circle diameter to the inlet ports $15^T$.

The two stroke cycle engine may operate as a compression ignition engine, and may include alternative forms of fuel delivery to the cylinders. Again the shaft $1^T$ is indexed to the cylinder head means $5^T$ and port means $13^T$. The method of start-up of the two stroke engine of the present invention can be similar to what has been described for the four stroke engines, or any other method commonly known to a person skilled in the art. The method of cooling a two stroke engine is as substantially herein described.

For a two stroke engine, the appropriate orbital positions are such that:
(a) combusting fuel mixture is able to expand inside the cylinder $12^T$ forcing the piston $6^T$ downward during the power stroke,
(b) exhaust fluids are expelled from, and fuel mixture is displaced into the cylinder chamber when the piston is substantially at bottom dead centre, and
(c) fuel mixture is able to be compressed during the upward or compression stroke of piston $6^T$.

Figure 46:
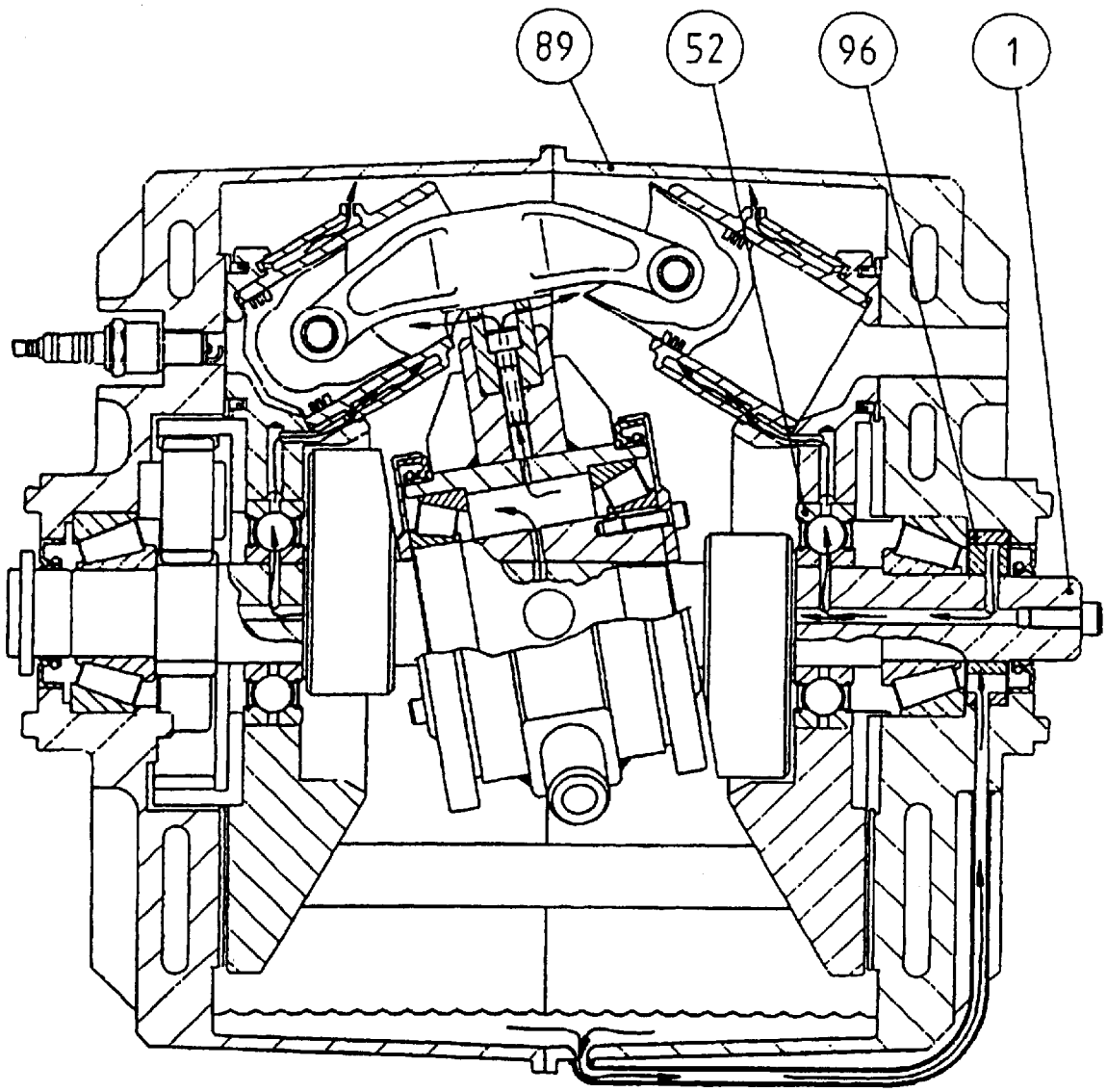
FIG. 46 is a sectional view through the engine of FIG. 1 illustrating lubrication and cooling fluid flows.

The present invention may also operate as a fluid displacement/compression machine such as a pump or a fluid driven motor. When operated as a pump or compressor a power input is supplied from eg. an electric motor to the shaft. Rotation of the shaft induces a rotation of the crank shaft, and causes oscillation of the pistons control means and pistons in the cylinder. Rotation of the cylinder head means about the shaft axis is induced from the rotation of the shaft by the gearing. Such rotation causes a relative rotation between the cylinder head means and the port means such that ports become aligned and unaligned with the cylinders at appropriate intervals. This results in induction of fluid and subsequent compression/delivery. (The opposite when driven as a motor) FIG. 46 is a sectional view through the engine of FIG. 1, wherein there has been included detail of the lubrication and cooling system of the engine. A suitable lubricating oil which also is able to take away heat from parts of the engine, is circulated by a pumping mechanism 96 which operates from the shaft 1. The oil circulates from the pumping mechanism 96 through a conduit in the shaft 1 to the cylinder head means bearings 52. From the bearings 52 through an orifice in the cylinder head means, the oil is delivered to a jacket surrounding each of the cylinders. The oil circulates through the jacket and out through a conduit into the crank shaft casing 98 and into the sump at the very bottom of the casing. Oil is also directed through the shaft conduit into the piston control means and out through the piston control means arms onto the back surfaces of each of the cylinders. This oil is also able to drain out into the sump. The oil in the sump is recirculated back to the pumping mechanism 96 through a conduit.

There are many forms of lubricating the engine of the present invention. It is envisaged that a high pressure low volume circulation of oil will be desirable for the lubrication of bearings, and a low pressure high volume circulation for cooling of the engine. Heat can be removed from the engine to an external body (eg air) via the end member 54. Transfer of heat within the engine is achieved by a combination of direct conduction (eg via port means 13) and by a heat exchanger within the end members 54, taking heat away from the lubrication oil. This heat may either be then directly (assisted by the reliefs 69 shown in FIG. 31) or via a cooling medium (eg radiator fluid) to an external fluid/air heat exchanger (radiator) to the surrounding air, or by any combination of the above.

What is claimed is:

1. A two or four stroke cycle internal combustion engine comprising:

port means providing a series of intake and exhaust ports fixed relative to said port means, each connected respectively to (i) an air intake or air and fuel mixture source and (ii) an exhaust system, a shaft rotatable relative to said port means, said shaft carrying a crank shaft having a crank axis oblique to the shaft axis, at least one combustion chamber rotatable about the shaft axis, each said combustion chamber being indexed at some lesser rate of rotation to the speed of rotation of said shaft and wherein each said combustion chamber includes at least one port capable during operation of being brought to the extent required into and out of an operative communication with each of said series of intake and exhaust ports, and a piston for each said combustion chamber, a piston control means journalled from said crank shaft and controlling the piston moving motion within each combustion chamber as the shaft rotates relative to said combustion chamber and each of said shaft and said combustion chamber rotates relative to said port means, said operative communication of said at least one port of each combustion chamber with each of said series of intake and exhaust ports occurring during the appropriate strokes of each piston in said combustion chamber for the four or two stroke cycle of said engine, a) each said at least one port of each combustion chamber being provided thereabout, with an annular seal located within an annular groove about said at least one port of each combustion chamber, the shape of the annular seal and annular groove being such that a clearance is present within the groove and combustion fluid pressure directed from the combustion chamber to within the clearance will displace the annular seal with a bias towards the port means, and b) a ring seal associated with every said at least one combustion chamber and rotatable therewith about said shaft axis, interposed between said combustion chambers and said port means and having, for each said combustion chamber port, an aperture located to correspond with that combustion chamber port.

2. An internal combustion engine as claimed in claim 1, wherein said clearance is a cavity between the base of said annular groove and said annular ring seal.

3. An internal combustion engine as claimed in claim 1, wherein a combustion chamber housing defines as an assembly, at least three said combustion chambers, said combustion chamber housing rotating as an assembly about the shaft axis, each of said pistons of each of said combustion chambers being reciprocably moveable within each of said combustion chambers and also rotatable therewith about said shaft axis.

4. An engine as claimed in claim 1, wherein said combustion chamber is a cylinder in which each said piston is movable between the limits of top dead center and bottom dead center defined by the angle between the crank axis and shaft axis.

5. An engine as claimed in claim 1, wherein a connection member is provided between each of said pistons and said piston control means to control the reciprocal movement of each respective piston between top dead center and bottom dead center within its cylinder.

6. An engine as claimed in claim 2, wherein said port means presents said series of intake and exhaust ports at appropriate intervals and sequences on a pitch circle diameter of a substantially planar surface of said port means such that said at least one port of each of said combustion chambers, is in operative communication over a predetermined range of rotation, with said intake and exhaust ports as said combustion chamber housing rotates relative to said port means.

7. An engine as claimed in claim 6, wherein said at least one port of each said combustion chamber sealably rotates over said substantially planar surface and at intervals provides gas communication with (i) said intake port during the induction stroke of said piston for air or air and fuel mixture intake into said combustion chamber, and (ii) said exhaust port during the exhaust stroke of said piston for displacement of exhaust gas from said combustion chamber, wherein sealable engagement of said at least one port of each said combustion chamber is provided between said intake and exhaust ports for said compression and power strokes of a four stroke cycle.

8. An engine as claimed in claim 6, wherein each said combustion chamber has two ports sealably rotatable over said substantially planar surface during compression and power strokes and at intervals provides gas communication with said intake port and said exhaust port during the induction/scavenging stroke of a two stroke cycle for air or air and fuel mixture intake and exhaust displacement from said combustion chamber.

9. An engine as claimed in claim 1, wherein each connection member extends from a point on the perimeter of said piston control means to its associated piston, each of said connection members having sufficient degrees of freedom with respect to said piston control means to allow for the substantially linear movement of each said piston within each said combustion chamber between its top dead center and bottom dead center.

10. An engine as claimed in claim 1, wherein two degrees of freedom for one piston are provided at the engagement of the associated said connection member with said piston control means, a first degree of freedom being to provide radial translation of said connection member from said crank axis and a second degree of freedom to provide relative rotation between said piston control means and the associated said connection member and three degrees of freedom are provided for the remaining piston, said first and said second degree and a third degree in a direction tangentially to the rotational plane defined by said piston control means.

11. An engine as claimed in claim 1, wherein said combustion chamber housing is indexed by an indexing means to said output shaft such that rotation of said output shaft is proportional, in the opposite direction, to the rotation of said combustion chamber housing or vice versa about said shaft axis.

12. An engine as claimed in claim 5, wherein two combustion chamber assemblies are provided each to present pairs of substantially opposed pistons and each two are rotatable about the shaft axis and each located adjacent a corresponding said port means providing said series of intake and exhaust ports, a connection member for each pair of opposed pistons, and engaged intermediate of its distal ends with said piston control means.

* * * * *